(12) United States Patent
Yamashita et al.

(10) Patent No.: US 12,538,051 B2
(45) Date of Patent: Jan. 27, 2026

(54) IMAGING DEVICE

(71) Applicant: Sony Semiconductor Solutions Corporation, Kanagawa (JP)

(72) Inventors: Tomonori Yamashita, Kanagawa (JP); Yosuke Ueno, Kanagawa (JP); Takashi Moue, Kanagawa (JP); Shinichirou Etou, Kanagawa (JP); Youhei Oosako, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 20 days.

(21) Appl. No.: 18/684,332

(22) PCT Filed: Oct. 6, 2022

(86) PCT No.: PCT/JP2022/037463
§ 371 (c)(1),
(2) Date: Feb. 16, 2024

(87) PCT Pub. No.: WO2023/058720
PCT Pub. Date: Apr. 13, 2023

(65) Prior Publication Data
US 2024/0373149 A1  Nov. 7, 2024

(30) Foreign Application Priority Data

Oct. 8, 2021  (JP) .................................. 2021-166439

(51) Int. Cl.
*H04N 25/78* (2023.01)
*H04N 25/772* (2023.01)

(52) U.S. Cl.
CPC ........... *H04N 25/78* (2023.01); *H04N 25/772* (2023.01)

(58) Field of Classification Search
CPC ...... H04N 25/78; H04N 25/772; H04N 25/79; H04N 25/441; H04N 25/77; H10F 39/12; H10F 39/199; H10F 39/809; H10F 39/811
See application file for complete search history.

(56) References Cited

U.S. PATENT DOCUMENTS 8,890,047 B2 * 11/2014 Solhusvik ................. G06T 5/80
257/774
11,627,265 B2 * 4/2023 Na ....................... H04N 25/771
348/360

(Continued)

FOREIGN PATENT DOCUMENTS

| CN | 111556262 A | 8/2020 |
| JP | 2018148541 A | 9/2018 |

(Continued)

OTHER PUBLICATIONS

University of Oslo Department of Informatics, IN5350—CMOS Image Sensor Design, Sep. 9, 2021, retrieved from https://www.uio.no/studier/emner/matnat/ifi/IN5350/h21/timeplan/in5350_h21_3_pixels_readout_10sep2021.pdf on Jul. 13, 2025 (Year: 2021).*

(Continued)

*Primary Examiner* — Timothy J Henn
(74) *Attorney, Agent, or Firm* — Michael Best & Friedrich LLP

(57) ABSTRACT

An imaging device according to an embodiment includes: photoelectric conversion elements (300) configured to generate a charge according to received light; a pixel circuit configured to read the charge from the photoelectric conversion element and to convert the charge into an analog type pixel signal; and a conversion circuit (20) configured to convert, based on a reference signal, the pixel signal into digital type pixel data, in which the conversion circuit includes a first circuit connected to the pixel circuit and a (Continued)

second circuit connected to an output of the first circuit, the photoelectric conversion elements are arranged in a matrix array and are provided on a first layer (2010a) of a first substrate, and the pixel circuit provided for each of the photoelectric conversion elements on a one-to-one basis and the first circuit are provided on a second layer (2010b) of the first substrate.

16 Claims, 40 Drawing Sheets

(56) References Cited

U.S. PATENT DOCUMENTS

| | | | |
|---|---|---|---|
| 11,927,475 B2* | 3/2024 | Liu | H04N 25/623 |
| 12,262,131 B2* | 3/2025 | Kodama | H04N 25/77 |
| 2008/0042046 A1* | 2/2008 | Mabuchi | H10F 39/809 |
| | | | 257/E27.151 |
| 2010/0276572 A1* | 11/2010 | Iwabuchi | H10F 39/812 |
| | | | 257/443 |
| 2013/0314573 A1* | 11/2013 | Tsukimura | H04N 25/616 |
| | | | 348/302 |
| 2013/0320197 A1* | 12/2013 | Asayama | H01L 25/167 |
| | | | 250/208.1 |
| 2015/0009379 A1 | 1/2015 | Yan | |
| 2016/0360138 A1 | 12/2016 | Meynants | |
| 2019/0098241 A1* | 3/2019 | Fossum | H04N 25/76 |
| 2020/0258926 A1* | 8/2020 | Seo | H10F 39/809 |
| 2021/0142086 A1 | 5/2021 | Berkovich | |
| 2021/0351223 A1* | 11/2021 | Nomoto | H10F 39/812 |
| 2022/0247958 A1* | 8/2022 | Nakamura | H04N 25/79 |
| 2023/0378219 A1* | 11/2023 | Yokoyama | H10F 39/80373 |
| 2024/0088175 A1* | 3/2024 | Saito | G06N 3/063 |

FOREIGN PATENT DOCUMENTS

| | | |
|---|---|---|
| JP | 2020129796 A | 8/2020 |
| WO | 2020111100 A1 | 6/2020 |
| WO | WO-2020170518 A1 | 8/2020 |
| WO | WO-2021157148 A1 | 8/2021 |
| WO | 2021220682 A1 | 11/2021 |
| WO | 2022044808 A1 | 3/2022 |
| WO | WO-2022118564 A1 | 6/2022 |

OTHER PUBLICATIONS

International Search Report (PCT/ISA/210), International Application No. PCT/JP2022/037463, dated Dec. 27, 2022.

* cited by examiner

FIG.6
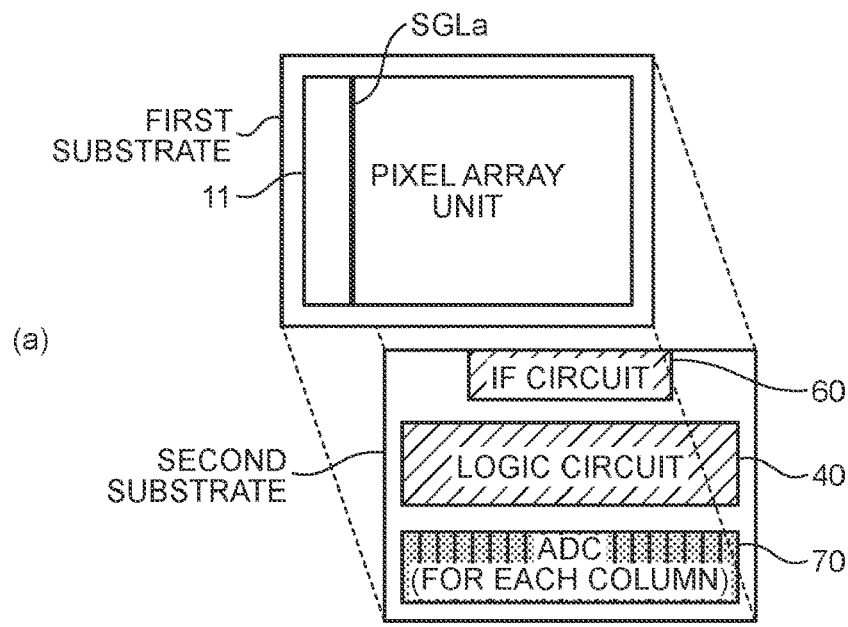
(a)
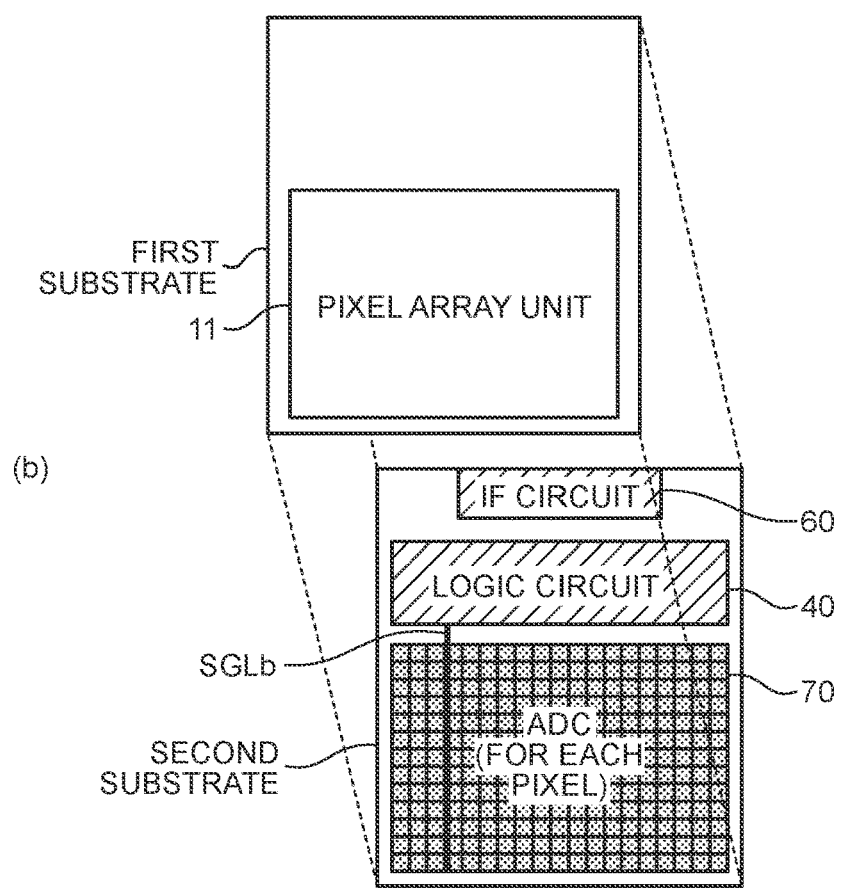
(b)

FIG.10A
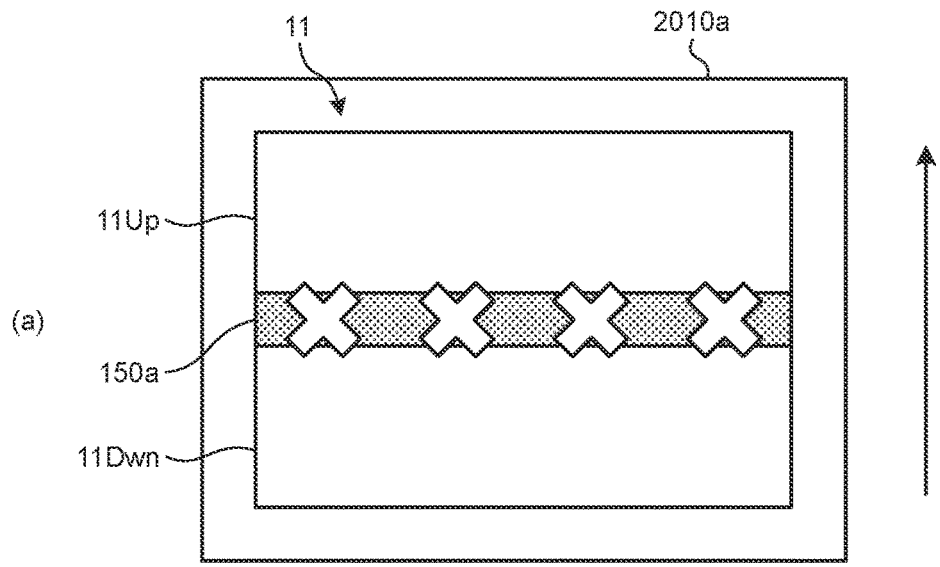
(a)
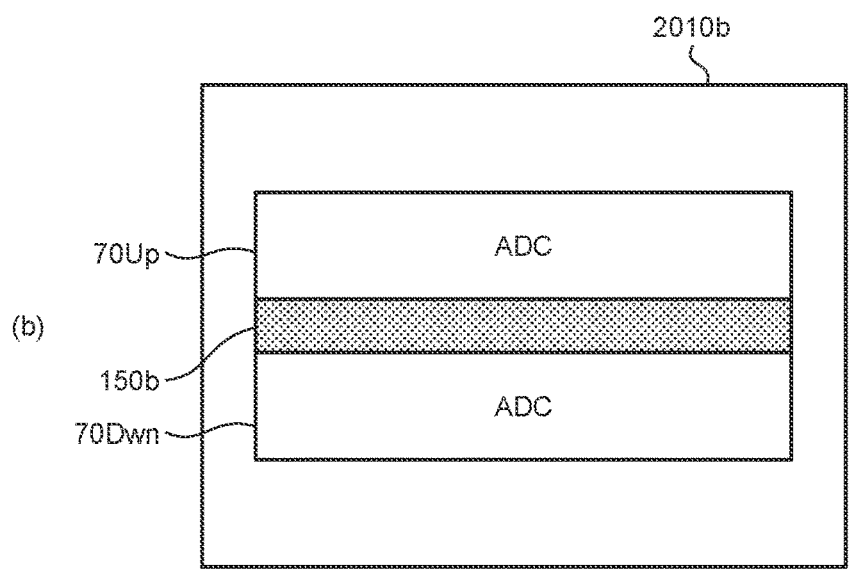
(b)
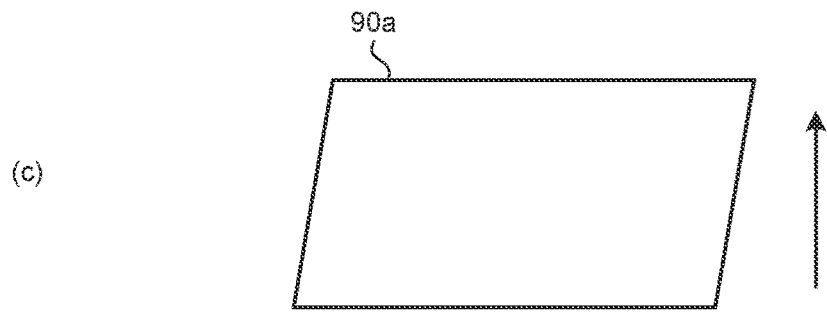
(c)

FIG.14
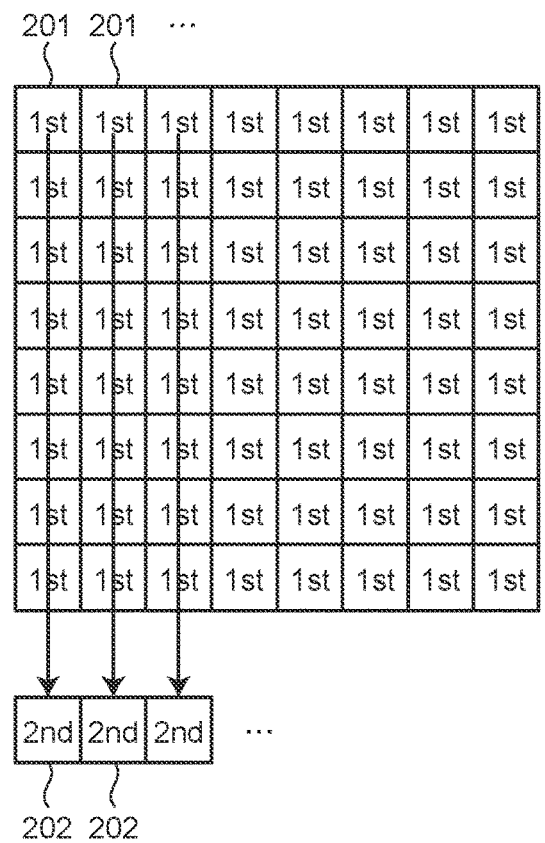
(a)
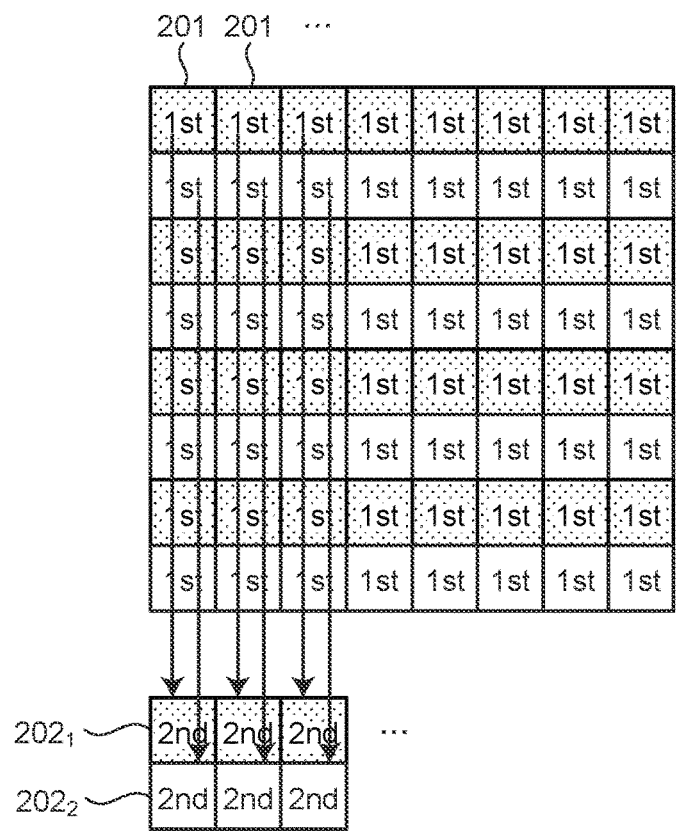
(b)

IMAGING DEVICE

FIELD

The present disclosure relates to an imaging device.

BACKGROUND

There is known a technology of forming an imaging device that performs imaging by a rolling shutter system by a stacked structure in which a plurality of semiconductor chips are stacked. For example, a pixel array in which pixels including photoelectric conversion elements and pixel circuits are arranged in a matrix array is formed on the semiconductor chip of a first layer. A signal processing circuit including an analog to digital (AD) conversion circuit or the like that converts an analog type pixel signal output from each pixel included in the pixel array into digital type pixel data, and a drive circuit that drives the pixel array are formed on the semiconductor chip of a second layer.

In the semiconductor chip of the first layer, each pixel included in the pixel array outputs a pixel signal to a vertical signal line for each column of the matrix array. In the semiconductor chip of the second layer, the AD conversion circuit is provided for each vertical signal line and converts the pixel signal supplied via the vertical signal line into digital pixel data.

CITATION LIST

Patent Literature

Patent Literature 1: US 2020/0258926 A

SUMMARY

Technical Problem

In the imaging device having the stacked structure described above, the pixel signal is supplied to the AD conversion circuit via the vertical signal line. The pixel signal is supplied to the AD conversion circuit via a distance from one end in a column direction of the pixel array to the other end in the column direction at the longest distance. The pixel signal is an analog signal, has a wide band, and is easily affected by noise.

On the other hand, for example, Patent Literature 1 discloses an image sensor device configured by bonding a substrate to three layers including a first semiconductor die, a second semiconductor die, and a third semiconductor die. According to Patent Literature 1, a comparator is divided into a first portion and a second portion, the first portion is formed in the first semiconductor die together with a photodetector, and the second portion is formed in the second semiconductor die. In Patent Literature 1, a digital pixel is configured to include the photodetector, the comparator, and a memory circuit, and these digital pixels are arranged in a matrix array. It is noted that the memory circuit is formed in the second semiconductor die.

In Patent Literature 1, the digital pixel stores a code supplied for each column in the memory circuit according to an output of the first portion of the comparator, and reads and outputs the code stored in the memory circuit according to a read signal. Therefore, it can be said that it is not suitable for a rolling shutter system in which reading from pixels is performed row by row and thus higher speed reading is required.

An object of the present disclosure is to provide an imaging device that is compatible with a rolling shutter system and is capable of further suppressing noise.

Solution to Problem

For solving the problem described above, an imaging device according to one aspect of the present disclosure has photoelectric conversion elements configured to generate a charge according to received light; a pixel circuit configured to read the charge from the photoelectric conversion element and to convert the charge into an analog type pixel signal; and a conversion circuit configured to convert, based on a reference signal, the pixel signal into digital type pixel data, wherein: the conversion circuit includes a first circuit and a second circuit, wherein the first circuit is connected to the pixel circuit, and the second circuit is connected to an output of the first circuit; the photoelectric conversion elements are arranged in a matrix array and are provided on a first layer of a first substrate; and the pixel circuit and the first circuit are provided on a second layer of the first substrate, wherein the pixel circuit is provided for each of the photoelectric conversion elements on a one-to-one basis.

BRIEF DESCRIPTION OF DRAWINGS

FIG. 6 is a schematic diagram illustrating a path when an analog type pixel signal is converted into a digital type pixel signal and supplied to an interface circuit.

FIG. 10A is a schematic diagram illustrating focal plane distortion in a case where the pixel array unit is divided into two in the vertical direction.

FIG. 14 is a schematic diagram illustrating a configuration according to a third modification of the first embodiment.

DESCRIPTION OF EMBODIMENTS

Figure 1:
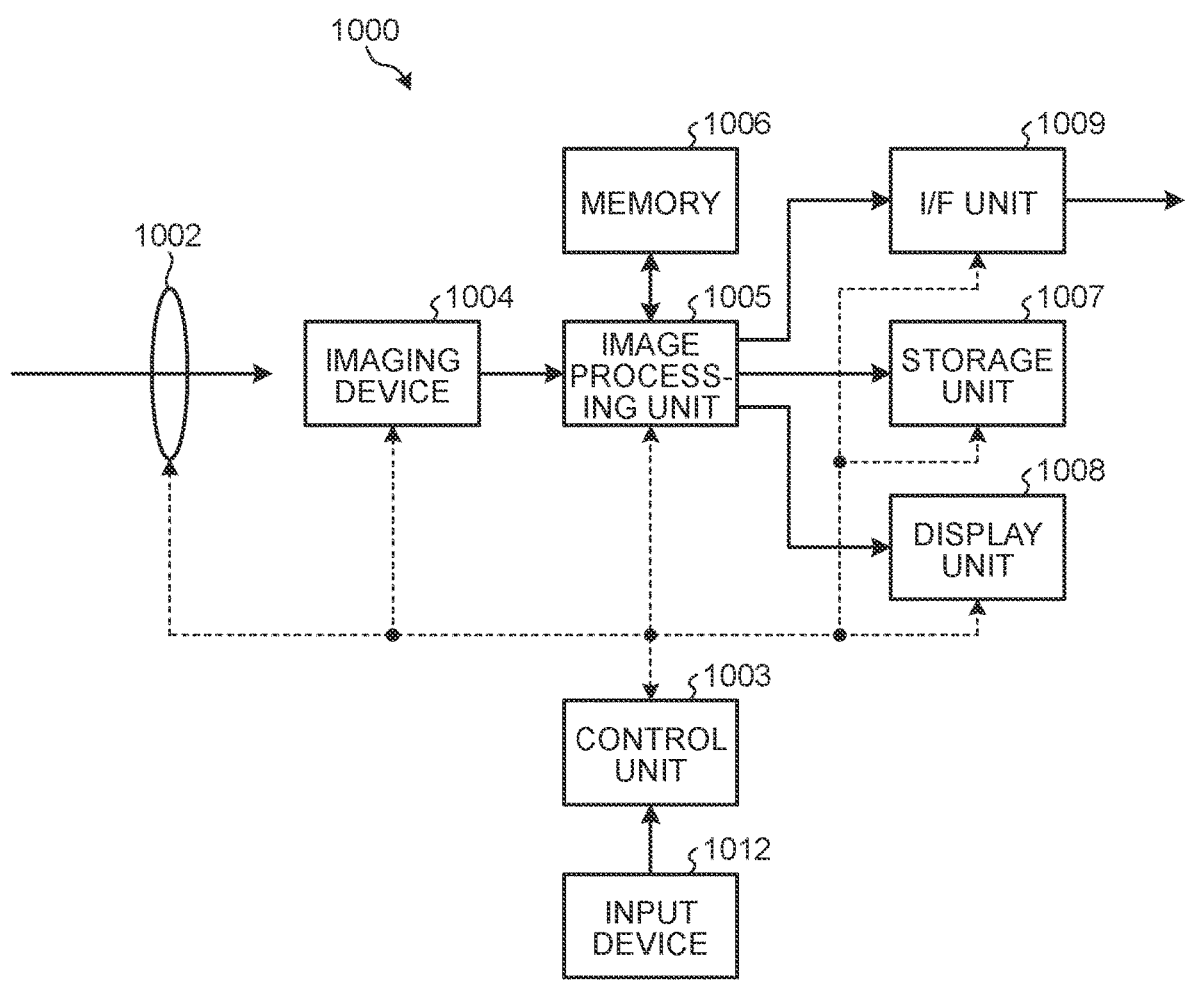
FIG. 1 is a block diagram illustrating a configuration of an example of an electronic apparatus commonly applicable to each embodiment.

Hereinafter, embodiments of the present disclosure will be described in detail with reference to the drawings. It is noted that, in the following embodiments, the same portions will be denoted by the same reference numerals, and redundant description will be omitted.

Hereinafter, embodiments of the present disclosure will be described in the following order.

1. Configuration applicable to embodiment
2. Configuration according to each embodiment
3. First Embodiment
3-1. First modification of first embodiment
3-2. Second modification of first embodiment
3-3. Third modification of first embodiment
4. Second Embodiment
4-1. First modification of second embodiment
4-2. Second modification of second embodiment
4-3. Third modification of second embodiment
5. Third Embodiment
6. Fourth Embodiment
6-1. Modification of fourth embodiment
6-1-1. First example
6-1-2. Second example
6-1-3. Third example
6-1-4. Fourth example
7. Fifth Embodiment
7-1. First example
7-2. Second example
7-3. Third example
8. Sixth Embodiment
8-1. More specific example in a case where imaging device of present disclosure is mounted on vehicle 1. Configuration Applicable to Embodiment First, a technology applicable to each embodiment will be described.

(Electronic Apparatus Commonly Applicable to Each Embodiment)

FIG. 1 is a block diagram illustrating a configuration of an example of an electronic apparatus commonly applicable to each embodiment. In FIG. 1, an electronic apparatus 1000 includes an optical system 1002, a control unit 1003, an imaging device 1004, an image processing unit 1005, a memory 1006, a storage unit 1007, a display unit 1008, an interface (I/F) unit 1009, and an input device 1012.

Here, as the electronic apparatus 1000, a digital still camera, a digital video camera, a mobile phone with an imaging function, a smartphone, or the like can be applied. Furthermore, a monitoring camera, an in-vehicle camera, a medical camera, or the like can also be applied as the electronic apparatus 1000.

The imaging device 1004 includes, for example, a plurality of photoelectric conversion elements arranged in a matrix array. The photoelectric conversion element converts received light into charges by photoelectric conversion. The imaging device 1004 includes a drive circuit that drives the plurality of photoelectric conversion elements, a signal processing circuit that reads charges from each of the plurality of photoelectric conversion elements and generates image data based on the read charges, and a power supply circuit for supplying power to the drive circuit.

The optical system 1002 includes a main lens formed by one lens or by combining a plurality of lenses and a mechanism for driving the main lens, and forms an image of image light (incident light) from a subject on a light receiving surface of the imaging device 1004 via the main lens. Furthermore, the optical system 1002 includes an autofocus mechanism that adjusts focus according to a control signal and a zoom mechanism that changes a zoom ratio according to the control signal. Furthermore, the electronic apparatus 1000 may be configured such that the optical system 1002 is detachable and is replaceable with another optical system 1002.

The image processing unit 1005 executes predetermined image processing on pixel data output from the imaging device 1004. For example, the image processing unit 1005 is connected to the memory 1006 such as a frame memory, and writes image data output from the imaging device 1004 in the memory 1006. The image processing unit 1005 performs predetermined image processing on the pixel data written in the memory 1006, and writes the pixel data subjected to the image processing again in the memory 1006. It is noted that the memory 1006 can store pixel data for one frame as image data.

The storage unit 1007 is, for example, a non-volatile memory such as a flash memory or a hard disk drive, and stores the image data output from the image processing unit 1005 in a non-volatile manner. The display unit 1008 includes, for example, a display device such as a liquid crystal display (LCD) and a drive circuit that drives the display device, and can display an image based on the image data output by the image processing unit 1005. The I/F unit 1009 is an interface for transmitting the image data output from the image processing unit 1005 to the outside. For example, a universal serial bus (USB) can be applied as the I/F unit 1009. The present invention is not limited thereto, and the I/F unit 1009 may be an interface connectable to a network by wired communication or wireless communication.

The input device 1012 includes an operator for receiving a user input. If the electronic apparatus 1000 is, for example, a digital still camera, a digital video camera, a mobile phone or a smartphone with an imaging function, the input device 1012 can include a shutter button for instructing imaging by the imaging device 1004 or an operator for realizing the function of the shutter button.

The control unit 1003 includes, for example, a processor such as a central processing unit (CPU), a read only memory (ROM), and a random access memory (RAM), and controls the overall operation of the electronic apparatus 1000 using the RAM as a work memory according to a program stored in the ROM in advance. For example, the control unit 1003 can control the operation of the electronic apparatus 1000 according to a user input received by the input device 1012. Furthermore, the control unit 1003 can control an autofocus mechanism in the optical system 1002 based on an image processing result of the image processing unit 1005.

Imaging Device Commonly Applicable to Each Embodiment

Figure 2:
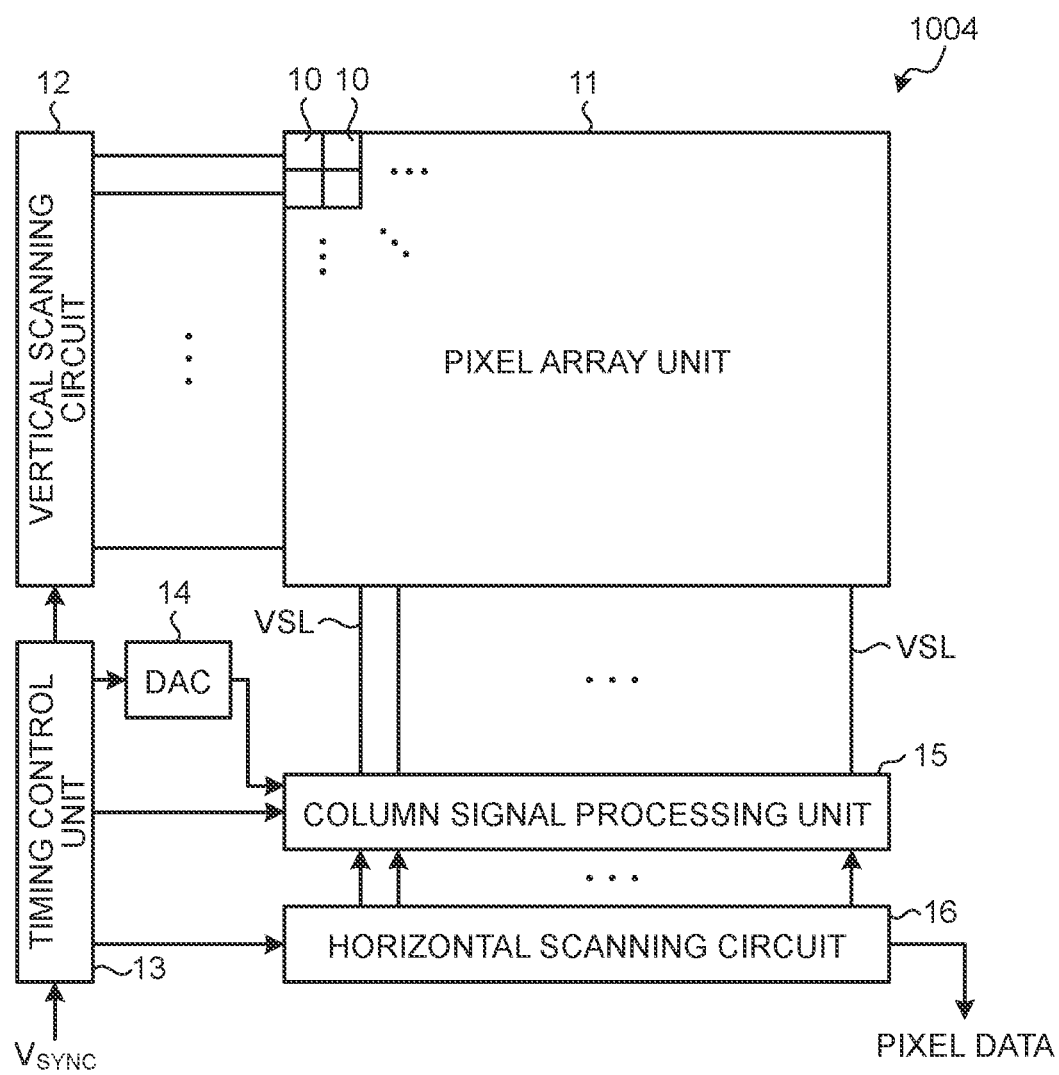
FIG. 2 is a block diagram illustrating a configuration of an example of an imaging device in each embodiment of the present disclosure.

FIG. 2 is a block diagram illustrating a configuration example of the imaging device 1004 in each embodiment of the present disclosure. In FIG. 2, the imaging device 1004 includes a vertical scanning circuit 12, a timing control unit 13, a digital to analog converter (DAC) 14, a pixel array unit 11, a column signal processing unit 15, and a horizontal scanning circuit 16. The imaging device 1004 can be configured as a complementary metal oxide semiconductor (CMOS) image sensor (CIS) in which the above-mentioned units are integrally formed using the CMOS.

In the pixel array unit 11, a plurality of pixels 10 are arranged in a matrix array. Hereinafter, in the pixel array unit 11, the horizontal direction in FIG. 2 is defined as a row, and the vertical direction in FIG. 2 is defined as a column.

In the pixel array unit 11, each pixel 10 includes a photoelectric conversion element that generates a charge according to received light, and a pixel circuit that outputs a pixel signal based on the charge generated by the photoelectric conversion element. The vertical scanning circuit 12 drives each of the pixels 10 included in the pixel array unit 11 for each row, and causes each of the pixels 10 to output a pixel signal. At this time, the vertical scanning circuit 12 sequentially drives the respective pixels 10 according to the order of rows and outputs the pixel signals. That is, the vertical scanning circuit 12 functions as a read control circuit that controls reading of the charge from the photoelectric conversion element and outputting of the pixel signal.

The timing control unit 13 controls an operation timing of each of the vertical scanning circuit 12, the DAC 14, the column signal processing unit 15, and the horizontal scanning circuit 16 in synchronization with a vertical synchronization signal $V_{SYNC}$. The vertical synchronization signal $V_{SYNC}$ is a periodic signal of a predetermined frequency (for example, 60 (Hz (Hertz))) indicating an imaging timing.

The DAC 14 generates a predetermined reference signal by digital-to-analog (DA) conversion. For example, a sawtooth ramp (RAMP) signal is used as the reference signal. The DAC 14 supplies the reference signal to the column signal processing unit 15.

The column signal processing unit 15 is supplied with an analog type pixel signal output from the pixel 10 via the vertical signal line VSL provided for each column in the pixel array unit 11. The column signal processing unit 15 performs, for each column, signal processing such as analog to digital (AD) conversion processing and correlated double sampling (CDS) processing on the pixel signal. The column signal processing unit 15 outputs the processed digital type pixel signal (pixel data). The pixel data output from the column signal processing unit 15 is supplied to the image processing unit 1005.

The horizontal scanning circuit 16 controls the column signal processing unit 15 to output the pixel data from the column signal processing unit 15, for example, for each row in the order of the column direction.

(Flow of Processing by Existing Technology)

Figure 3:
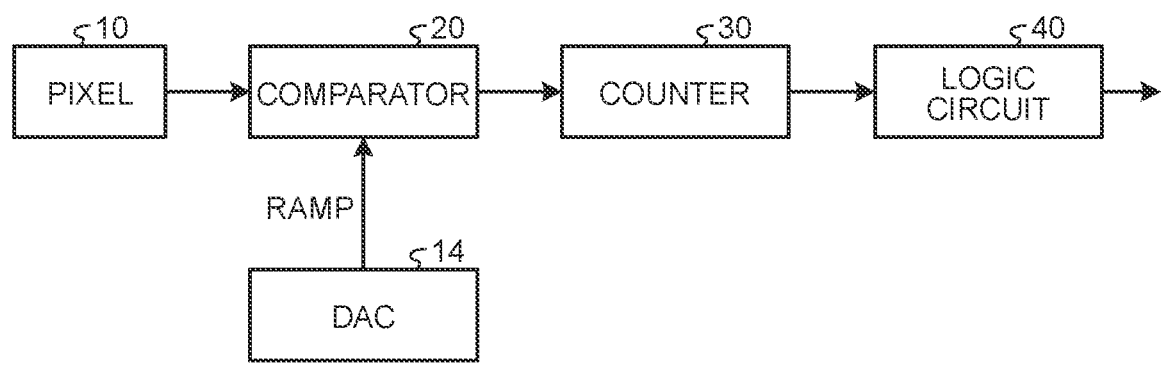
FIG. 3 is a schematic diagram schematically illustrating signal processing on a pixel signal according to an existing technology.

Next, signal processing on a pixel signal according to an existing technology will be schematically described. FIG. 3 is a schematic diagram schematically illustrating signal processing on the pixel signal according to the existing technology. In FIG. 3, a comparator 20, a counter 30, and a logic circuit 40 are included in, for example, the column signal processing unit 15 in FIG. 2.

The analog type pixel signal output from the pixel 10 is supplied to the comparator 20. A RAMP signal as a reference signal is further supplied from the DAC 14 to the comparator 20. The RAMP signal is, for example, a signal, the level (voltage value) of which decreases stepwise along time series according to a predetermined clock pulse. The comparator 20 compares the pixel signal with the RAMP signal, and supplies a comparison result to the counter 30. For example, when the level of the RAMP signal is higher than the level of the pixel signal, the comparator 20 outputs a high difference signal to the counter 30. On the other hand, when the level of the RAMP signal becomes equal to or lower than the level of the pixel signal, the comparator 20 inverts the output and outputs a low difference signal to the counter 30.

In each of a P-phase (Preset Phase) period and a D-phase (Data Phase) period, the counter 30 counts the time from the start of the voltage drop of the ramp signal RAMP to the level equal to or lower than that of the pixel signal according to a difference signal input from the comparator 20, and outputs each count result to the logic circuit 40. It is noted that the P-phase period is a period during which a reset level of the pixel signal is detected in CDS processing, and the D-phase period is a detection period during which a signal level of the pixel signal is detected in the CDS processing.

The logic circuit 40 performs the CDS processing and AD conversion processing based on a counting result of the P-phase period input from the counter 30 and a counting result of the D-phase period, and generates and outputs a digital type pixel signal (pixel data).

(Structure of Imaging Device Applicable to Each Embodiment)

Next, a description will be schematically given as to a structure of an imaging device applicable to each embodiment. The imaging device 1004 according to the embodiment can be formed by a stacked structure in which a plurality of layers of semiconductor chips are stacked.

Figure 4A:
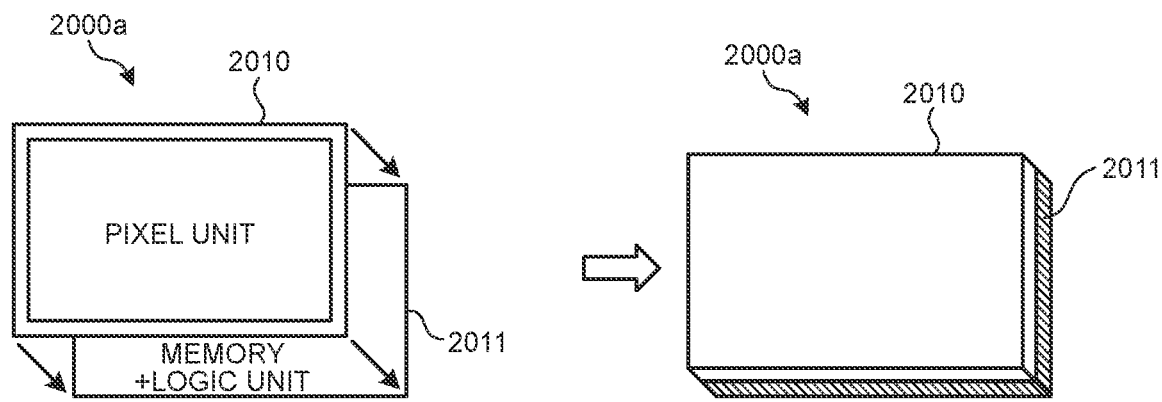
FIG. 4A is a diagram illustrating an example in which the imaging device according to each embodiment is formed by a stacked CIS having a two-layer structure.

As an example, the imaging device 1004 can be formed with a two-layer structure in which semiconductor chips are stacked in two layers. FIG. 4A is a diagram illustrating an example in which the imaging device 1004 according to each embodiment is formed by a stacked CIS having a two-layer structure. In the structure of FIG. 4A, a pixel unit 2010 is formed in the semiconductor chip of the first layer, and a memory+logic unit 2011 is formed in the semiconductor chip of the second layer.

The pixel unit 2010 includes at least the pixel array unit 11. The memory+logic unit 2011 can include, for example, the vertical scanning circuit 12, the timing control unit 13, the DAC 14, the column signal processing unit 15, the horizontal scanning circuit 16, and the interface for performing communication between the imaging device 1004 and the outside. Furthermore, the memory+logic unit 2011 can include, for example, a memory that stores the pixel data output from the column signal processing unit 15.

As illustrated on the right side of FIG. 4A, the imaging device 1004 is configured as one solid-state imaging element 2000a by causing the semiconductor chip of the first layer and the semiconductor chip of the second layer to be bonded to each other in a state of electrically contacting each other.

Figure 4B:
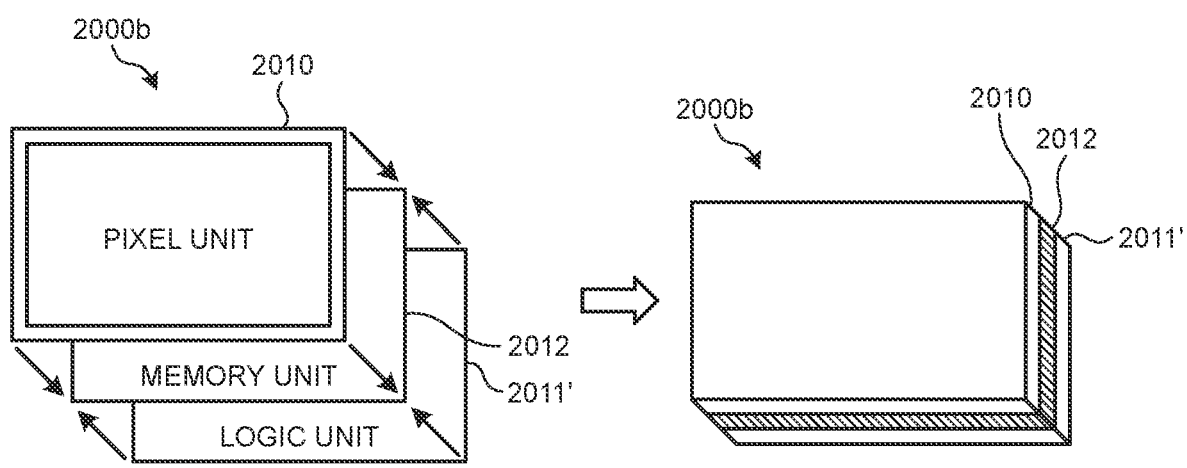
FIG. 4B is a diagram illustrating an example in which the imaging device according to each embodiment is formed by a stacked CIS having a three-layer structure.

As another example, the imaging device 1004 can be formed with a three-layer structure in which semiconductor chips are stacked in three layers. FIG. 4B is a diagram illustrating an example in which the imaging device 1004 according to each embodiment is formed by a stacked CIS having a three-layer structure. In the structure of FIG. 4B, the pixel unit 2010 is formed in the semiconductor chip of the first layer, a memory unit 2012 is formed in the semiconductor chip of the second layer, and a logic unit 2011' is formed in the semiconductor chip of the third layer. In this case, the logic unit 2011' can include, for example, the vertical scanning circuit 12, the timing control unit 13, the DAC 14, the column signal processing unit 15, the horizontal scanning circuit 16, and the interface for performing communication between the imaging device 1004 and the outside. Furthermore, the memory unit 2012 can include, for example, a memory that stores the pixel data output from the column signal processing unit 15.

As illustrated on the right side of FIG. 4B, the imaging device 1004 is configured as one solid-state imaging element 2000b by causing the semiconductor chip of the first layer, the semiconductor chip of the second layer, and the semiconductor chip of the third layer to be bonded to each other in a state of electrically contacting each other.

2. Configuration According to Each Embodiment

Next, a configuration according to each embodiment will be described.

Figure 5:
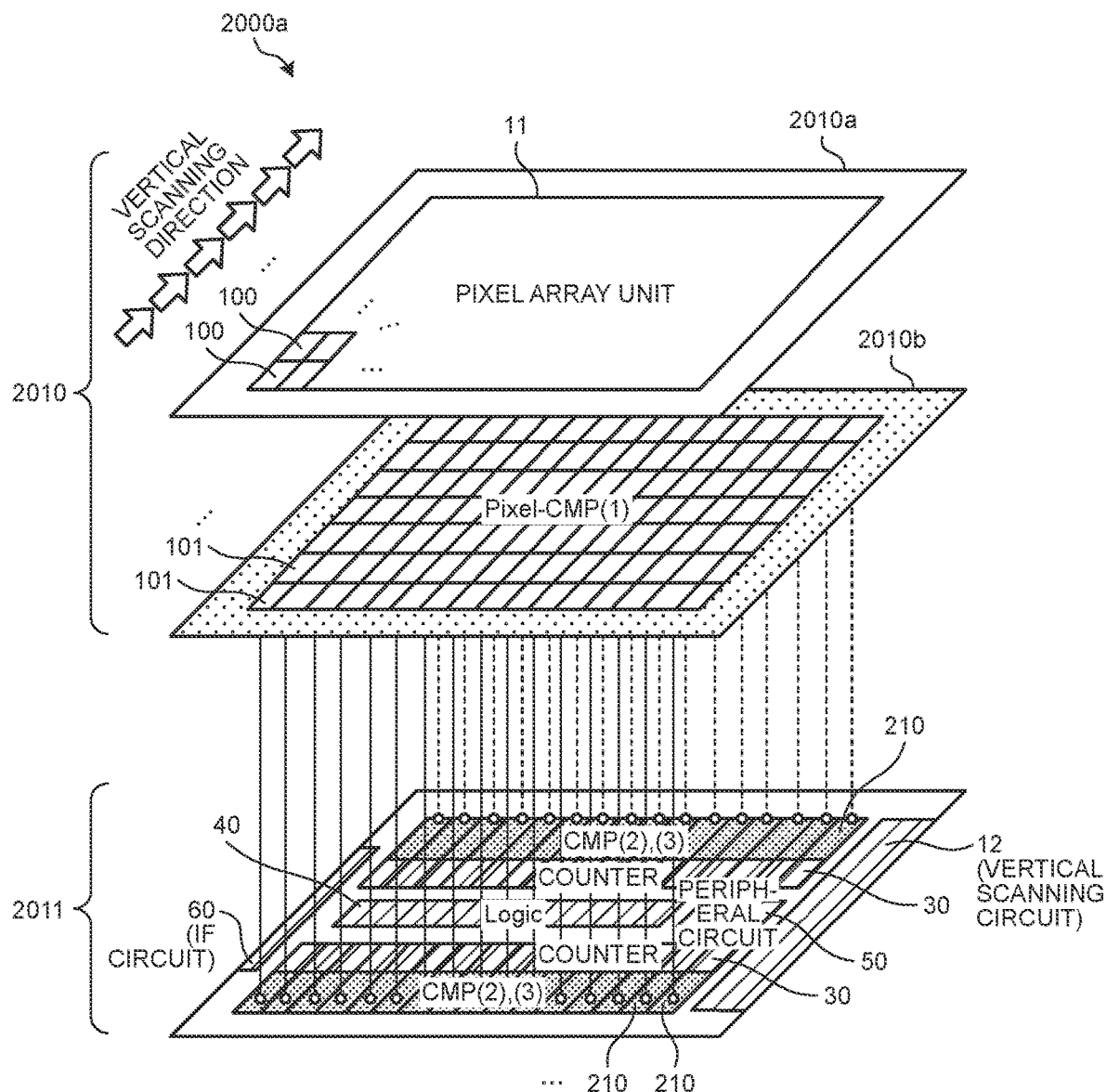
FIG. 5 is a schematic diagram illustrating a structure of an example of the imaging device according to the embodiment.

FIG. 5 is a schematic diagram illustrating a structure of an example of the imaging device 1004 according to the embodiment. In the example of FIG. 5, the imaging device 1004 applies the solid-state imaging element 2000a having the two-layer structure described with reference to FIG. 4A. Here, in the case of a back-surface-irradiation-type image sensor, a photoelectric conversion element is formed in a first layer 2010a of a substrate, and a pixel circuit that converts a charge generated by the photoelectric conversion element into a pixel signal and outputs the pixel signal is formed in a second layer 2010b of the substrate. The first layer 2010a and the second layer 2010b form the pixel unit 2010.

In FIG. 5, for the first layer 2010a, photoelectric conversion units 100 including the photoelectric conversion element and a transistor for controlling reading of the charge from the photoelectric conversion element are arranged in a matrix array. For the second layer 2010b, circuit units 101 including a pixel circuit that converts the charge read from the photoelectric conversion unit 100 into a pixel signal are arranged in a matrix array corresponding to the photoelectric conversion units 100 in the first layer 2010a. More specifically, the circuit unit 101 is disposed in a state of being in electrical contact between the first layer 2010a and the second layer 2010b in a one-to-one relationship with the photoelectric conversion unit 100, the position of which corresponds to the circuit unit 101, on the first layer 2010a.

In each embodiment, the circuit unit 101 (described as Pixel-CMP (1) in the drawing) further includes a part of the comparator 20. That is, in each embodiment, the comparator 20 is divided into at least two portions including a first circuit (described as CMP (1)) to which a pixel signal is directly supplied from the pixel circuit and a second circuit (described as CMPs (2) and (3)) to which an output of the first circuit is supplied. The first circuit includes, for example, a circuit that compares the pixel signal output from the pixel circuit with the RAMP signal supplied from the DAC 14.

In FIG. 5, the vertical scanning circuit 12, the counter 30, the logic circuit 40, a peripheral circuit 50, and an interface circuit 60 (also referred to as an IF circuit in the drawing) are arranged in the memory+logic unit 2011.

The peripheral circuit 50 includes the DAC 14. Furthermore, the interface circuit 60 is an interface for transmitting and receiving a signal between the imaging device 1004 serving as the solid-state imaging element 2000a and the outside.

In the example of FIG. 5, the vertical scanning circuit 12 is arranged at one end (right end in the example of the drawing) of the memory+logic unit 2011 in the row direction along the column direction in the pixel array unit 11. Furthermore, the interface circuit 60 is arranged at the other end (left end in the example of the drawing) in the row direction of the memory+logic unit 2011 along the column direction in the pixel array unit 11.

In addition, a second circuit 210 into which the comparator 20 is divided is arranged in the memory+logic unit 2011. In the example of FIG. 5, the second circuit 210 is arranged at one end and the other end (upper and lower ends in the example of FIG. 5) in the column direction along the row direction of the memory+logic unit 2011. The second circuit 210 is provided in units of columns in the pixel array unit 11. In the example of FIG. 5, the second circuit 210 is provided at the opposite ends in the column direction of the memory+logic unit 2011 along the row direction in the pixel array unit 11.

The second circuit 210 is shared by the plurality of circuit units 101 arranged along the column in the second layer 2010b. For example, each of the second circuits 210 arranged at one end (for example, the upper end in the drawing) in the column direction of the memory+logic unit 2011 is shared by each of the circuit units 101 arranged at a half portion on one end side (the upper half portion in the example of FIG. 5) among the circuit units 101 arranged in the second layer 2010b for each column. Similarly, each of the second circuits 210 arranged at the other end (for example, the lower end in FIG. 5) in the column direction of the memory+logic unit 2011 is shared by each of the circuit units 101 arranged at a half portion on the other end side (the lower half portion in the example of FIG. 5) among the circuit units 101 arranged in the second layer 2010b for each column.

It is noted that each pixel 10 (each photoelectric conversion unit 100 and each circuit unit 101) is scanned in the column direction, that is, the vertical direction as indicated by an arrow. The output from each pixel 10 (each circuit unit 101) is transferred to the memory+logic unit 2011 for each row.

Here, a path of the pixel signal will be considered. FIG. 6 is a schematic diagram illustrating a path when an analog type pixel signal is converted into a digital type pixel signal (pixel data), and the converted pixel signal is supplied to the interface circuit 60.

It is noted that FIG. 6 is a diagram for description, and the arrangement of the logic circuit 40, the interface circuit 60, and an analog to digital converter (ADC) 70 does not necessarily coincide with the arrangement described with reference to FIG. 5. That is, in sections (a) and (b), the pixel array unit 11 is provided on a first substrate, and the logic circuit 40, the interface circuit 60, and the ADC 70 are provided on a second substrate. Furthermore, the ADC 70 includes the comparator 20 and the counter 30 in FIG. 3. That is, the analog type pixel signal output from each pixel included in the pixel array unit 11 is converted into pixel data by the ADC 70, and the pixel data is output to the outside via the logic circuit 40 and the interface circuit 60.

The section (a) in FIG. 6 is an example in which the ADC 70 is arranged for each column. Furthermore, the section (b) is an example in which the ADC 70 is arranged for each pixel, and corresponds to each embodiment of the present disclosure.

In the example of the section (a) of FIG. 6, each ADC 70 is arranged on one end side in the column direction, and the interface circuit 60 is arranged on the other end side in the column direction on the second substrate. The pixel signal output from each pixel included in the pixel array unit 11 is transferred to the end of the ADC 70 side of the pixel unit 2010 via the vertical signal line VSL for each column, and is supplied to each ADC 70 through a connection unit between the pixel unit 2010 and the memory+logic unit 2011. The pixel data output from each ADC 70 is supplied to, for example, the interface circuit 60 via the logic circuit 40.

In the example of the section (b) of FIG. 6, each ADC 70 is arranged in a region corresponding to the pixel array unit 11 in a matrix array corresponding to each pixel arranged in the pixel array unit 11 on the second substrate. Each pixel included in the pixel array unit 11 and each ADC 70 are connected to each other between the first substrate and the second substrate through the connection unit provided in each ADC 70. The pixel signal output from each pixel is converted into pixel data by the corresponding ADC 70, and the pixel data is supplied to the interface circuit 60.

In the example of the section (a) of FIG. 6, the pixel signal output from each pixel is transferred by a distance from one end to the other end in the column direction (the vertical direction) of the pixel array unit 11 at the longest distance as indicated as a signal SGLa. On the other hand, in the example of the section (b) of FIG. 6, the pixel signal output from each pixel is transferred from the pixel unit 2010 to the second substrate at the shortest distance. However, the pixel data output from each ADC 70 is transferred by a distance corresponding to a distance from one end to the other end in the column direction of the pixel array unit 11 at the longest distance as indicated as a signal SGLb.

As described above, since the pixels are arranged in a matrix array in the pixel array unit 11, the pixel signal or the pixel data always passes through a long-distance wiring corresponding to the distance from one end to the other end in the column direction of the pixel array unit 11 at some point. In this case, in the example illustrated in the section (a) of FIG. 6, the signal is the analog signal SGLa, and has a wide band and is easily affected by noise. On the other hand, in the example illustrated in the section (b), the signal passing through the long-distance wiring is the digital signal SGLb, the band is narrower than that of the analog signal SGLa, and the signal is hardly affected by noise.

Figure 7:
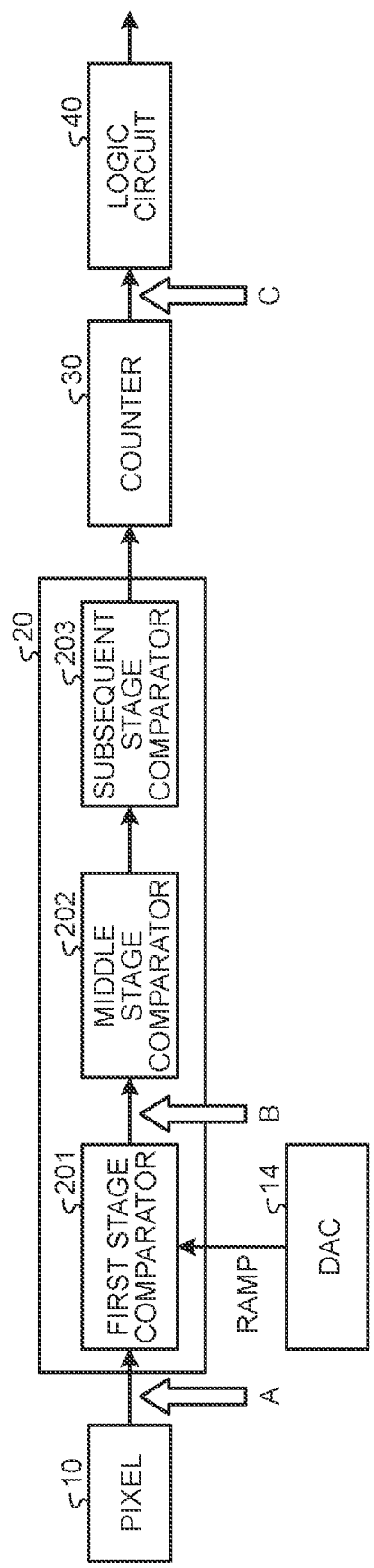
FIG. 7 is a schematic diagram schematically illustrating signal processing on the pixel signal according to each embodiment.

FIG. 7 is a schematic diagram schematically illustrating signal processing on a pixel signal according to each embodiment. In each embodiment of the present disclosure, the comparator 20 is divided into a plurality of circuits. In the example of FIG. 7, the comparator 20 is divided into three circuits including a first stage comparator 201, a middle stage comparator 202, and a subsequent stage comparator 203. The first stage comparator 201 corresponds to the first circuit described with reference to FIG. 5, and includes, for example, a circuit that compares the pixel signal output from the pixel 10 with the RAMP signal supplied from the DAC 14. The middle stage comparator 202 and the subsequent stage comparator 203 correspond to the second circuit described with reference to FIG. 5, and compare the output of the first circuit with a threshold value. The middle stage comparator 202 and the subsequent stage comparator 203 can be configured as one circuit.

Here, the long-distance wiring described with reference to the section (a) of FIG. 6 is arranged at a boundary A between the pixel 10 and the first stage comparator 201 in the existing technology. Furthermore, in the in-pixel ADC architecture in which the comparator 20 and the counter 30 are included in the pixel 10, the long-distance wiring is arranged at a boundary C between the counter 30 and the logic circuit 40. On the other hand, in each embodiment of the present disclosure, as described with reference to the section (b) of FIG. 6, the long-distance wiring is arranged at a boundary B between the first stage comparator 201 and the middle stage comparator 202.

Example of Region Division of Pixel Array Unit

Figure 8:
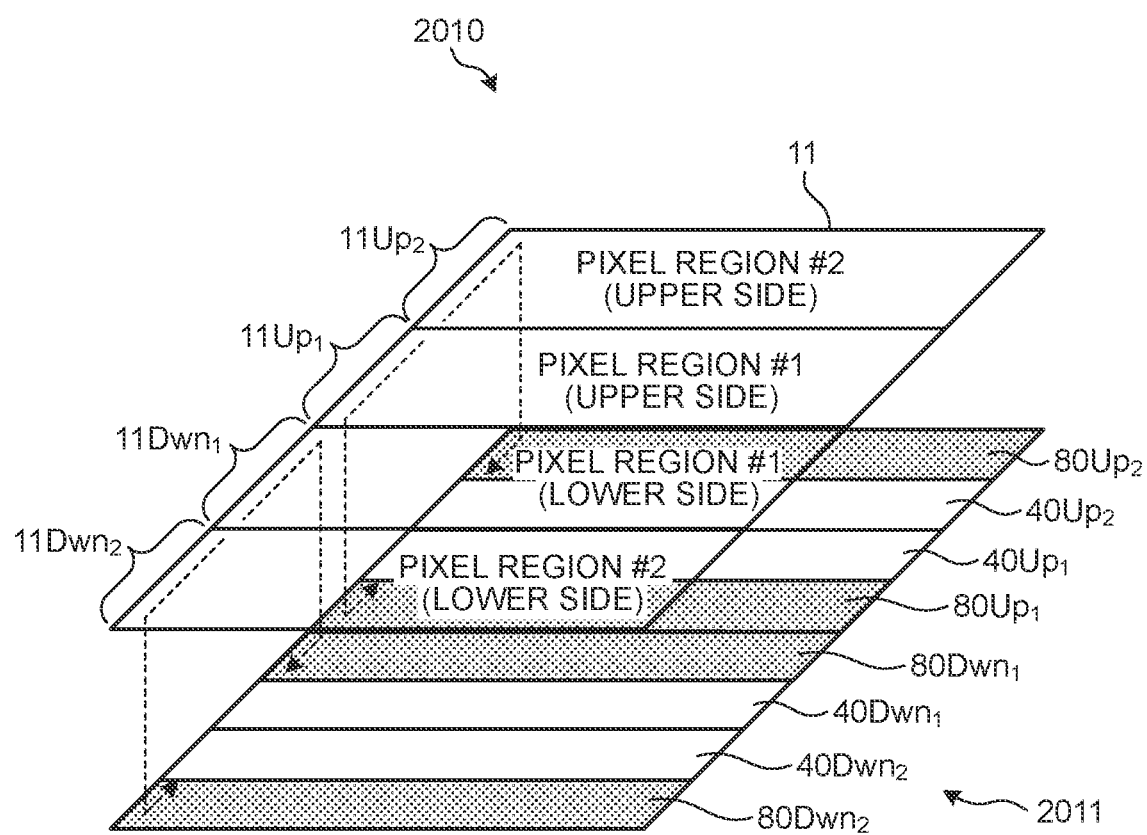
FIG. 8 is a schematic diagram illustrating an example in which a pixel array unit is divided into a plurality of regions in the vertical direction.

By dividing the pixel array unit 11 into a plurality of regions in the vertical direction and transferring the pixel signal for each divided region, it is possible to shorten a distance over which the pixel signal is transferred. FIG. 8 is a schematic diagram illustrating an example in which the pixel array unit 11 is divided into a plurality of regions in the vertical direction.

In the example of FIG. 8, in the pixel unit 2010, the pixel array unit 11 is divided into four regions including pixel regions 11Up$_1$ and 11Up$_2$ and pixel regions 11Dwn$_1$ and 11Dwn$_2$ in the vertical direction. Among them, the pixel regions 11Up$_1$ and 11Up$_2$ are upper first and second pixel regions, respectively, and the pixel regions 11Dwn$_1$ and 11Dwn$_2$ are lower first and second pixel regions, respectively.

In the memory+logic unit 2011, an analog circuit 80Up$_1$ and a logic circuit 40Up$_1$ are arranged at positions corresponding to the pixel region 11Up$_1$, and an analog circuit 80Up- and a logic circuit 40Up$_2$ are arranged at positions corresponding to the pixel region 11Up$_2$. Similarly, an analog circuit 80Dwn$_1$ and a logic circuit 40Dwn$_1$ are arranged at positions corresponding to the pixel region 11Dwn$_1$, and an analog circuit 80Up$_2$ and a logic circuit 40Dwn$_2$ are arranged at positions corresponding to the pixel region 11Up$_2$.

It is noted that the analog circuits 80Up$_1$, 80Up$_2$, 80Dwn$_1$, and 80Dwn$_2$ each include, for example, the pixel circuit, the comparator 20, and the counter 30.

The pixel signal output from each pixel of the pixel region 11Up$_1$ is transferred from the end of the pixel region 11Up1 to the memory+logic unit 2011 via the vertical signal line in the pixel region 11Up1 for each row, and is input to the analog circuit 80Up$_1$. The output of the analog circuit 80Up$_1$ is input to the logic circuit 40Up$_1$. The same applies to the pixel regions 11Up$_2$, 11Dwn$_1$, and 11Dwn$_2$.

According to the configuration of FIG. 8, the pixel signal output from each pixel is transferred at a distance of ¼ of a distance between the opposite ends in the column direction of the pixel array unit 11 at the longest distance, and is made shorter than the transfer distance described in the section (a) of FIG. 6. However, a point at which the pixel signal is transferred via the vertical signal line is the same as the existing configuration. Therefore, the shortened parasitic capacitance of the vertical signal line affects only settling in the pixel 10, and hardly leads to improvement in characteristics such as influence of noise.

On the other hand, in each embodiment of the present disclosure, since the distance over which a charge generated in the pixel 10 is transferred to the first stage comparator 201 is extremely shortened, the settling time in the pixel 10 can be shortened, whereby the reading time of the charge from the pixel 10 can be speeded up. In addition, since the vertical signal line that becomes a large load is connected to the output side of the first stage comparator 201, a bandwidth of the signal transferred to the vertical signal line can be narrowed, and noise can be reduced.

3. First Embodiment

Next, a first embodiment of the present disclosure will be described.

Figure 9:
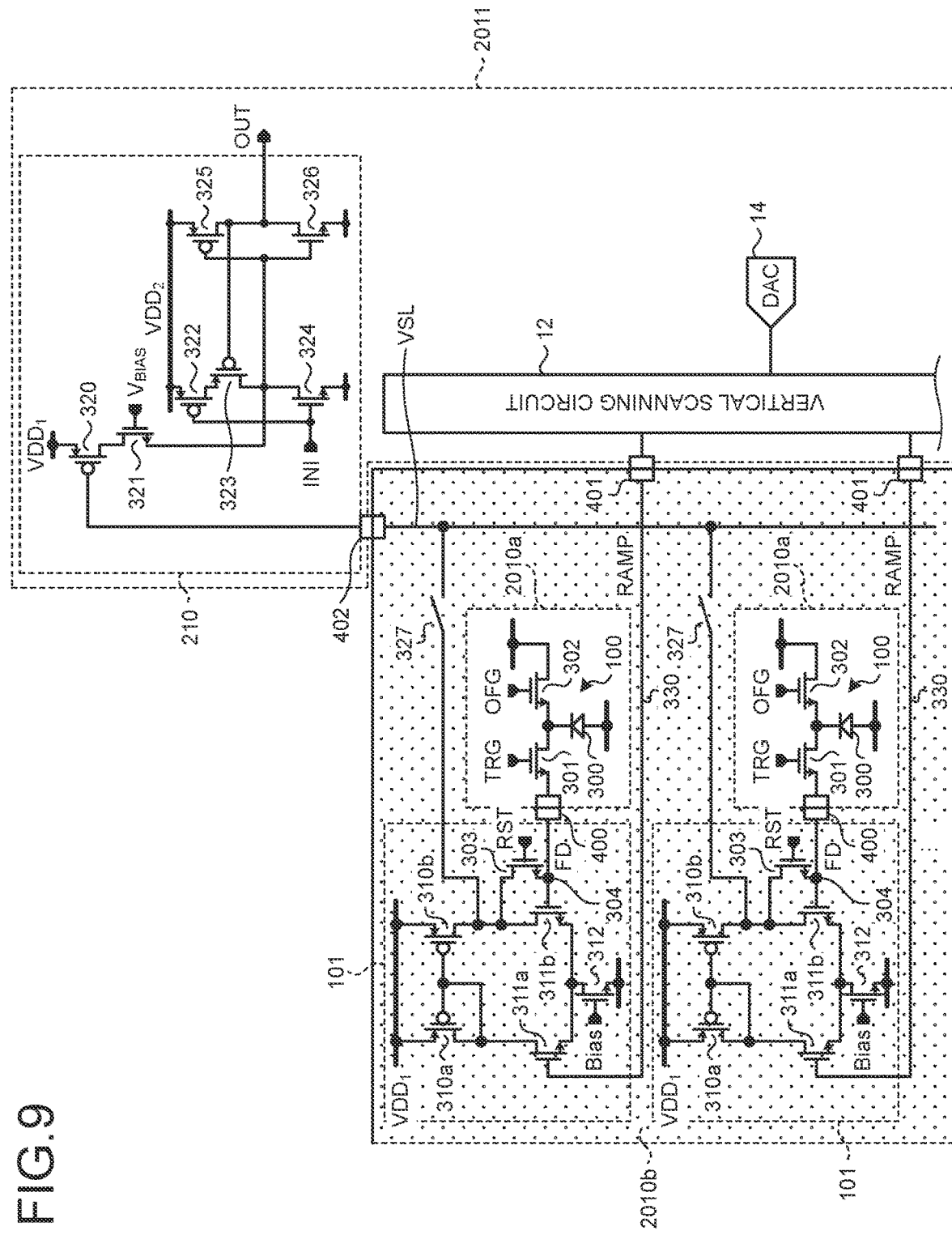
FIG. 9 is a circuit diagram illustrating a configuration of an example according to a first embodiment.

FIG. 9 is a circuit diagram illustrating a configuration of an example according to the first embodiment. It is noted that, in FIG. 9, each drive control signal for driving each pixel 10 supplied from the vertical scanning circuit 12 to each photoelectric conversion unit 100 and the circuit unit 101 is omitted in order to avoid complexity.

In FIG. 9, the photoelectric conversion unit 100 is configured in the first layer 2010$a$ of the pixel unit 2010, and includes a photoelectric conversion element 300 which is, for example, a photodiode, and nMOS transistors 301 and 302 which are n-channel metal oxide semiconductor (MOS) transistors, respectively. The photoelectric conversion element 300 generates and accumulates a charge according to received light. The drain of the nMOS transistor 301 is connected to the cathode of the photoelectric conversion element 300. The non-conduction/conduction state of the nMOS transistor 301 is controlled according to a signal TRG supplied from the vertical scanning circuit 12 to the gate. When the nMOS transistor 301 is in the conduction state, the charges accumulated from the photoelectric conversion element 300 are read out.

In addition, the nMOS transistor 301 has a source connected, via a connection unit 400, from the first layer 2010$a$ to the circuit unit 101 having a position corresponding to that of the photoelectric conversion unit 100 among the circuit units 101 configured in the second layer 2010$b$. It is noted that, as the connection unit 400, a Cu—Cu direct bonding for directly bonding Cu electrodes to each other, a bonding unit including a through silicon via (TSV), a micro-bump, and the like can be applied.

The drain of the nMOS transistor 302 is connected to a power supply line, the source thereof is connected to the cathode of the photoelectric conversion element 300 together with the drain of the nMOS transistor 301, and the non-conduction/conduction state thereof is controlled by a signal OFG supplied from the vertical scanning circuit 12 to the gate thereof. In the conduction state of the nMOS transistor 302, the charges accumulated in the photoelectric conversion element 300 are extracted to, for example, the power supply line.

The circuit unit 101 is configured in the second layer 2010$b$ of the pixel unit 2010. The circuit unit 101 includes a differential pair using nMOS transistors 311$a$ and 311$b$, pMOS transistors 310$a$ and 310$b$, which are p-channel MOS transistors constituting a current mirror circuit, and an nMOS transistor 312 serving as a current source. Sources of the pMOS transistors 310$a$ and 310$b$ are connected to a power supply line VDD$_1$, respectively.

In the circuit unit 101, a connection point 304 at which the connection unit 400 for connection with the photoelectric conversion unit 100 and the gate of the nMOS transistor 311$b$ are connected is a floating diffusion layer (FD). The connection point 304 is further connected to the source of an nMOS transistor 303. The drain of the nMOS transistor 303 is connected to a connection point at which the drain of the nMOS transistor 311$b$ and the drain of the pMOS transistor 310$b$ are connected to each other. The non-conduction/conduction state of the nMOS transistor 303 is controlled according to a signal RST supplied from the vertical scanning circuit 12.

It is noted that the circuit unit 101 (the pixel 10) can share the FD among the plurality of circuit units 101 adjacent to each other. For example, the FD can be shared by four circuit units 101 (the pixels 10) adjacent to each other.

In the conduction state of the nMOS transistor 303, a charge in the FD is extracted to the power supply line $VDD_1$ via the pMOS transistor 310b, and the FD is reset. In the conduction state of the nMOS transistor 301, the charges accumulated in the photoelectric conversion element 300 are transferred to and accumulated in the FD. The FD is connected to the gate of the nMOS transistor 311b. The charges accumulated in the FD are converted into a voltage when read from the FD, and the voltage is supplied to the gate of the nMOS transistor 311b as a pixel signal. As described above, the nMOS transistor 303 and the FD constitute the pixel circuit that outputs the pixel signal based on the charge generated by the photoelectric conversion element 300. Furthermore, the FD functions as a charge-voltage conversion unit that converts a charge generated by the photoelectric conversion element 300 into a voltage.

The gate of the nMOS transistor 311a is connected to a RAMP wiring 330 to which the RAMP signal (the reference signal) generated by the DAC14 is transmitted. The RAMP signal generated by the DAC14 is supplied to the vertical scanning circuit 12. The vertical scanning circuit 12 outputs the RAMP signal to the RAMP wiring 330 for each row of the matrix array of the circuit unit 101, for example, via a connection unit 401. It is noted that, as the connection unit 401, a Cu—Cu direct bonding for directly bonding Cu electrodes to each other, a bonding unit including a through silicon via (TSV), a micro-bump, and the like can be applied.

The differential pair compares the RAMP signal supplied to the gate of the nMOS transistor 311a with the pixel signal supplied to the gate of the nMOS transistor 311b. A comparison result by an actuation pair is output from a connection point at which the drain of the pMOS transistor 310b and the drain of the nMOS transistor 311b are connected to each other as a voltage of a difference between the two transistors. This differential voltage is supplied to the vertical signal line VSL via a switch circuit 327. The switch circuit 327 is, for example, a row selection switch, the non-conduction/conduction state of which is controlled in units of rows according to a drive signal output from the vertical scanning circuit 12.

The vertical signal line VSL is connected from the second layer 2010b to the second circuit 210 configured in the memory+logic unit 2011 via a connection unit 402 by Cu—Cu coupling or the like. It is noted that, as the connection unit 402, a Cu—Cu direct bonding for directly bonding Cu electrodes to each other, a bonding unit including a through silicon via (TSV), a micro-bump, and the like can be applied.

In the example of FIG. 9, the second circuit 210 is provided for each column of the array of the pixels 10 in the pixel array unit 11. The second circuit 210 includes pMOS transistors 320, 322, 323, and 325, and nMOS transistors 321, 324, and 326.

The connection unit 402 is connected to the gate of the pMOS transistor 320, and a signal from the vertical signal line VSL is input thereto. The source of the pMOS transistor 320 is connected to the power supply line $VDD_1$, and the drain thereof is connected to the drain of the nMOS transistor 321. The gate of the nMOS transistor 321 is connected to a bias voltage $V_{BIAS}$.

Here, in the second circuit 210, the pMOS transistors 322, 323, and 325 and the nMOS transistors 324 and 326 constitute a positive feedback circuit. The positive feedback circuit is driven by the power supply of a power supply line $VDD_2$, the voltage of which is lower than that of the power supply line $VDD_1$ on which the differential pair is driven. The pMOS transistor 320 and the nMOS transistor 321 constitute a voltage conversion circuit that converts an output from the differential pair into a low voltage signal that can be operated by the positive feedback circuit. It is noted that the bias voltage $V_{BIAS}$ may be any voltage as long as the voltage is converted into a voltage that does not destroy each transistor of the positive feedback circuit operating at a low voltage. For example, the bias voltage VBIAS can be the same voltage as the voltage of the power supply line $VDD_2$ that drives the positive feedback circuit.

The positive feedback circuit outputs a comparison result signal that is inverted in a case where the level of the pixel signal is higher than the level of the reference signal (the RAMP signal) based on a signal obtained by converting the output signal from the differential pair into a low voltage. This positive feedback circuit increases the transition speed when an output signal OUT output as the comparison result signal is inverted.

In the positive feedback circuit, a source of the nMOS transistor 321, which is an output terminal of the voltage conversion circuit, is connected to the drains of the pMOS transistor 323 and the nMOS transistor 324 and the gates of the pMOS transistor 325 and the nMOS transistor 326. Sources of the pMOS transistors 322 and 325 are connected to the power supply line $VDD_2$, the drain of the pMOS transistor 322 is connected to the source of the pMOS transistor 323, and the gate of the pMOS transistor 323 is connected to the drains of the pMOS transistor 325 and the nMOS transistor 326, which are also output terminals of the positive feedback circuit. Sources of the nMOS transistors 324 and 326 are connected to a predetermined voltage, for example, a ground potential. An initialization signal INI is supplied to the gates of the pMOS transistor 322 and the nMOS transistor 324, respectively.

The pMOS transistor 325 and the nMOS transistor 326 constitute an inverter circuit, and a connection point between the drains thereof is an output terminal at which the second circuit 210 outputs the output signal OUT.

As described above, in the configuration according to the first embodiment, the charge generated by the photoelectric conversion element 300 in the photoelectric conversion unit 100 is provided in the second layer 2010b formed integrally with the first layer 2010a provided with the photoelectric conversion unit 100, and is transferred to the circuit unit 101, the position of which corresponds to that of the photoelectric conversion unit 100. The circuit unit 101 converts an analog type pixel signal based on the charge transferred from the photoelectric conversion unit 100 into a digital type pixel signal (pixel data), and outputs the digital type pixel signal. According to this configuration, since the charge read from the photoelectric conversion unit 100 is transferred to the circuit unit 101 at an extremely short distance, it is possible to suppress the influence of noise at the time of transferring the charge.

(Focal Plane Distortion)

Focal plane distortion according to the first embodiment will be described. In the rolling shutter system, since the exposure of the photoelectric conversion element 300 is performed row by row, an exposure timing of each row is different in the vertical direction (the column direction), and so-called focal plane distortion may occur in a captured image.

FIG. 10A is a schematic diagram illustrating the focal plane distortion in a case where the pixel array unit 11 is divided into two regions in the vertical direction. It is noted that, in FIG. 10A, analog to digital converters (ADCs) 70Up and 70Dwn include the comparator 20 and the counter 30, respectively. Further, configurations of the logic circuit 40, the interface circuit 60, and the like are omitted.

A section (a) of FIG. 10A illustrates an example in which the pixel array unit 11 is divided into two regions of a pixel region 11Up and a pixel region 11Dwn. In this case, the vertical signal line VSL is divided in a boundary region 150a between the pixel region 11Up and the pixel region 11Dwn, and the pixel signal is supplied from the first layer 2010a to the second layer 2010b in the boundary region 150a, as schematically indicated by a mark "×(cross)" in the drawing.

A section (b) of FIG. 10A illustrates an example of arrangement of the ADCs 70Up and 70Dwn corresponding to the pixel regions 11Up and 11Dwn in the second layer 2010b. In this example, the ADCs 70Up and 70Dwn are provided on the opposite sides of a boundary region 150b corresponding to the boundary region 150a in the first layer 2010a. It is noted that the ADCs 70Up and 70Dwn are provided for each vertical signal line VSL.

Here, for the sake of explanation, it is assumed that an analog type pixel signal output from each pixel included in the pixel array unit 11 is converted into pixel data by the ADC 70, and the pixel data is output to the outside via the logic circuit 40 and the interface circuit 60 (not illustrated).

The vertical signal line VSL is connected to the corresponding ADCs 70Up and 70Dwn from the boundary region 150a in which the vertical signal line VSL is divided in the first layer 2010a via the boundary region 150b of the second layer 2010b.

In such a configuration, control is switched such that, for example, reading of a charge from the photoelectric conversion unit 100 is performed row by row from the lower end to the upper end of the pixel region 11Dwn in the diagram, and reading is performed from the lower end of the pixel region 11Up when reaching the upper end of the pixel region 11Dwn. In this way, a read operation is smoothly connected between the pixel region 11Up and the pixel region 11Dwn, and focal plane distortion is suppressed, as illustrated as an image 90a in a section (c) of FIG. 10A.

Figure 10B:
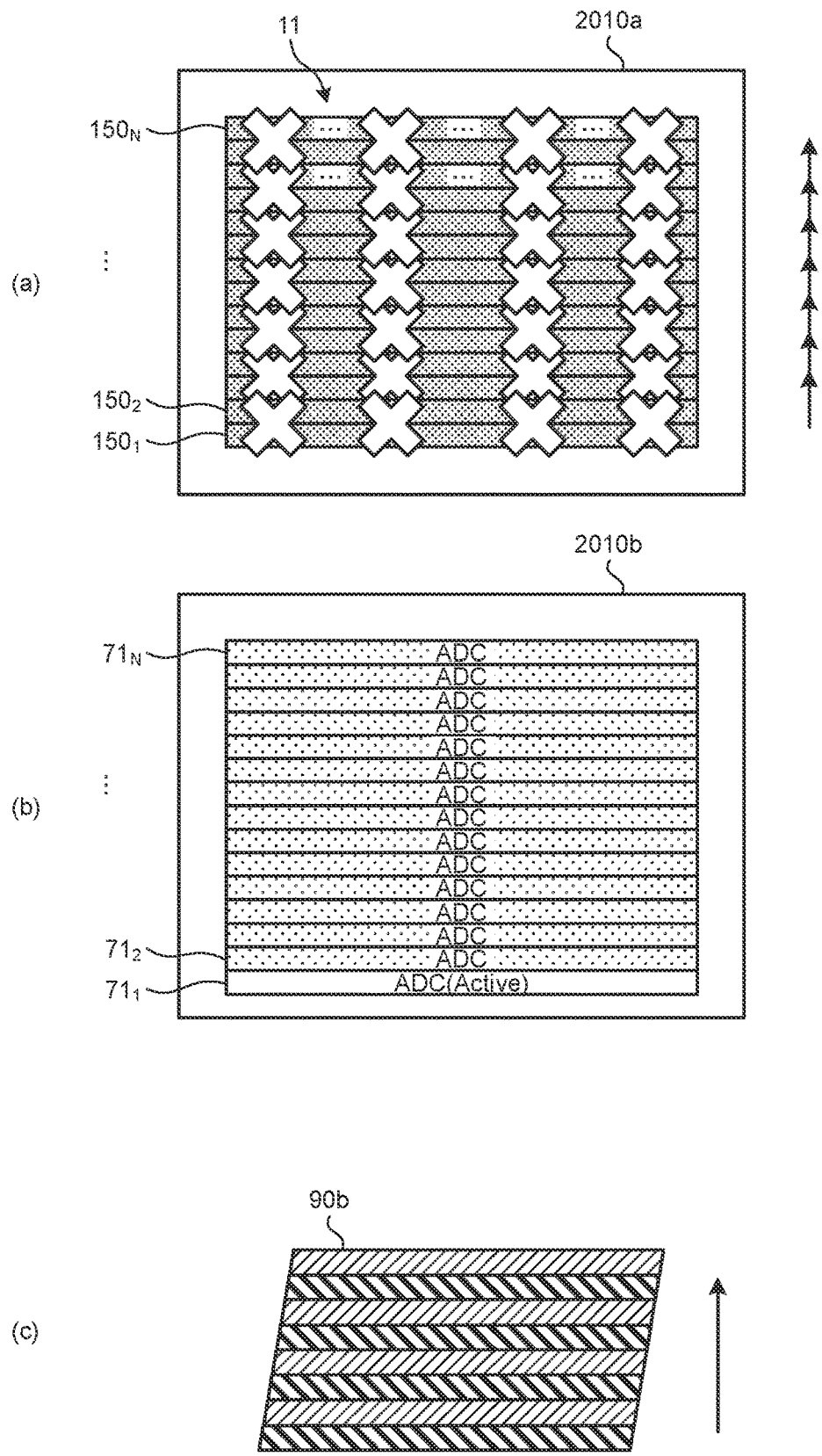
FIG. 10B is a schematic diagram illustrating focal plane distortion in the configuration according to the first embodiment.

FIG. 10B is a schematic diagram illustrating focal plane distortion in the configuration according to the first embodiment. It is noted that FIG. 10B is a diagram for description, and the configurations of the logic circuit 40, the interface circuit 60, and the like are omitted. Furthermore, in the pixel array unit 11, it is assumed that a matrix array in which the photoelectric conversion unit 100 and the circuit unit 101 are arranged includes N rows. That is, the pixel array unit 11 includes N pixels 10 in the column direction. It is noted that, in a case where the plurality of circuit units 101 share the FD, the value N is a sharing unit of the FD.

In the first embodiment, each photoelectric conversion unit 100 provided in the first layer 2010a includes the first stage comparator 201 (the first circuit) in the comparator 20. Therefore, the pixel array unit 11 can be regarded as being divided in units of rows in the column direction, and the vertical signal line VSL can be regarded as being divided into N in the boundary regions $150_1$, $150_2$, ..., and $150_N$ of each row.

A section (b) in FIG. 10B illustrates an example of the arrangement of ADCs $71_1$, $71_2$, ..., and $71_N$ in the second layer 2010b. In this example, each of the ADCs $71_1$, $71_2$, ..., and $71_N$ includes the second circuit 210 and is provided corresponding to each of the boundary regions $150_1$, $150_2$, ..., and $150_N$ in the first layer 2010a.

It is noted that, in the drawing, each of the ADCs $71_1$, $71_2$, ..., and $71_N$ is illustrated as being provided in units of rows, but in practice, each of the ADCs $71_1$, $71_2$, ..., and $71_N$ includes the circuit unit 101 (the first circuit) for each row. Therefore, the charge read from the photoelectric conversion unit 100 is transferred to the corresponding circuit unit 101 provided in the second layer 2010b for each photoelectric conversion unit 100, as schematically indicated by a mark "×(cross)" in the drawing.

Each of the ADCs $71_1$, $71_2$, ..., and $71_N$ is activated for each row and sequentially performs conversion processing into a pixel signal and comparison processing with a reference signal on the charge read from each photoelectric conversion unit 100 to be similarly exposed for each row.

According to this configuration, since reading of the charge from the photoelectric conversion unit 100 is performed row by row, the reading processing is smoothly connected, and focal plane distortion is suppressed, as illustrated as an image 90b in FIG. 10B.

As described above, in each of the examples of FIGS. 10A and 10B, it is possible to suppress the focal plane distortion. On the other hand, in the case of the configuration of FIG. 10A, in the pixel regions 11Up and 11Dwn, the vertical signal line VSL is ½ of the length in the vertical direction of the pixel array unit 11 at the longest distance.

On the other hand, in the configuration of FIG. 10B according to the first embodiment, the charge read from the photoelectric conversion unit 100 is transferred to the corresponding circuit unit 101 provided in the second layer 2010b for each photoelectric conversion unit 100. Therefore, the length of the wiring or connection corresponding to the vertical signal line VSL is the length from the first layer 2010a to the second layer 2010b in the direction perpendicular to the substrate surface, and is extremely short compared to the case of FIG. 10A, and the influence of noise can be further suppressed.

In the configuration of FIG. 10B, depending on the size of the substrate, the second layer 2010b may be filled with the ADCs $71_1$, $71_2$, ..., and $71_N$, and other configurations may not be arranged. Therefore, as illustrated in the section (c) of FIG. 10C, it is preferable to arrange the logic circuit 40 and the interface circuit 60 in the memory+logic unit 2011.

Figure 10C:
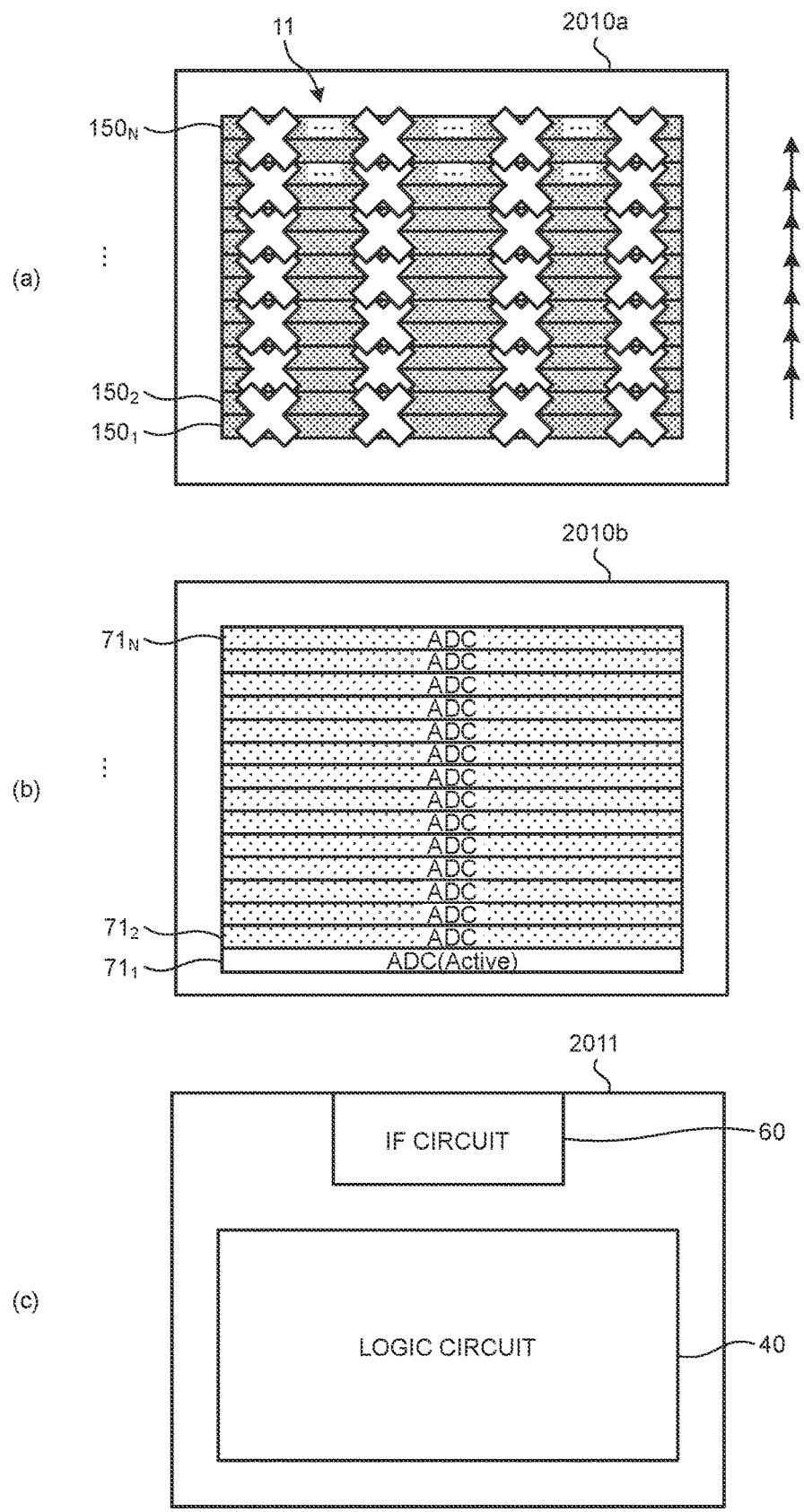
FIG. 10C is a schematic diagram illustrating that a logic circuit and an interface circuit are arranged in a memory+a logic unit.

It is noted that, since the section (a) and the section (b) in FIG. 10C are common to the section (a) and the section (b) in FIG. 10B, a description thereof is omitted here.

It is noted that, if the comparator 20 and the counter 30 can be configured for each pixel 10, an operation as a global shutter becomes possible. However, in particular, in a camera for mobile use, since the size of the pixel cell is required to be small, it is difficult to configure the comparator 20 and the counter 30 for each pixel 10.

(Regarding RAMP Wiring and Each Connection Unit)

Figure 11:
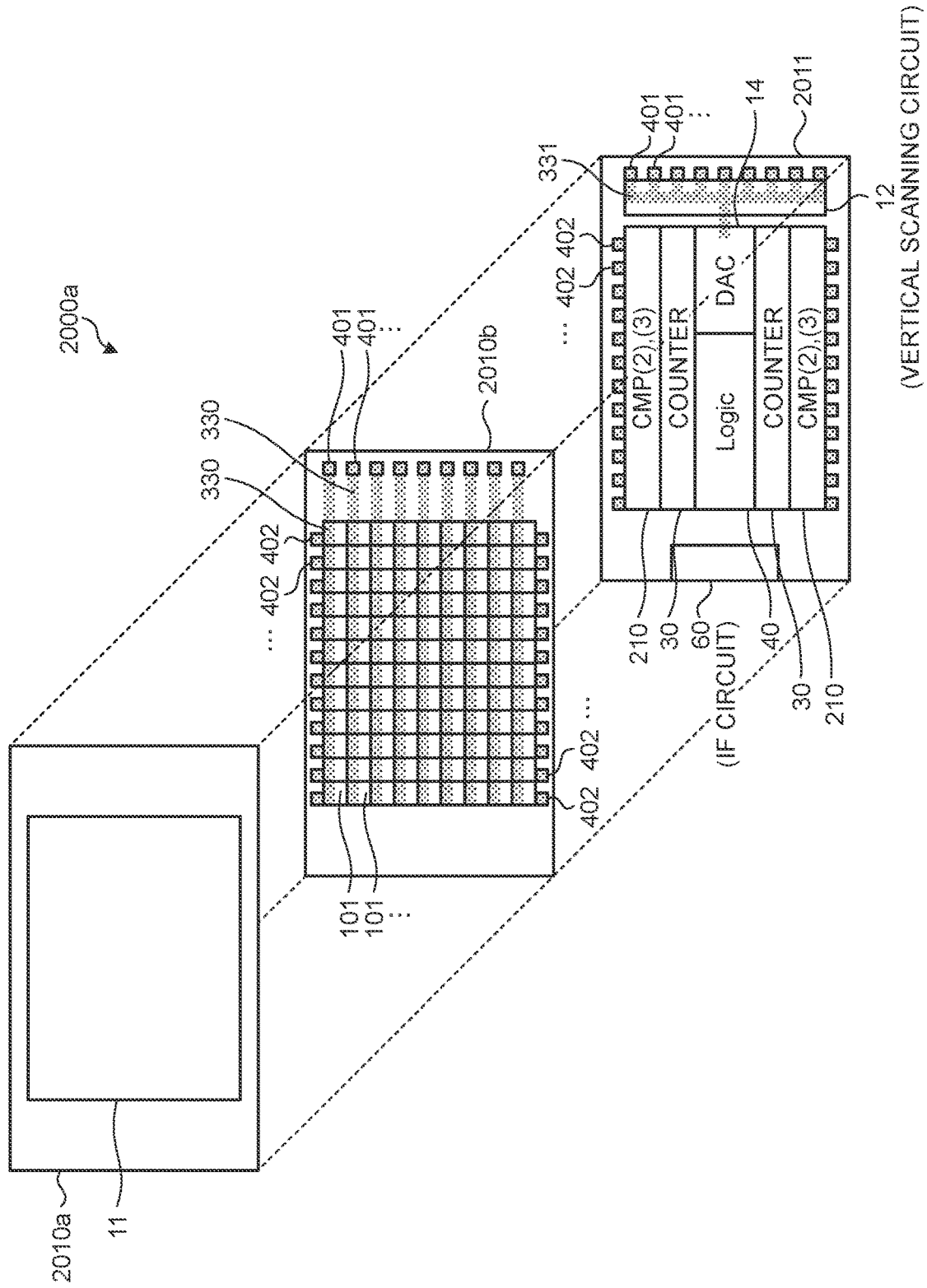
FIG. 11 is a schematic diagram illustrating an arrangement example of a RAMP wiring and each connection unit according to the first embodiment.

FIG. 11 is a schematic diagram illustrating an arrangement example of the RAMP wiring and each connection unit according to the first embodiment. In the second layer 2010b, the circuit units 101 are arranged in a matrix array corresponding to the respective photoelectric conversion units 100 in the pixel array unit 11 of the first layer 2010a. As described with reference to FIG. 9, the connection unit 402 connects the vertical signal line VSL provided for each column on the second substrate to the second circuit 210 provided for each column in the memory+logic unit 2011. The connection units 402 are provided at the opposite ends of the respective columns in the array of the second circuits 210 in the second layer 2010b.

For the second layer 2010b, the RAMP wiring 330 for supplying the RAMP signal to the circuit unit 101 is provided for each row in the matrix array of the circuit unit 101. One end (the right end in the example of the drawing) of each RAMP wiring 330 is connected to the connection unit 401.

In the memory+logic unit 2011, the vertical scanning circuit 12 is provided on one end side (the right end side in the example of the drawing) of the substrate in the horizontal direction (corresponding to the row direction in the matrix array of the circuit unit 101). In addition, the interface circuit 60 is provided on the other end side of the substrate in the horizontal direction. In the memory+logic unit 2011, the second circuit 210, the counter 30, the logic circuit 40, and the DAC 14 are arranged in a region between the vertical scanning circuit 12 and the interface circuit 60, for example, corresponding to the matrix array of the circuit unit 101.

In the example of the drawing, the logic circuit 40 is arranged on the interface circuit 60 side (left side), and the DAC 14 is arranged on the vertical scanning circuit 12 side (right side) with respect to the central portion of the region in the vertical direction. On the opposite sides of the central portion in the vertical direction, the counter 30 is arranged corresponding to each column of the matrix array of the circuit unit 101. The second circuit 210 is arranged on the further outer side of the counter 30 corresponding to each column. It is noted that, in the example of the drawing, each counter 30 and each second circuit 210 corresponding to each column are illustrated as one block.

Each connection unit 402 is provided at each end of each second circuit 210 corresponding to each side of the memory+logic unit 2011 in the vertical direction. In the second layer 2010b, a signal output from each circuit unit 101 to the vertical signal line VSL is supplied to each second circuit 210 via each connection unit 402.

The RAMP signal generated by the DAC 14 is supplied to the vertical scanning circuit 12 via a wiring 331. The vertical scanning circuit 12 outputs the RAMP signal supplied from the DAC 14 to each connection unit 401 provided for each row of the matrix array of the circuit unit 101. The RAMP signal is transferred from the memory+logic unit 2011 to the second layer 2010b via each connection unit 401, and is supplied to the circuit unit 101 for each row.

3-1. First Modification of First Embodiment

Next, a first modification of the first embodiment will be described. The first modification of the first embodiment is an example in which a latch circuit that latches a comparison result is connected to a first circuit that compares a pixel signal with a RAMP signal corresponding to the first stage comparator 201 among the respective units (refer to FIG. 7) in which the comparator 20 is divided.

Figure 12A:
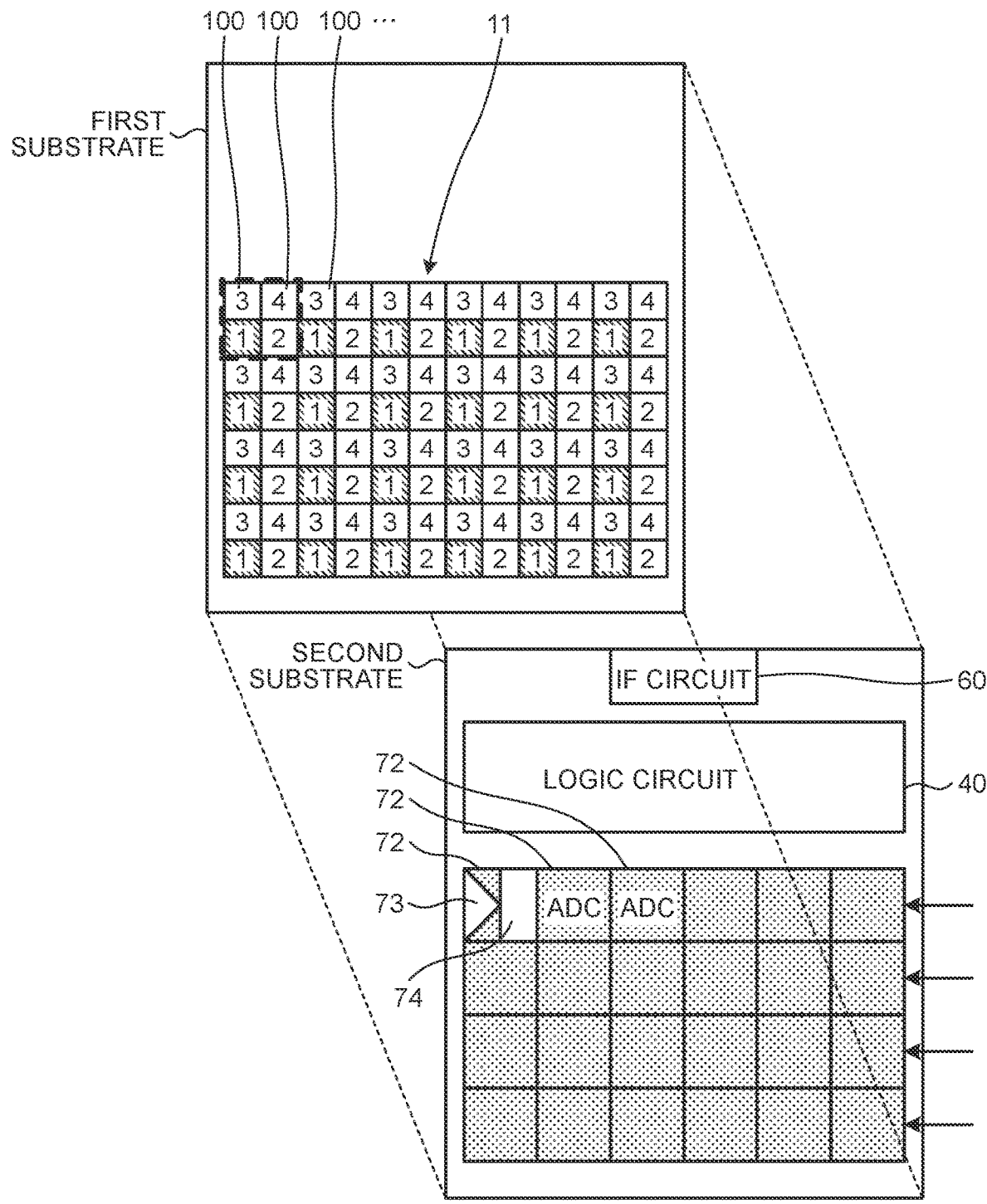
FIG. 12A is a schematic diagram illustrating an example of performing an operation corresponding to a global shutter system in a configuration of a first modification of the first embodiment.

FIG. 12A is a schematic diagram illustrating an example of performing an operation corresponding to a global shutter system in a configuration of the first modification of the first embodiment.

In FIG. 12A, the pixel array unit 11 in which the photoelectric conversion units 100 are arranged in a matrix array is provided on the first substrate. Here, in the photoelectric conversion unit 100, the FD to which the charge generated by the photoelectric conversion element 300 is transferred is shared by the four photoelectric conversion units 100 adjacent to each other. In the example of FIG. 12A, one FD is shared in units of four photoelectric conversion units 100 denoted by numbers (1) to (4). The four photoelectric conversion units 100 in the FD sharing unit are exposed, for example, in the order of the numbers (1) to (4)

In FIG. 12A, an ADC 72 is arranged on the second substrate for each FD sharing unit. Each ADC 72 includes a first circuit 73 including a circuit for comparing the pixel signal with the RAMP signal, and a latch circuit 74 for latching the output of the first circuit 73. The first circuit 73 can correspond to, for example, the circuit unit 101 described above.

In such a configuration, for example, the imaging device 1004 simultaneously performs exposure in each of the photoelectric conversion units 100 of the number (1). A charge generated by each photoelectric conversion unit 100 by the exposure is transferred to the FD, converted into a voltage, and supplied to each ADC 72 as a pixel signal. In each ADC 72, the supplied pixel signal is compared with the RAMP signal in the first circuit 73, and a comparison result is latched in the latch circuit 74. The comparison result latched by each latch circuit 74 is read from the latch circuit 74 for each row and converted into pixel data by the second circuit 210 (not illustrated), and the pixel data is output to the outside via the logic circuit 40 and the interface circuit 60.

As described above, by providing the latch circuit 74 for each photoelectric conversion unit 100 or for each FD sharing unit in a case where the plurality of photoelectric conversion units 100 share the FD, the imaging device 1004 can perform an operation corresponding to the global shutter system.

Figure 12B:
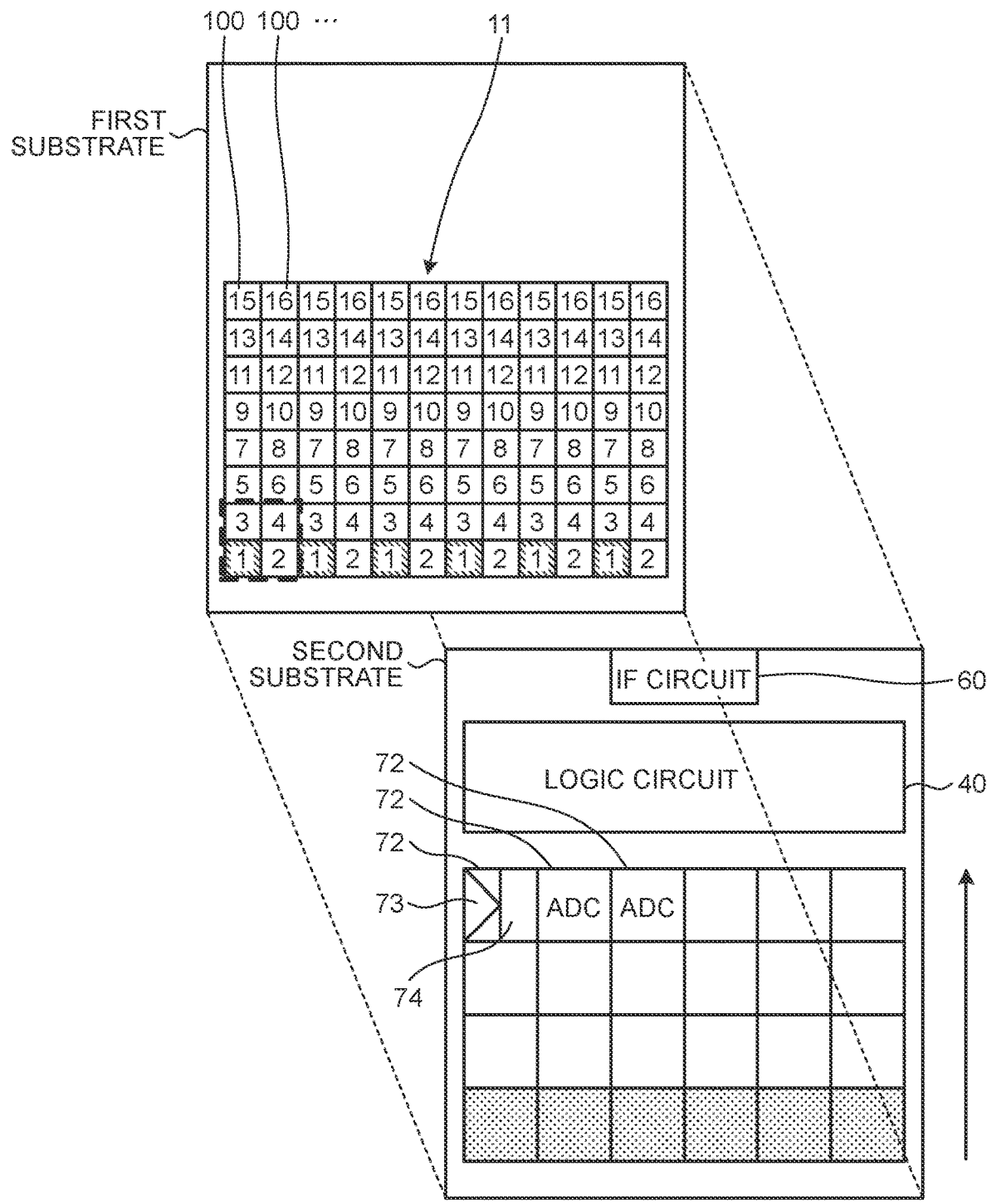
FIG. 12B is a schematic diagram illustrating an example in which an operation by a rolling shutter system is performed in the configuration of the first modification of the first embodiment.

FIG. 12B is a schematic diagram illustrating an example in which an operation by a rolling shutter system is performed in the configuration of the first modification of the first embodiment similar to FIG. 12A. It is noted that, in FIG. 12B, since the configurations of the first substrate and the second substrate are the same as those illustrated in FIG. 12A, a detailed description thereof will be omitted.

It is noted that, in FIG. 12B, rows and columns are defined according to the FD sharing unit. That is, in the second substrate, the ADCs 72 are arranged in the array of 4 rows×6 columns. Further, it is assumed that each row is a first row, a second row, . . . from the bottom to the top in the drawing.

In such a configuration, for example, the imaging device 1004 simultaneously performs exposure in each photoelectric conversion unit 100 of number (1) in the FD sharing unit corresponding to each ADC 72 in the first row. A charge generated by each photoelectric conversion unit 100 by the exposure is transferred to the FD, converted into a voltage, and supplied to each ADC 72 in the first row as a pixel signal. In each ADC 72, the supplied pixel signal is compared with the RAMP signal in the first circuit 73, and a comparison result is latched in the latch circuit 74. The latched comparison result is read from the latch circuit 74 and converted into pixel data by the second circuit 210 (not illustrated), and the pixel data is output to the outside via the logic circuit 40 and the interface circuit 60.

This operation is sequentially executed for each of the photoelectric conversion units 100 of the numbers (1) to (4) included in the FD sharing unit corresponding to each of the ADCs 72 in the first row, and as described above, conversion from a charge to a voltage and generation of pixel data based on the voltage are performed. When the exposure of the respective photoelectric conversion units 100 of the numbers (1) to (4) is completed, next, the above-described operations are sequentially executed similarly for the photoelectric conversion units 100 of numbers (5) to (8) included in the FD sharing unit corresponding to the ADCs 72 of the second row. By sequentially executing these operations in the third row, the fourth row, . . . , the operation of the rolling shutter system is possible.

It is noted that, in the operation of the rolling shutter system, the latch operation by the latch circuit 74 or the latch circuit 74 itself can be omitted.

3-2. Second Modification of First Embodiment

Next, a second modification of the first embodiment will be described. The second modification of the first embodiment is an example in which the configurations of the second layer and the memory+logic unit 2011 according to the first embodiment illustrated in FIGS. 5 and 11 are changed.

Figure 13:
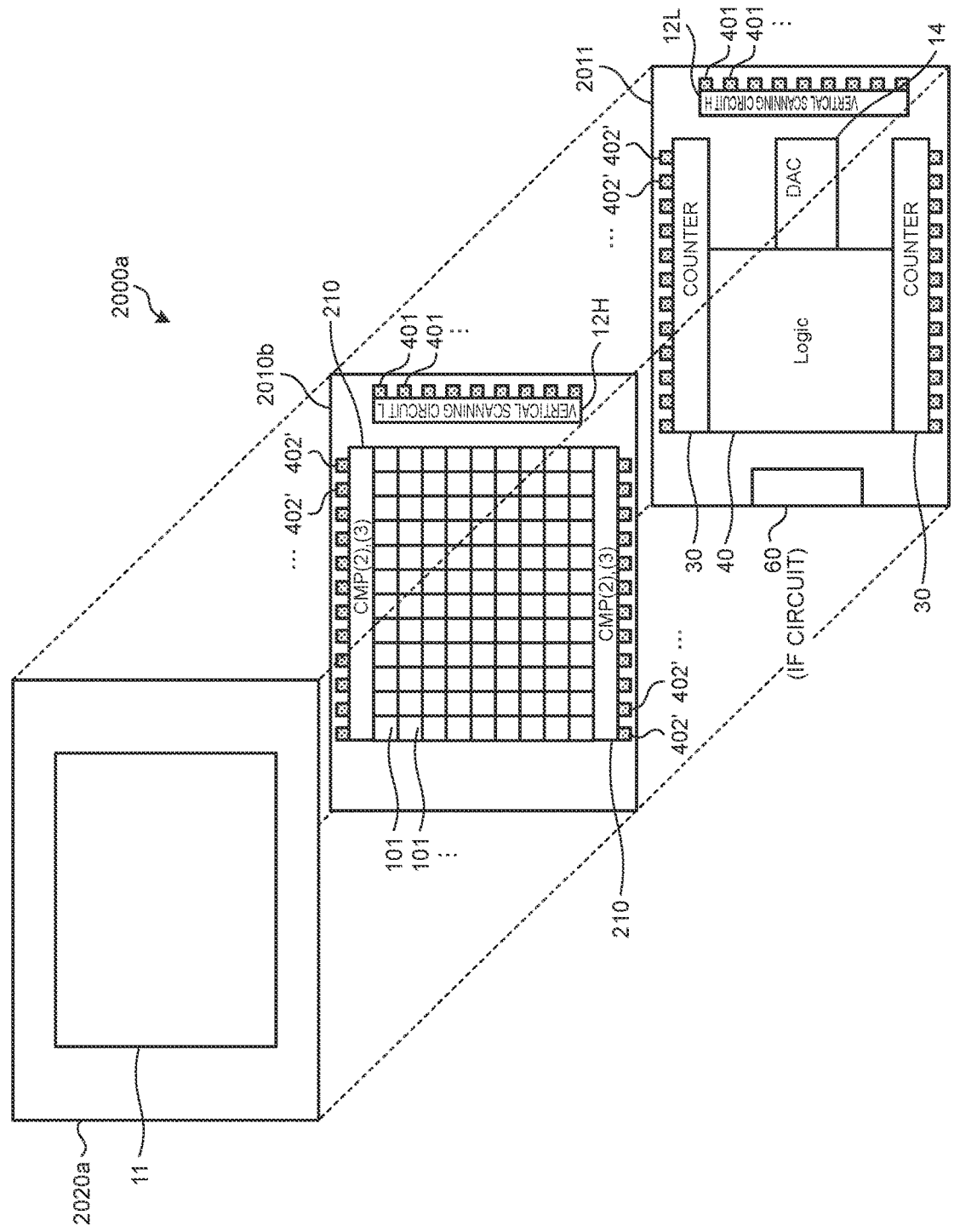
FIG. 13 is a schematic diagram illustrating a configuration of an example of an imaging device according to a second modification of the first embodiment.

FIG. 13 is a schematic diagram illustrating a configuration of an example of the imaging device 1004 according to the second modification of the first embodiment. In the example of FIG. 13, the imaging device 1004 applies the solid-state imaging element 2000a having the two-layer structure described with reference to FIG. 4A. Hereinafter, the configuration according to the second modification of the first embodiment will be described in comparison with the configurations of FIGS. 5 and 11 according to the first embodiment.

In the configurations of FIGS. 5 and 11 according to the first embodiment, the vertical scanning circuit 12 is arranged in the memory+logic unit 2011. On the other hand, in the second modification of the first embodiment, as illustrated in FIG. 13, the vertical scanning circuit 12 is divided into two portions including a vertical scanning circuit 12L and a vertical scanning circuit 12H (in the drawing, also described as the vertical scanning circuit L and the vertical scanning circuit H). Then, the vertical scanning circuit 12L is arranged in the memory+logic unit 2011, and the vertical scanning circuit 12H is arranged in the second layer 2010b. For example, the vertical scanning circuits 12L and 12H respectively drive the photoelectric conversion units 100 and the circuit units 101 in one and the other regions obtained by dividing the pixel array unit 11 into two in the column direction.

In addition, in the configurations of FIGS. 5 and 11 according to the first embodiment, the second circuit 210 of each column is arranged in the memory+logic unit 2011. On the other hand, in the second modification of the first embodiment, as illustrated in FIG. 13, the second circuit 210 of each column is arranged in the second layer 2010b. More specifically, the second circuits 210 are respectively arranged at the upper end and the lower end in the column direction of each circuit unit 101 arranged in a matrix array in the second layer 2010b. Each of the second circuits 210 is connected to each of the counters 30 arranged on the upper end side and the lower end side in the column direction of the memory+logic unit 2011 via a connection unit 402' by Cu—Cu coupling or the like.

Which one of the configuration according to the first embodiment illustrated in FIGS. 5 and 11 and the configuration according to the second modification of the first embodiment illustrated in FIG. 13 is adopted can be determined according to, for example, the state of each chip at the time of mounting. For example, in a case where a large area is required for the pixel unit 2010 (the first layer 2010a and the second layer 2010b), the configurations of FIGS. 5 and 11 are adopted so that many circuits can be arranged in the memory+logic unit 2011. Furthermore, for example, in a case where a large area is required for the logic circuit 40 or the like in the memory+logic unit 2011, the configuration of FIG. 13 is adopted, and for example, the second circuit 210 is arranged not in the memory+logic unit 2011 but in the second layer 2010b. By changing these arrangements, the overall size of the imaging device 1004, that is, the solid-state imaging element 2000a can be reduced in some cases.

It is noted that, in the above description, the vertical scanning circuit 12 is divided into two portions of the vertical scanning circuits 12L and 12H, the vertical scanning circuits 12L and 12H are arranged in the memory+logic unit 2011 and the second layer 2010b, respectively, and the second circuit 210 is arranged in the second layer 2010b, but the present invention is not limited to this example. For example, the second circuit 210 may be arranged in the second layer 2010b without dividing the vertical scanning circuit 12. In addition, the second circuit 210 may be arranged in the memory+logic unit 2011, the vertical scanning circuit 12 may be divided into two vertical scanning circuits 12L and 12H, and the vertical scanning circuits 12L and 12H may be arranged in the memory+logic unit 2011 and the second layer 2010b, respectively. Furthermore, the vertical scanning circuit 12 may be arranged in the second layer 2010b, or the counter 30 may be arranged in the second layer 2010b in addition to the second circuit 210.

3-3. Third Modification of First Embodiment

Next, a third modification of the first embodiment will be described. The third modification of the first embodiment relates to the arrangement of the first stage comparator 201 and the middle stage comparator 202. FIG. 14 is a schematic diagram illustrating a configuration according to the third modification of the first embodiment. It is noted that, in FIG. 14, the first stage comparator 201 and the middle stage comparator 202 are also denoted as "1st" and "2nd", respectively.

In the above description, as illustrated in an example in the section (a) of FIG. 14, one middle stage comparator 202 is arranged in each column in the pixel array unit 11. That is, the output of each first stage comparator 201 arranged along the column of the pixel array unit 11 is input to one middle stage comparator 202 arranged in the column.

On the other hand, in the third modification of the first embodiment, as illustrated in an example in the section (b) of FIG. 14, a plurality of middle stage comparators 202 are arranged in each column in the pixel array unit 11. For example, when two middle stage comparators 202 are arranged for each column as in the example of the section (b) of FIG. 14, the output of the first stage comparators 201 arranged along the column is input to, for every other first stage comparator 201, the first middle stage comparator $202_1$ and the second middle stage comparator $202_2$ arranged in the column.

As a more specific example, in a case where the first stage comparator 201 is provided corresponding to the arrangement in the matrix array of the pixel array unit 11, the output of the first stage comparator 201 arranged in the odd-numbered row is input to the first middle stage comparator $202_1$. Further, the output of the first stage comparator 201 arranged in the even-numbered row is input to the second middle stage comparator $202_2$.

By arranging the first stage comparator 201 and the middle stage comparator 202 (the second middle stage comparators $202_1$ and $202_2$) in this manner, the output of the first stage comparator 201 can be read simultaneously by a plurality of rows (two rows in this example) at a time, and a higher-speed operation can be performed.

4. Second Embodiment

Next, a second embodiment of the present disclosure will be described. The second embodiment is an example in which the configuration of the circuit unit 101 that compares the RAMP signal with the pixel signal is different from that of the circuit unit 101 in the first embodiment.

Figure 15:
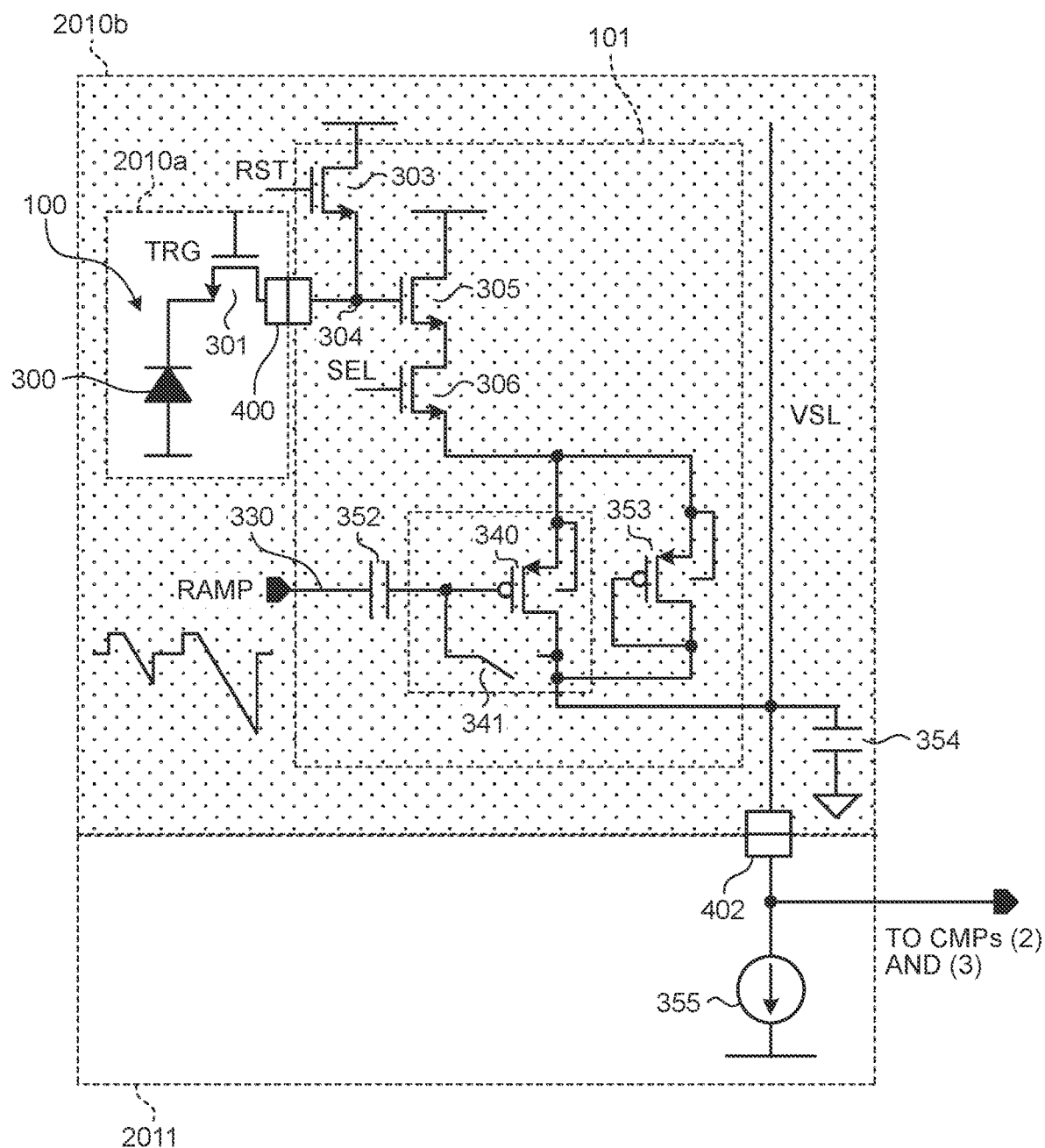
FIG. 15 is a circuit diagram illustrating a configuration of an example according to a second embodiment.

FIG. 15 is a circuit diagram illustrating a configuration of an example according to the second embodiment. It is noted that, in FIG. 15, each drive control signal for driving each pixel 10 supplied from the vertical scanning circuit 12 to each photoelectric conversion unit 100 and the circuit unit 101 is omitted in order to avoid complexity.

In the example of FIG. 15, a pixel circuit that drives the photoelectric conversion element 300 and outputs the pixel signal includes four transistors of nMOS transistors 301, 303, 305, and 306. The source of the nMOS transistor 301 is connected to the cathode of the photoelectric conversion element 300, and the drain thereof is connected to the source of the nMOS transistor 303 and the gate of the nMOS transistor 305 via a connection unit 400.

The non-conduction/conduction state of the nMOS transistor 301 is controlled according to a signal TRG supplied from the vertical scanning circuit 12 to the gate. The photoelectric conversion unit 100 includes the nMOS transistor 301 and the photoelectric conversion element 300.

A connection point 304 at which the drain of the nMOS transistor 301, the source of the nMOS transistor 303, and the gate of the nMOS transistor 305 are connected is defined as an FD. In the conduction state of the nMOS transistor 301, charges accumulated in the photoelectric conversion element 300 are transferred to the FD.

The drain of the nMOS transistor 303 is connected to the power supply line, and the non-conduction/conduction state thereof is controlled according to a signal RST supplied from the vertical scanning circuit 12 to the gate. In the conduction state of the nMOS transistor 303, the charges accumulated in the FD are extracted to the power supply line, and the FD is reset.

The nMOS transistor 305 has a drain connected to the power supply line and a source connected to the drain of the nMOS transistor 306. The source of the nMOS transistor 306 is connected to the sources of pMOS transistors 340 and 353. The non-conduction/conduction state of the nMOS transistor 306 is controlled according to a signal SEL supplied from the vertical scanning circuit 12 to the gate. The signal SEL is a row selection signal for selecting, for each row, a pixel circuit that outputs a signal to a vertical signal line VSL, and the nMOS transistor 306 functions as a row selection transistor that performs row selection.

In response to the signal SEL, the nMOS transistor 306 is in the conduction state, the charge is read from the FD, and the read charge is converted into a voltage to be a pixel signal. This pixel signal is amplified by the nMOS transistor 305, and the amplified pixel signal is input to the sources of the pMOS transistors 340 and 353 via the nMOS transistor 306. In this manner, the nMOS transistor 305 functions as an amplification transistor that amplifies the pixel signal.

The gate of the pMOS transistor 340 is connected to the RAMP wiring 330 via a capacitor 352. In addition, a switch circuit 341 is connected between the gate and the drain of the pMOS transistor 340. The switch circuit 341 controls the non-conduction/conduction state thereof according to an auto zero signal (AZ signal) supplied from the vertical scanning circuit 12. A first circuit corresponding to the first stage comparator 201 is configured by including the pMOS transistor 340 and the switch circuit 341.

The pMOS transistor 353 has a gate and a drain connected to each other and functions as a clamp circuit for the pMOS transistor 340. The drain of the pMOS transistor 353 is connected to the drain of the pMOS transistor 340, and the drain of the pMOS transistor 340 is connected to the vertical signal line VSL. A capacitor 354 connected to the vertical signal line VSL is a parasitic capacitance of the vertical signal line VSL.

The vertical signal line VSL is connected to a current source 355 via the connection unit 402. The current source 355 is realized by, for example, an nMOS transistor. From a connection point at which the connection unit 402 and the current source 355 are connected to each other, an output by the circuit unit 101 including the nMOS transistor 306 brought into the conduction state according to the signal SEL is extracted. This extracted output is supplied to the second circuit 210 (in the drawing, described as the CMPs (2) and (3)).

In such a configuration, the photoelectric conversion unit 100 is provided in the first layer 2010a in the solid-state imaging element 2000a. The circuit unit 101 includes the nMOS transistors 303, 305, and 306, the pMOS transistors 340 and 353, and the capacitor 352, and is provided in the second layer 2010b. The current source 355, the second circuit 210 (not illustrated), and the like are provided in the memory+logic unit 2011.

Figure 16:
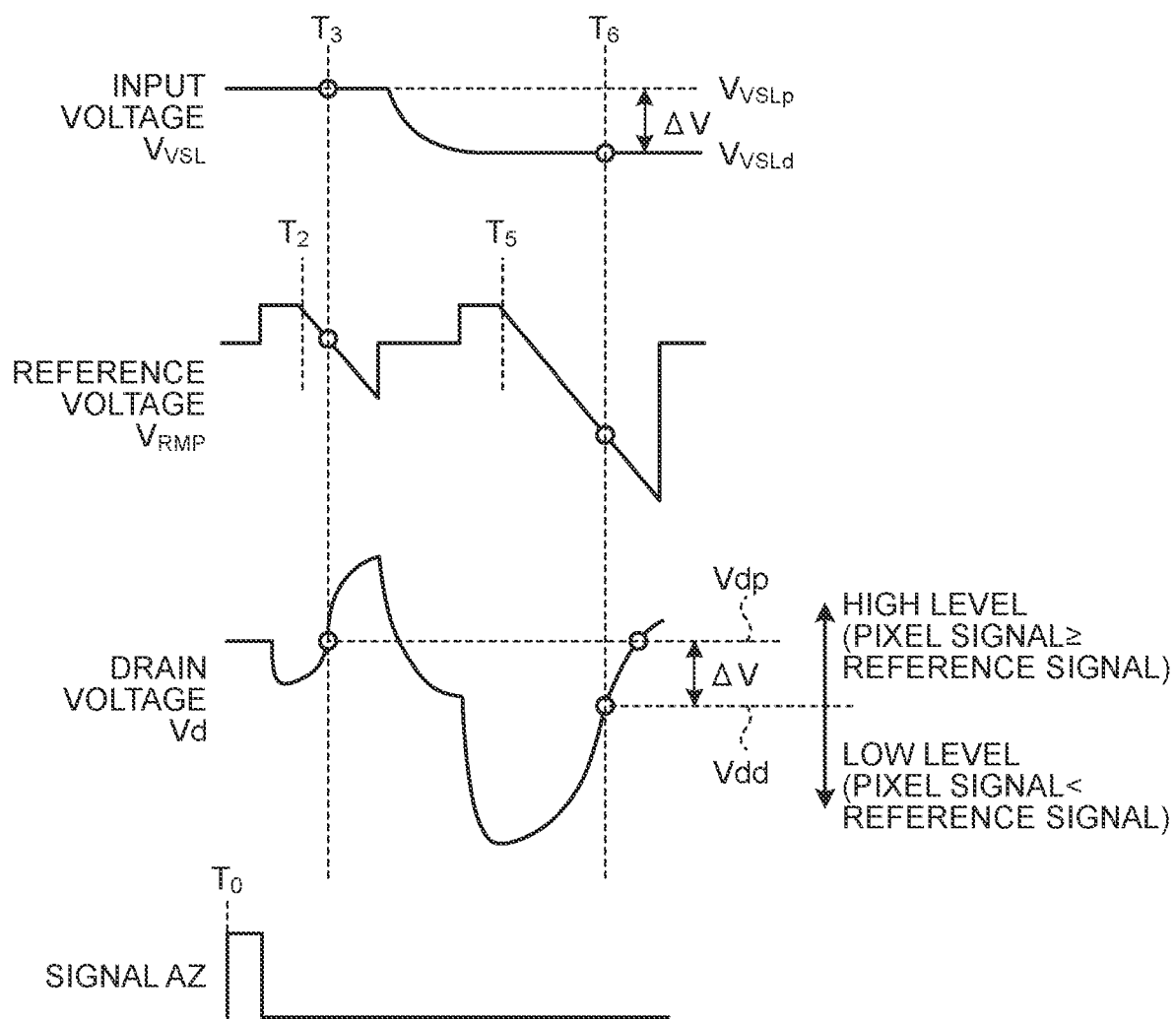
FIG. 16 is a timing chart illustrating an example of variation of input and output signals regarding a circuit unit as a first circuit according to the second embodiment.

FIG. 16 is a timing chart illustrating an example of variations of input and output signals regarding the circuit unit 101 according to the second embodiment. It is noted that, in FIG. 16, an input voltage $V_{VSL}$ indicates a voltage input from the source of the nMOS transistor 306 to the source of the pMOS transistor 340. A reference voltage $V_{RMP}$ indicates the voltage of the RAMP signal.

At a timing $T_0$ immediately before the start of the AD conversion, an auto zero signal AZ is input over a predetermined auto zero period. As a result, the gate and the drain of the pMOS transistor 340 are short-circuited, and an auto zero operation as a comparator is performed.

Next, the DAC 14 gradually decreases the reference voltage $V_{RMP}$ by the reference signal (the RAMP signal) over a certain period from a timing $T_2$. On the other hand, the pixel circuit using the nMOS transistors 301, 303, 305, and 306, and the FD is initialized, and the input voltage $V_{VSL}$ (that is, the reset level) at this time is set as $V_{VSLp}$.

Then, it is assumed that the reference voltage $V_{RMP}$ and the reset level $V_{VSLp}$ substantially coincide with each other at a timing $T_3$.

A drain voltage Vd of the pMOS transistor 340 at the timing $T_3$ is set as Vdp. When a voltage lower than Vdp is set to a low level and a voltage equal to or higher than Vdp is set to a high level, the drain voltage Vd of the pMOS transistor 340 is inverted from the low level to the high level at the timing $T_3$.

Subsequently, the DAC 14 initializes the reference voltage, and gradually decreases the reference voltage $V_{RMP}$ over a certain period from a timing $T_5$. On the other hand, a charge is transferred to the FD, and the input voltage $V_{VSL}$ (that is, the signal level) at this time is set as $V_{VSLd}$. The signal level V is lower than the reset level $V_{VSLp}$ by ΔV.

Then, it is assumed that the reference voltage $V_{RMP}$ and the signal level $V_{VSLd}$ substantially coincide with each other at a timing $T_6$. As illustrated in FIG. 16, at the timings $T_3$ and $T_6$ at which the reference voltage $V_{RMP}$ and the input voltage $V_{VSL}$ substantially coincide with each other, the voltage drop amount ΔV of the input voltage $V_{VSL}$ is the same as the voltage drop amount of the drain voltage Vd at the timing $T_6$. For example, in the second circuit 210 (in FIG. 15, described as the CMPs (2) and (3)) at the subsequent stage, it is conceivable to determine inversion of the drain voltage Vd based on the drain voltage Vdd dropped from the input voltage $V_{VSL}$ by the voltage drop amount ΔV.

(Comparison with Existing Technology)

Figure 17:
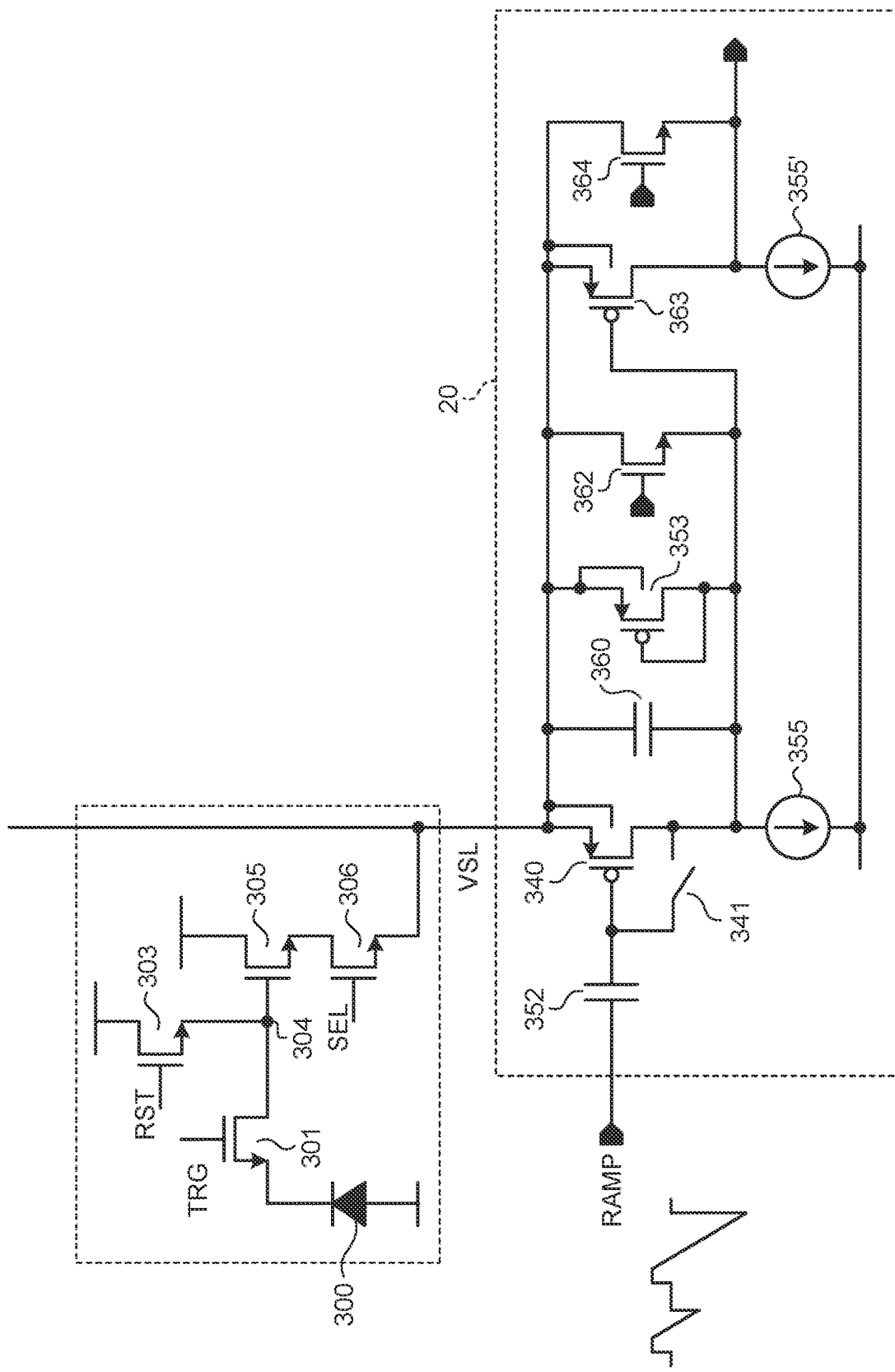
FIG. 17 is a circuit diagram illustrating a configuration of an example according to an existing technology.

FIG. 17 is a circuit diagram illustrating a configuration of an example according to an existing technology. In FIG. 17, the comparator 20 includes the pMOS transistors 340 and 353, the switch circuit 341, and the capacitor 352 illustrated in FIG. 15. Furthermore, the comparator 20 includes a capacitor 360, a pMOS transistor 363, nMOS transistors 362 and 364, each of which constitutes a clamp circuit for an input and an output of the pMOS transistor 363, and a current source 355'. The pMOS transistor 363 functions as an output transistor for extracting an output of the comparator 20.

In such a configuration, a plurality of pixel circuits including the photoelectric conversion element 300, the nMOS transistors 301, 303, 305, and 306 for reading out a charge from the photoelectric conversion element 300 and outputting a pixel signal, and the FD are connected to the vertical signal line VSL. The comparator 20 is shared by the plurality of circuits. Furthermore, the photoelectric conversion element 300 and the nMOS transistor 301 are provided in the first layer 2010a of the pixel unit 2010, and the nMOS transistors 303, 305, and 306 of the pixel circuit and the FD are provided in the second layer 2010b. Furthermore, the comparator 20 is provided in the memory+logic unit 2011.

In this case, in order to achieve noise reduction, as illustrated in FIG. 17, it is necessary to provide the capacitor 360 between the pMOS transistors 340 and 353 in parallel with the pMOS transistors 340 and 353 in order to perform band limitation. Therefore, the area of the comparator 20 on the substrate increases.

On the other hand, in the configuration according to the second embodiment, as illustrated in FIG. 15, the band limitation can be performed by the capacitor 354 which is a parasitic capacitance of the vertical signal line VSL. Therefore, noise can be reduced without adding the capacitor 360 to the memory+logic unit 2011.

4-1. First Modification of Second Embodiment

Next, a first modification of the second embodiment of the present disclosure will be described. The first modification of the second embodiment is an example in which the position of the row selection transistor in the above-described second embodiment is made different.

Figure 18:
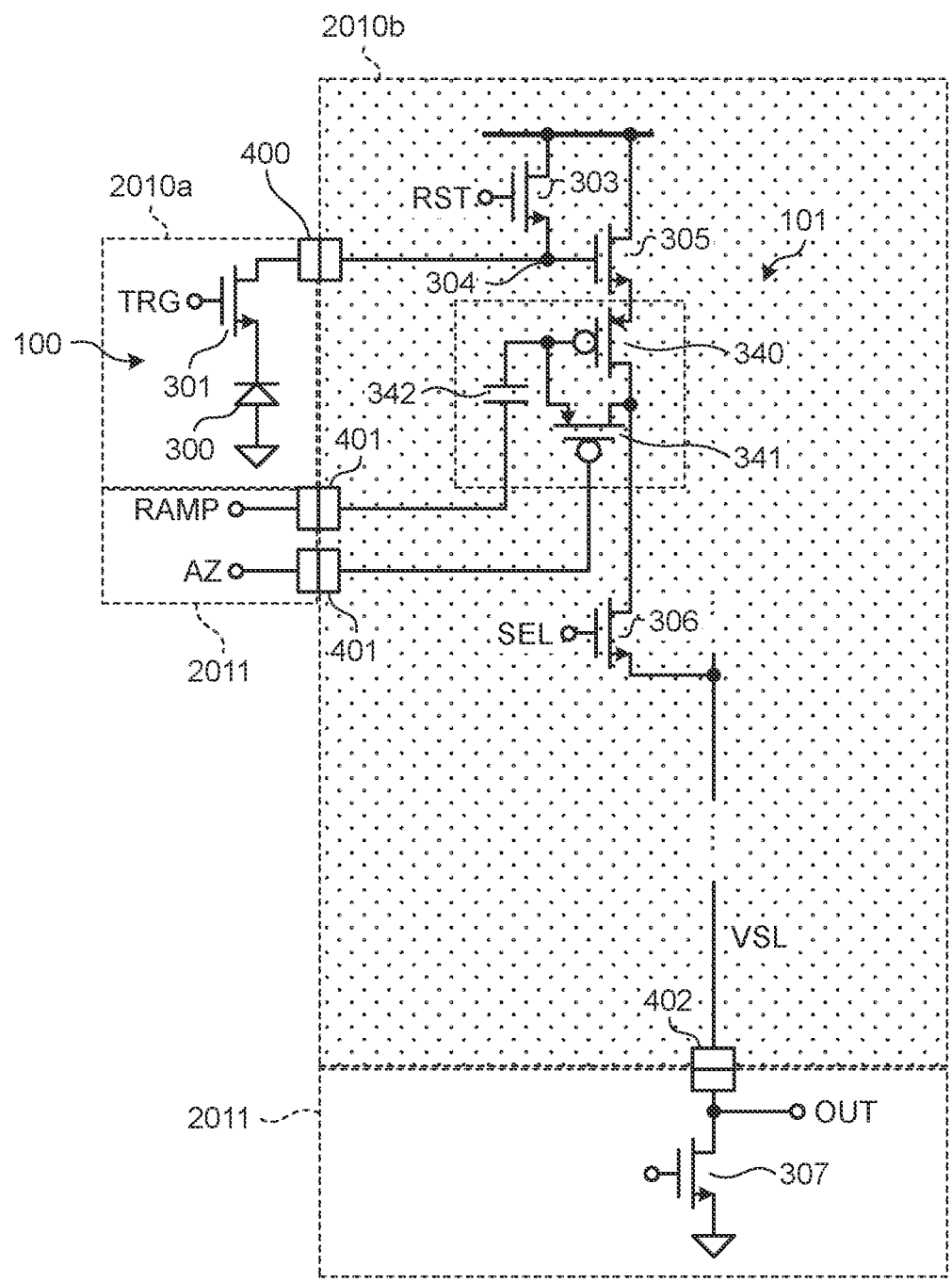
FIG. 18 is a circuit diagram illustrating a configuration of an example according to a first modification of the second embodiment.

FIG. 18 is a circuit diagram illustrating a configuration of an example according to the first modification of the second embodiment. In the second embodiment described above, as illustrated in FIG. 15, the first circuit including the pMOS transistor 340 and the switch circuit 341 corresponding to the first stage comparator 201 is connected to the output of the pixel circuit, that is, the source of the nMOS transistor 306 which is a row selection transistor in the pixel circuit.

On the other hand, in the first modification of the second embodiment, as illustrated in FIG. 18, the first circuit is provided between the nMOS transistor 305, which is an amplification transistor in the pixel circuit, and the nMOS transistor 306, which is a row selection transistor.

Specifically, the source of the nMOS transistor 305, which is the amplification transistor, is connected to the source of the pMOS transistor 340, and the drain of the pMOS transistor 340 is connected to the drain of the nMOS transistor 306. The source of the nMOS transistor 306 is connected to the vertical signal line VSL. The vertical signal line VSL is connected to the drain of an nMOS transistor 307 serving as a current source via the connection unit 402. An output OUT is extracted from a connection point at which the connection unit 402 and the nMOS transistor 307 are connected to each other. The output OUT is supplied to the second circuit 210 (not illustrated).

In such a configuration, the photoelectric conversion unit 100 including the photoelectric conversion element 300 and the nMOS transistor 301 is provided in the first layer 2010a of the pixel unit 2010. Furthermore, the circuit unit 101 including the pixel circuit, the pMOS transistor 340, the switch circuit 341, and a capacitor 342 is provided in the second layer 2010b of the pixel unit 2010. Furthermore, the nMOS transistor 307 serving as a current source and the second circuit 210 (not illustrated) are provided in the memory+logic unit 2011.

Also, in the configuration according to the first modification of the second embodiment, band limitation is possible by the parasitic capacitance of the vertical signal line VSL. Therefore, noise can be reduced without adding a capacitor for the band limitation to the memory+logic unit 2011.

Figure 19:
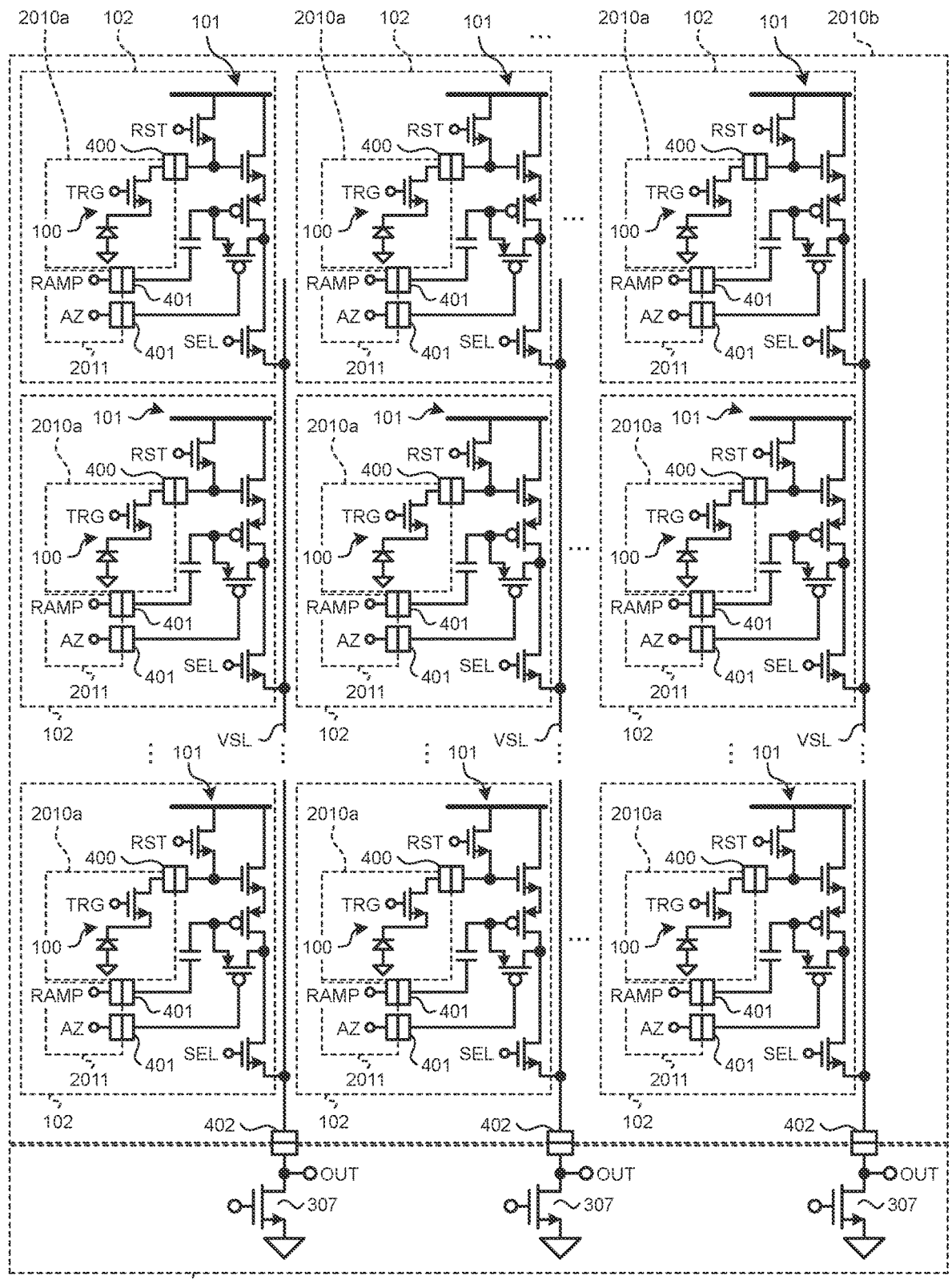
FIG. 19 is a schematic diagram illustrating an example in which the configurations according to the first modification of the second embodiment are arranged in a matrix array.

FIG. 19 is a schematic diagram illustrating an example in which the configurations according to the second embodiment illustrated in FIG. 18 are arranged in the matrix array. The circuits 102 including the photoelectric conversion unit 100 and the circuit unit 101 are arranged in the matrix array. In each circuit 102, the source of a row selection transistor whose gate receives the signal SEL is connected to the vertical signal line VS for each column of the matrix array. Each vertical signal line VSL is connected to the drain of the nMOS transistor 307 serving as a current source via each connection unit 402. Each output OUT is extracted from each connection point to which each connection unit 402 and the drain of each nMOS transistor 307 are connected. Each output OUT extracted from each vertical signal line VSL is supplied to the second circuit (not illustrated) for each column.

In such a configuration, among the photoelectric conversion unit 100 and the circuit unit 101 included in each circuit 102, the photoelectric conversion unit 100 is provided in the first layer 2010a of the pixel unit 2010, and the circuit unit 101 is provided in the second layer 2010b. Each photoelectric conversion unit 100 is connected to the circuit unit 101 via the connection unit 400.

The nMOS transistor 307 serving as a current source for each column and the second circuit 210 (not illustrated) are provided in the memory+logic unit 2011. Each vertical signal line VSL is connected to the nMOS transistor 307 via the connection unit 402. Further, although not illustrated, the RAMP wiring 330 for transmitting the RAMP signal output from the DAC 14 and the wiring for transmitting the auto zero signal (the AZ signal) supplied from the vertical scanning circuit 12 are connected from the memory+logic unit 2011 to the circuit 102 (the circuit unit 101) via the connection unit 401.

(4-2. Second Modification of Second Embodiment)

Figure 20:
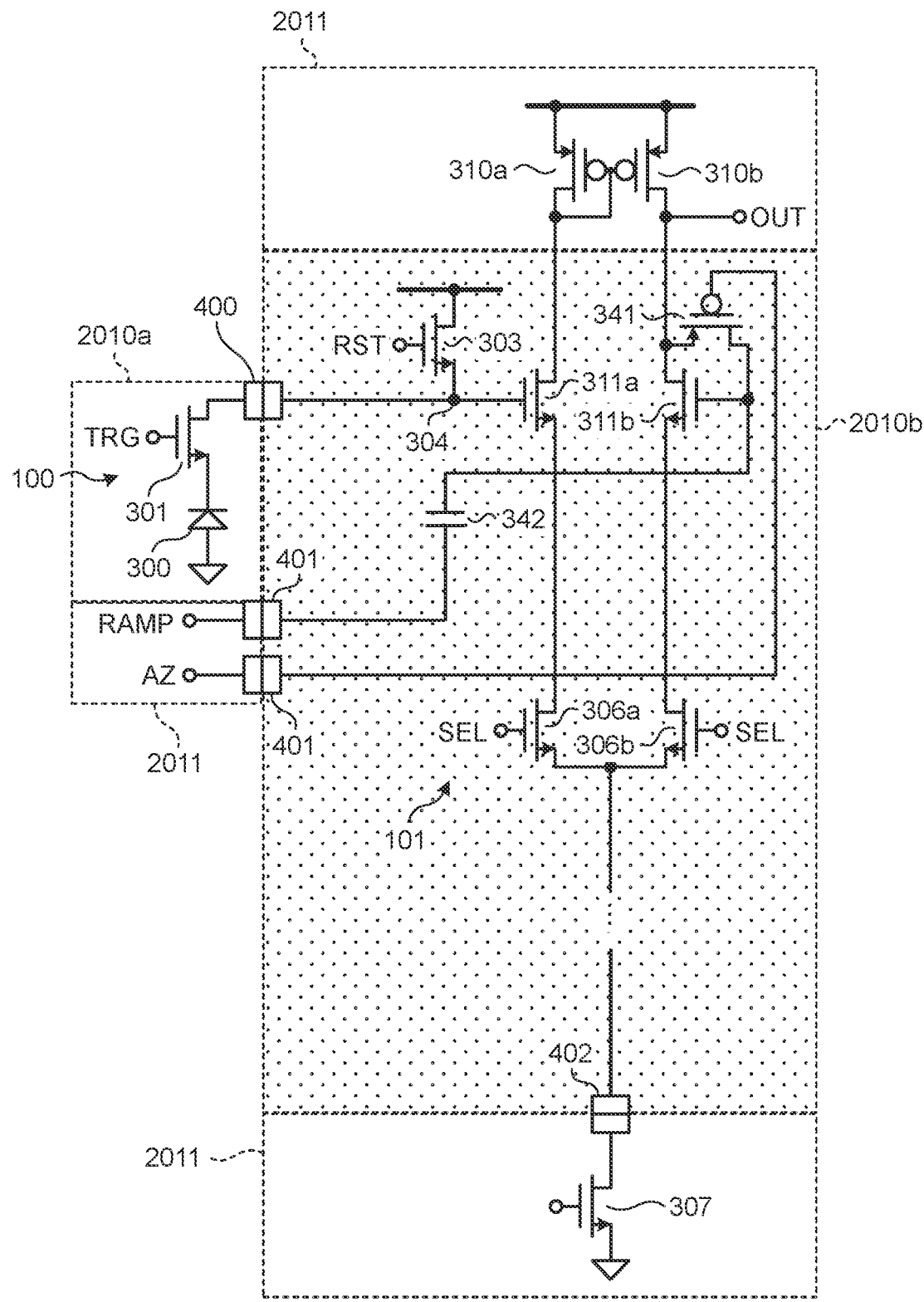
FIG. 20 is a circuit diagram illustrating a configuration of an example according to a second modification of the second embodiment.

Next, a second modification of the second embodiment of the present disclosure will be described. FIG. 20 is a circuit diagram illustrating a configuration of an example according to the second modification of the second embodiment. As illustrated in FIG. 20, the second modification of the second embodiment is an example in which the switch circuit 341 that performs the auto zero operation is added to the configuration described in the first embodiment with reference to FIG. 9 in which a differential pair is used for the first circuit that performs comparison between the pixel signal and the RAMP signal.

In the example of FIG. 20, the switch circuit 341 is configured using the pMOS transistor. The source of the pMOS transistor is connected to a connection point at which the drain of one pMOS transistor 310b constituting a current mirror circuit and the drain of the nMOS transistor 311b constituting one of the differential pairs are connected to each other. Furthermore, the output OUT is extracted from the connection point and is supplied to the second circuit 210 via the vertical signal line VSL (not illustrated).

The drain of the pMOS transistor is connected to the gate of the nMOS transistor 311b and is connected to the connection unit 401 via the capacitor 342. The connection unit 401 is supplied with the RAMP signal output from the DAC 14 (not illustrated) provided in the memory+logic unit 2011. The RAMP signal is supplied from the connection unit 401 to the gate of the nMOS transistor 311b and the drain of the pMOS transistor via the capacitor 342. Furthermore, the signal AZ for controlling the auto zero operation is supplied to the gate of the pMOS transistor via the connection unit 401.

Furthermore, in FIG. 20, the drains of the nMOS transistors 306a and 306b are connected to the sources of the nMOS transistors 311a and 311b constituting the differential pair, respectively. The sources of the nMOS transistors 306a and 306b are connected to each other, and a connection point thereof is connected to the drain of the nMOS transistor 307 serving as a current source via the connection unit 402. The signal SEL is supplied to the gates of the nMOS transistors 306a and 306b. That is, the nMOS transistors 306a and 306b function as selection transistors, respectively.

In such a configuration, the photoelectric conversion unit 100 including the photoelectric conversion element 300 and the nMOS transistor 301 is provided in the first layer 2010a of the pixel unit 2010. The circuit unit 101 using the differential pair including the nMOS transistors 311a and 311b and the nMOS transistor 303 included in the pixel circuit are provided in the second layer 2010b of the pixel unit 2010. Each photoelectric conversion unit 100 is connected to the circuit unit 101 via the connection unit 400.

The pMOS transistors 310a and 310b constituting the current mirror circuit, the nMOS transistor 307 serving as a current source, and the second circuit 210 (not illustrated) are provided in the memory+logic unit 2011. Further, although not illustrated, the RAMP wiring 330 for transmitting the RAMP signal output from the DAC 14 and the wiring for transmitting the auto zero signal (the AZ signal) supplied from the vertical scanning circuit 12 are connected to the circuit unit 101 from the memory+logic unit 2011 via the connection unit 401.

Also, in the configuration according to the second modification of the second embodiment, band limitation is possible by the parasitic capacitance of the vertical signal line VSL. Therefore, noise can be reduced without adding a capacitor for the band limitation to the memory+logic unit 2011.

4-3. Third Modification of Second Embodiment

Figure 21:
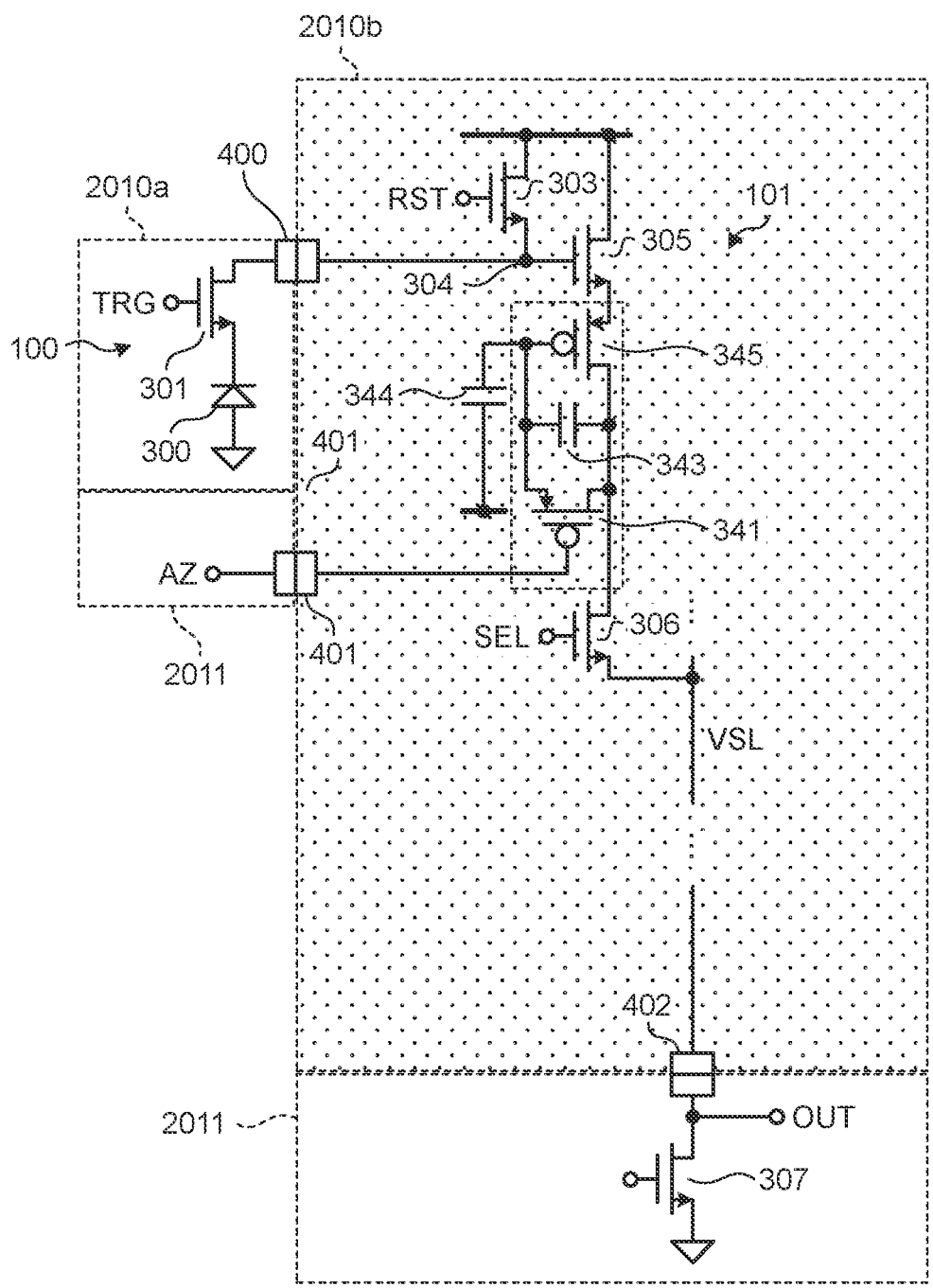
FIG. 21 is a circuit diagram illustrating a configuration of an example according to a third modification of the second embodiment.

Next, a third modification of the second embodiment will be described. As illustrated in FIG. 21, the third modification of the second embodiment is an example in which a capacitor is provided in a transistor corresponding to the pMOS transistor 340 for comparing the RAMP signal with the pixel signal, with respect to the configuration according to the first modification of the second embodiment described with reference to FIG. 18.

FIG. 21 is a circuit diagram illustrating a configuration of an example according to the third modification of the second embodiment. In FIG. 21, a pMOS transistor 345 includes a connection relationship corresponding to the pMOS transistor 340 in FIG. 18. Here, the source of the pMOS transistor 345 is connected to the source of the nMOS transistor 305 and the drain thereof is connected to the drain of the nMOS transistor 306. Furthermore, the switch circuit 341, the non-conduction/conduction state of which is controlled by the signal AZ, is connected between the gate and the drain of the pMOS transistor 345. In this example, the switch circuit 341 is configured using the pMOS transistor.

In the third modification of the second embodiment, a capacitor 343 is further connected between the gate and the drain of the pMOS transistor 345. Furthermore, one end of a capacitor 344 having the other end connected to a predetermined potential (for example, a ground potential) is further connected to the gate of the pMOS transistor 345.

In this manner, by connecting the capacitors 343 and 344 to the pMOS transistor 345, the pMOS transistor 345 can function as an amplifier. Specifically, the pMOS transistor 340 amplifies a signal supplied from the source of the nMOS transistor 305 with an amplification factor n according to a capacitance ratio between the capacitor 343 and the capacitor 342, and outputs the amplified signal from the drain.

The vertical signal line VSL is connected to the drain of the nMOS transistor 307 of the current source via the connection unit 402. The output OUT is extracted from a connection point at which the connection unit 402 and the drain of the nMOS transistor 307 are connected to each other. The output OUT is supplied to the comparator 20 (not illustrated).

In such a configuration, the photoelectric conversion unit 100 including the photoelectric conversion element 300 and the nMOS transistor 301 is provided in the first layer 2010a of the pixel unit 2010. The nMOS transistors 303, 305, and 306 included in the pixel circuit, the FD (the connection point 304), the switch circuit 341 and the pMOS transistor 345, and the capacitors 343 and 344 are provided in the second layer 2010b of the pixel unit 2010. Each photoelectric conversion unit 100 is connected to the circuit unit 101 via the connection unit 400.

The nMOS transistor 307 serving as a current source and the comparator 20 (not illustrated) are provided in the memory+logic unit 2011. Furthermore, although not illustrated, the wiring for transmitting the auto zero signal (the AZ signal) supplied from the vertical scanning circuit 12 is connected from the memory+logic unit 2011 to the circuit unit 101 via the connection unit 401.

As described above, in the third modification of the second embodiment, since the pMOS transistor 345 does not function as the first stage comparator 201, it is necessary to separately provide the comparator 20. In this case as well, by setting the capacitances of the capacitor 343 and the capacitor 342 so that the amplification factor n of the pMOS transistor 345 satisfies n>1, the level of the signal output to the vertical signal line VSL can be enhanced, and noise can be relatively reduced.

5. Third Embodiment

Next, a third embodiment of the present disclosure will be described. The third embodiment is an example in which the RAMP signal is applied not to the gate of the pMOS transistor 340 but to the FD with respect to the configuration described with reference to FIG. 18.

Figure 22:
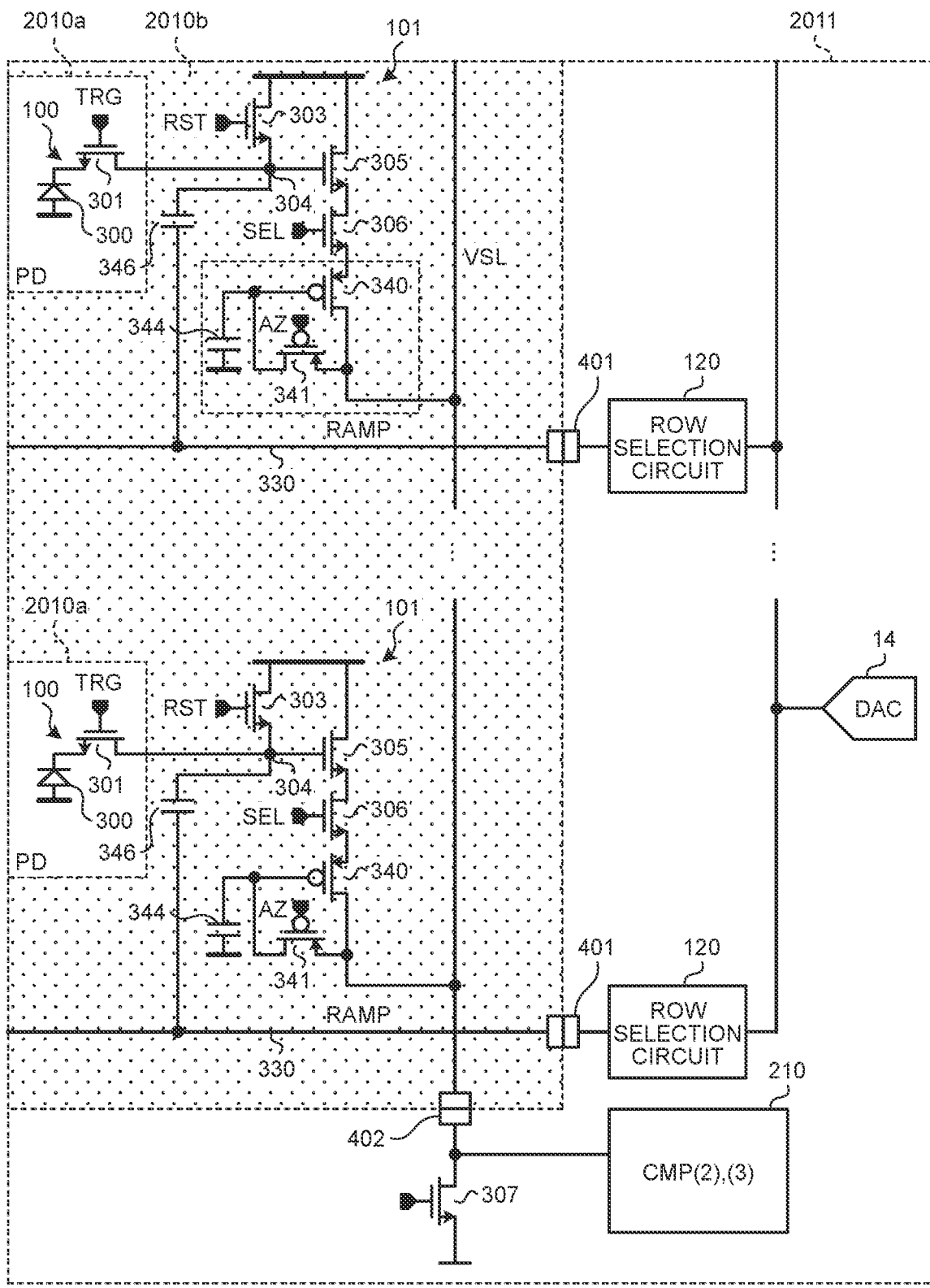
FIG. 22 is a schematic diagram illustrating a configuration of an example according to a third embodiment.

FIG. 22 is a schematic diagram illustrating a configuration of an example according to the third embodiment. It is noted that, here, in order to avoid complexity, detailed descriptions of portions common to FIG. 18 are omitted.

In FIG. 22, one end of a capacitor 346 is connected to the FD (in this example, the connection point 304), and the other end thereof is connected to the RAMP wiring 330 provided for each row. The RAMP signal connected from the DAC 14 is supplied to the connection unit 401 via the row selection circuit 120 for each row. For example, a switch circuit, the non-conduction/conduction state of which is controlled by a row selection signal output from the vertical scanning circuit 12, can be applied to the row selection circuit 120. The RAMP signal supplied to the connection unit 401 is applied to the other end of the capacitor 346 via the RAMP wiring 330 provided for each row.

The potential of the charges accumulated in the FD changes according to the RAMP signal applied to the capacitor 346 via the RAMP wiring 330. Therefore, the level of the voltage obtained by converting the charges read from the FD changes depending on the change in the RAMP signal.

Figure 23:
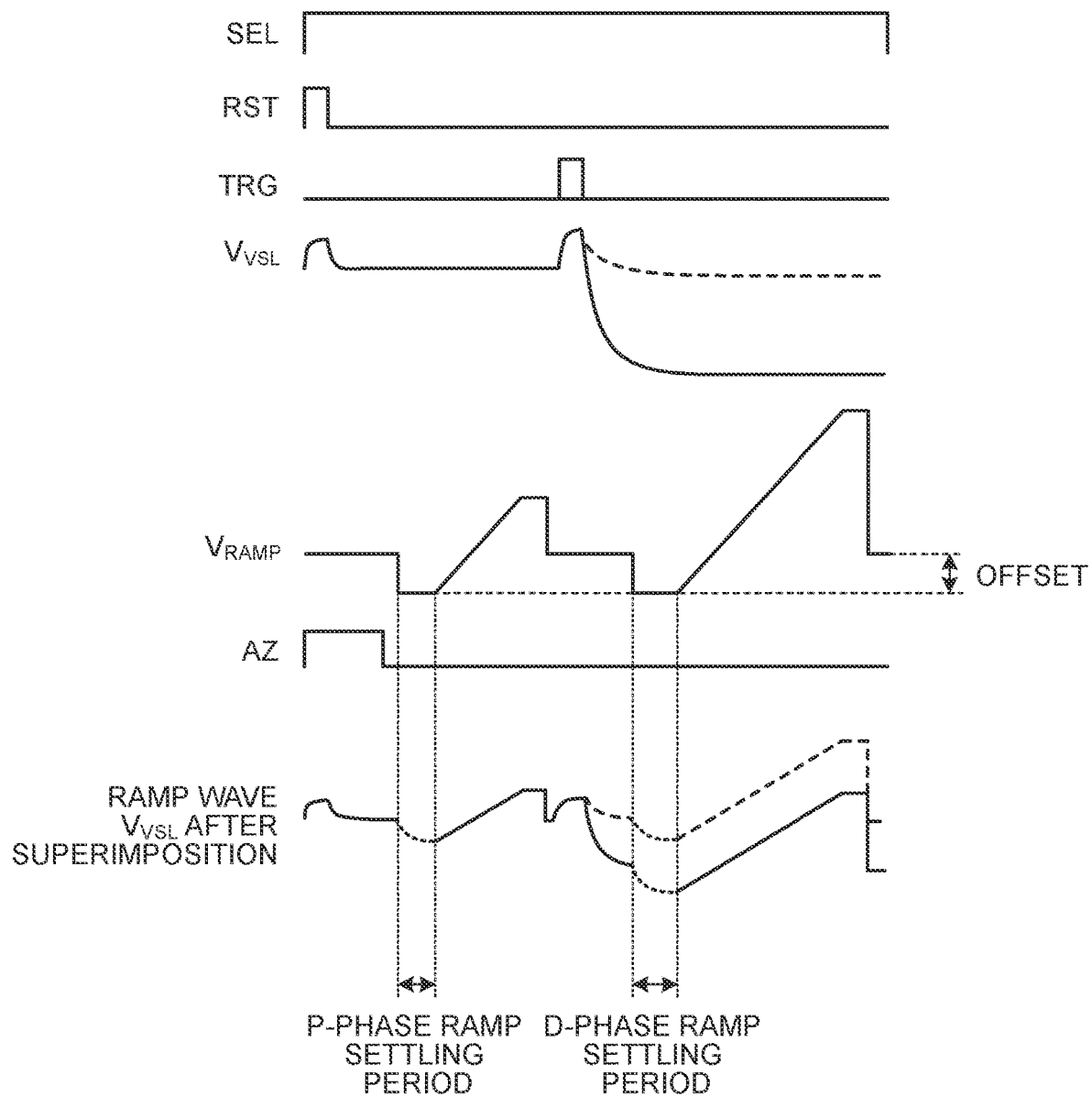
FIG. 23 is a timing chart of an example illustrating an operation of an imaging device according to the third embodiment.

FIG. 23 is a timing chart of an example illustrating the operation of the imaging device 1004 according to the third embodiment. FIG. 23 illustrates a relationship between a timing of the signal SEL for driving the nMOS transistor 305, a timing of the signal RST for driving the nMOS transistor 303, a timing of the signal TRG for driving the nMOS transistor 301, and a timing of the analog type pixel signal $V_{VSL}$. The timing chart in FIG. 23 further illustrates a relationship between a timing of the RAMP signal (a reference signal $V_{RAMP}$) applied to the FD, a timing of the signal AZ for controlling the non-conduction/conduction state of the switch circuit 341 that performs the auto zero operation of pMOS, and a timing of the pixel signal $V_{VSL}$ after the RAMP signal is superimposed.

It is noted that, in this example, the RAMP signal (the reference signal $V_{RAMP}$) is a signal, the signal level of which increases in each of the P-phase period and the D-phase period.

By applying the RAMP signal (the reference signal $V_{RAMP}$) generated in the DAC 14 to the FD (the connection point 304) via the capacitor 346, the pixel signal $V_{VSL}$ in which the RAMP signal (the reference signal $V_{RAMP}$) is superimposed on the potential of the FD is read out from the vertical signal line VSL. Then, in the second circuit 210 (in the drawing, described as the CMPs (2) and (3)) provided for each column, processing of comparing the pixel signal $V_{VSL}$, which is supplied from the vertical signal line VSL and on which the RAMP signal (the reference signal $V_{RAMP}$) is superimposed, with a predetermined reference voltage (for example, a ground potential) input to the gate of the pMOS transistor 340 is performed. As a result, the pulse signal having the pulse width corresponding to the signal level of the pixel signal $V_{VSL}$, specifically, the pulse width corresponding to the magnitude of the signal level is output from the second circuit 210 as a comparison result based on a timing at which the RAMP signal (the reference signal $V_{RAMP}$) crosses the predetermined reference voltage.

It is noted that periods during which the RAMP signal (the reference signal $V_{RAMP}$ is at a level lower than a reference level by an offset become settling periods of a P-phase RAMP signal and a D-phase RAMP signal, respectively.

Based on the output of the second circuit 210, the counter 30 performs the counting operation in each of the P-phase (Preset Phase) period and the D-phase (Data Phase) period, and outputs the respective counting results to the logic circuit 40.

The logic circuit 40 performs the CDS processing and AD conversion processing based on a counting result of the P-phase period input from the counter 30 and a counting result of the D-phase period, and generates and outputs a digital type pixel signal (pixel data).

According to the configuration of the third embodiment, since the signal output to the vertical signal line VSL is the pixel signal $V_{VSL}$ on which the RAMP signal (the reference signal $V_{RAMP}$) is superimposed, band limitation is possible, and noise reduction can be realized.

6. Fourth Embodiment

Next, a fourth embodiment of the present disclosure will be described.

In the above description, the VSL is divided in the vertical direction to reduce the load of the VSL. However, even if the number of divisions of the VSL is increased, routing wiring to the input terminal to the ADC 70 is required, so that it is difficult to increase the processing speed and it is difficult to increase the frame rate. For example, in the stacked structure of two layers, the upper limit of the number of divisions of the VSL is about two. In addition, since one ADC 70 corresponds to a plurality of pixels, a load at a pixel switching portion becomes heavy.

Therefore, in the fourth embodiment of the present disclosure, one first stage comparator 201 is arranged for each of the divided regions of the VSL with respect to the first layer and the second layer of the first substrate and the intermediate layer having a configuration including three layers of the second substrate (the second layer of the first substrate), and the output of the first stage comparator 201 is switched by a select switch and is input to the middle stage comparator 202. By adopting such a configuration, the VSL load is reduced by an increase in the number of divisions of the VSL, and it is possible to increase the processing speed and the frame rate.

Furthermore, in the fourth embodiment of the present disclosure, a plurality of pixels (the photoelectric conversion units 100) are connected to one first stage comparator 201. That is, in the fourth embodiment, the connection is switched at two positions of a portion between the pixel and the first stage comparator 201 and between the first stage comparator 201 and the middle stage comparator 202. As a result, the load at the pixel switching portion (that is, the VSL wiring) can be reduced.

Figure 24:
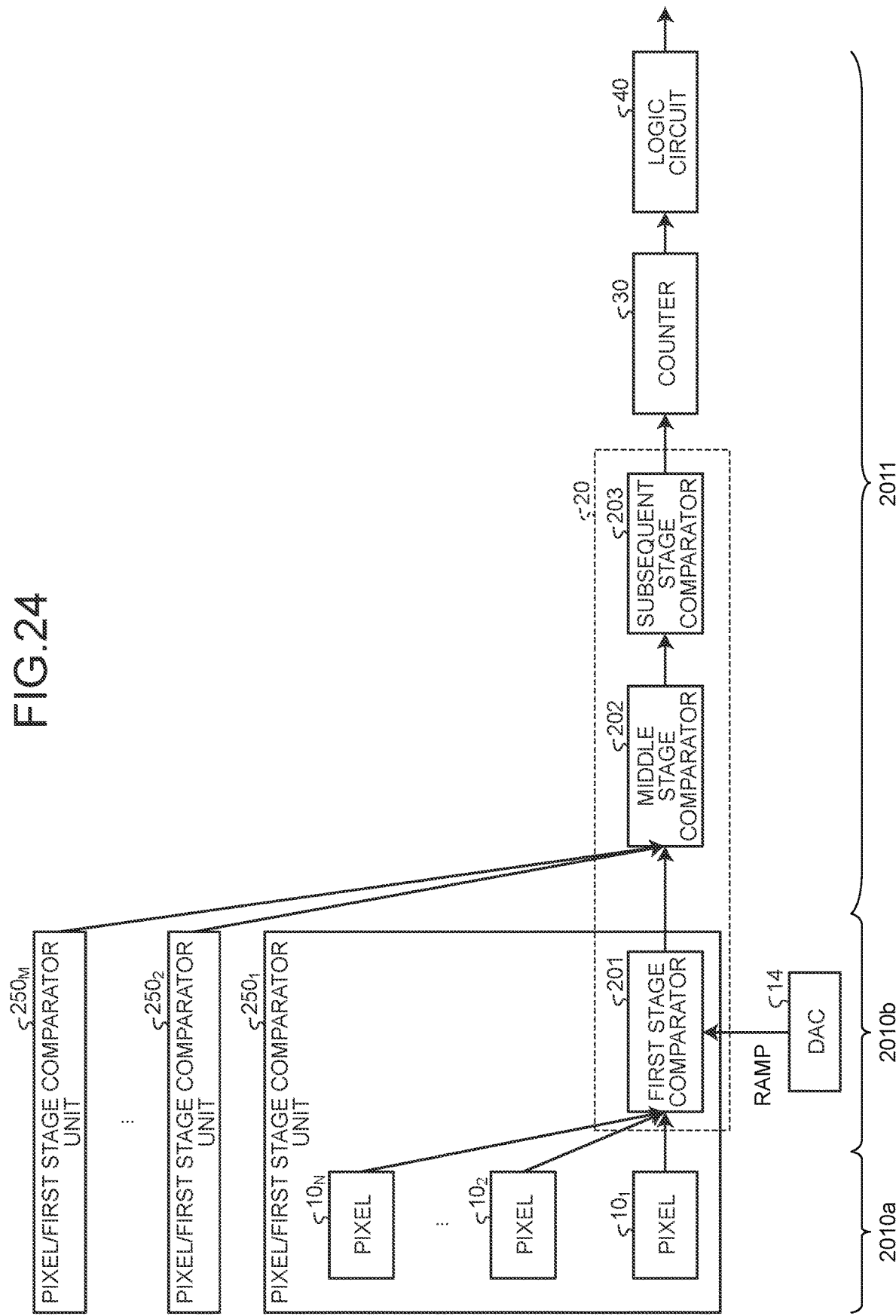
FIG. 24 is a schematic diagram schematically illustrating signal processing on a pixel signal according to a fourth embodiment.

FIG. 24 is a schematic diagram schematically illustrating signal processing on a pixel signal according to the fourth embodiment.

In FIG. 24, as in FIG. 7 described above, the comparator 20 includes the first stage comparator 201, the middle stage comparator 202, and the subsequent stage comparator 203, and the output of the subsequent stage comparator 203 is input to the counter 30, and the output of the counter 30 is input to the logic circuit 40. Furthermore, the RAMP signal output from the DAC 14 is supplied to the first stage comparator 201.

In the configuration illustrated in FIG. 24, pixel signals from N (N≥1) pixels $10_1$, $10_2$, ..., and $10_N$ are input to the first stage comparator 201. Outputs of M (M≥2) pixel/first stage comparator units $250_1$, $250_2$, ..., and $250_N$ each including the first stage comparator 201 and the pixels $10_1$, $10_2$, ..., and $10_N$ are input to the middle stage comparator 202.

Furthermore, among these, the respective pixels $10_1$, $10_2$, ..., and $10_N$, included in the pixel/first stage comparator units $250_1$, $250_2$, ..., and $250_N$ are arranged in the first layer 2010a of the pixel unit 2010, and the respective first stage comparators 201 are arranged in the second layer 2010b of the pixel unit 2010. The configurations after the middle stage comparator 202 are arranged in the memory+ logic unit 2011.

Figure 25:
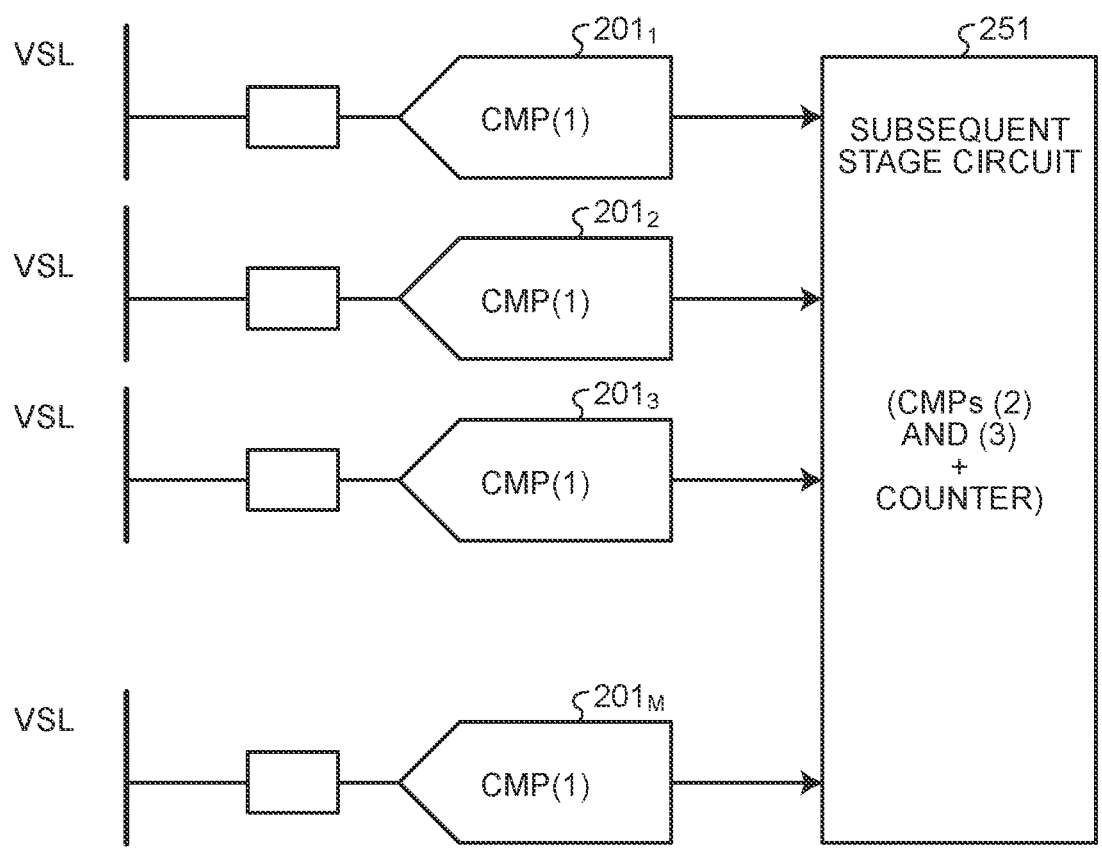
FIG. 25 is a schematic diagram illustrating division of VSL according to the fourth embodiment.

FIG. 25 is a schematic diagram illustrating the division of the VSL according to the fourth embodiment. It is noted that, in FIG. 25, each of first stage comparators $201_1$ to $201_N$ is also denoted as "CMP (1)". In addition, a subsequent stage circuit 251 includes the middle stage comparator 202 and the subsequent stage comparator 203 ("the CMPs (2) and (3)"), and the counter 30.

As illustrated in FIG. 25, each of the VSLs connects each of the pixels $10_1$ to $10_N$ to a corresponding one of the first stage comparators $201_1$ to $201_M$ in each of the pixel/first stage comparator units $250_1$, $250_2$, ..., and $250_M$. That is, in the fourth embodiment, the VSL is divided for each of the first stage comparators $201_1$ to $201_M$.

As described above, in the fourth embodiment, a signal path is switched between each of the pixels $10_1$ to $10_N$ and the first stage comparator 201, and between the respective pixel/first stage comparator units $250_1$ to $250_M$. Therefore, the VSL is divided for each of the first stage comparators $201_1$ to $201_M$, and the load on the VSL wiring is reduced.

Specific Example

Figure 26:
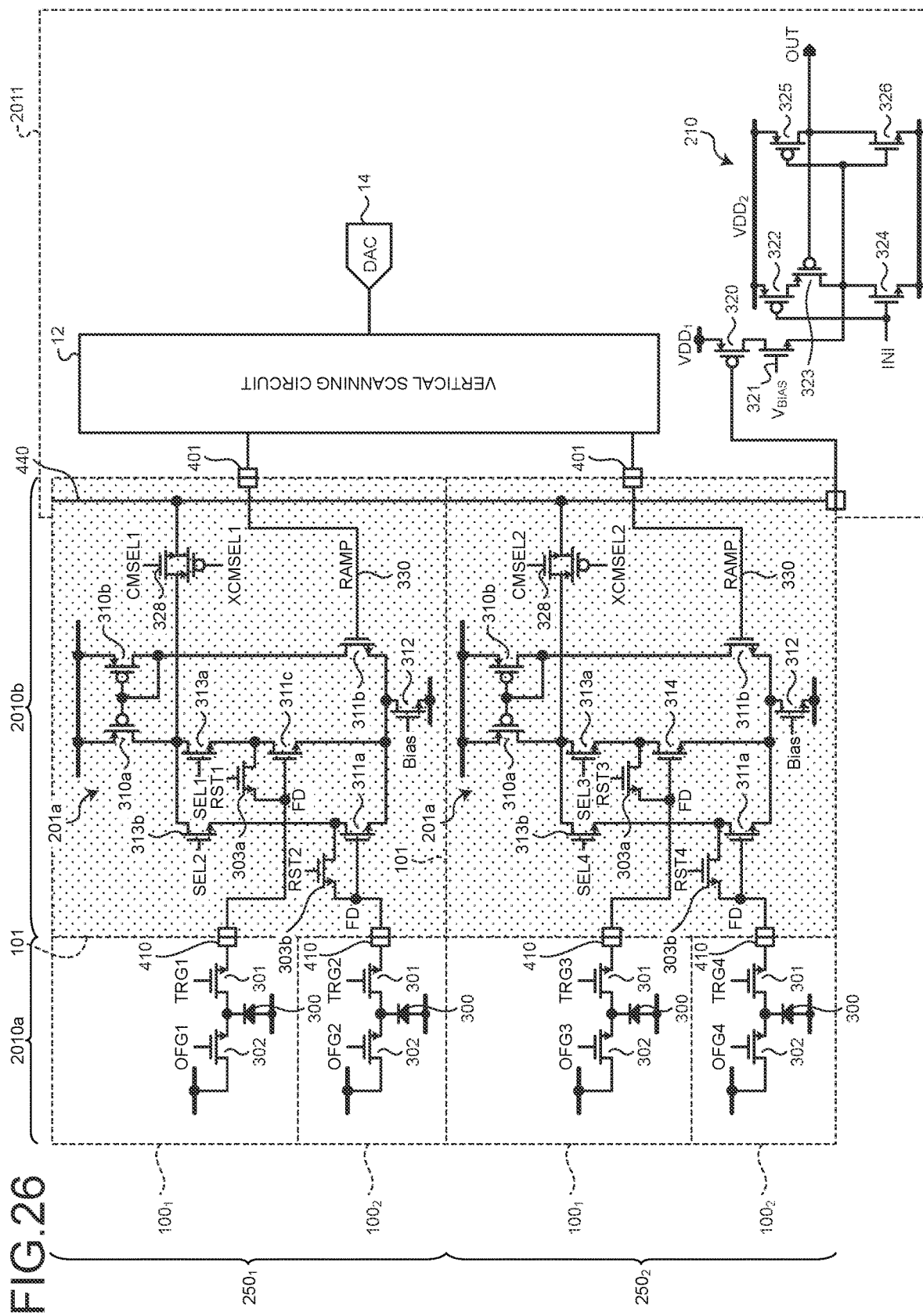
FIG. 26 is a circuit diagram illustrating a configuration of an example according to the fourth embodiment.

FIG. 26 is a circuit diagram illustrating a configuration of an example according to the fourth embodiment. The configuration of FIG. 26 corresponds to the configuration of FIG. 9 described above.

In the example of FIG. 26, two pixel/first stage comparator units $250_1$ and $250_2$ are connected to the second circuit 210 serving as the middle stage comparator 202. Each of the pixel/first stage comparator units $250_1$ and $250_2$ includes the circuit unit 101 and two photoelectric conversion units $100_1$ and $100_2$. The circuit unit 101 includes pixel circuits of the photoelectric conversion units $100_1$ and $100_2$, respectively, and a first stage comparator 201a common to the photoelectric conversion units $100_1$ and $100_2$.

As illustrated in FIG. 26, in each of the pixel/first stage comparator units $250_1$ and $250_2$, each of the photoelectric conversion units $100_1$ and $100_2$ is formed in the first layer 2010a of the substrate, and the circuit unit 101 is formed in the second layer 2010b of the substrate. Furthermore, the vertical scanning circuit 12, the DAC 14, and the second circuit 210 are formed in the memory+logic unit 2011.

In each of the pixel/first stage comparator units $250_1$ and $250_2$, the pixel circuit corresponding to the photoelectric conversion unit $100_1$ includes an nMOS transistor 303a, an FD formed on the source side of the nMOS transistor 303a, and an nMOS transistor 313a. Similarly, the pixel circuit corresponding to the photoelectric conversion unit $100_2$ includes an nMOS transistor 303b, an FD formed on the source side of the nMOS transistor 303b, and an nMOS transistor 313b.

In the first stage comparator 201a configured as a differential comparator including an active load by pMOS transistors 310a and 310b and a differential pair by nMOS transistors 311a, 311c, and 311b, the RAMP signal is supplied to the gate of the nMOS transistor 311b. Furthermore, in the first stage comparator 201a, the output extracted from the drain of the pMOS transistor 310a is connected to a middle stage comparator input line 440 via a switch circuit 328 including the nMOS transistor and the pMOS transistor connected in parallel.

The photoelectric conversion units $100_1$ and $100_2$ of the pixel/first stage comparator units $250_1$ and $250_2$ are formed in the first layer 2010a of the substrate. The circuit unit 101 of each of the pixel/first stage comparator units $250_1$ and $250_2$ is formed in the second layer 2010b of the substrate. On the other hand, the vertical scanning circuit, the DAC 14, and the second circuit 210 are formed in the memory+logic unit 2011.

In the pixel/first stage comparator unit $250_1$, the read operation of the photoelectric conversion element 300 in the photoelectric conversion unit $100_1$ is controlled by signals TRG1, OFG1, RST1, and SEL1 supplied for each row from the vertical scanning circuit 12, and the readout operation of the photoelectric conversion element 300 in the photoelectric conversion unit $100_2$ is controlled by TRG2, OFG2, RST2, and SEL2 supplied for each row from the vertical scanning circuit 12.

Furthermore, the connection between the output of the pixel/first stage comparator unit $250_1$ and the VSL is controlled by the switch circuit 328 according to mutually inverted signals CMSEL1 and XCMSEL1 supplied for each row by the pixel/first stage comparator unit $250_1$ from the vertical scanning circuit 12.

The operation of the pixel/first stage comparator unit $250_2$ is similar to the operation of the pixel/first stage comparator unit $250_1$. That is, in the pixel/first stage comparator unit $250_2$, the read operation of the photoelectric conversion element 300 in the photoelectric conversion unit $100_1$ is controlled by TRG3, OFG3, RST3, and SEL3 supplied for each row from the vertical scanning circuit 12, and the readout operation of the photoelectric conversion element 300 in the photoelectric conversion unit $100_2$ is controlled by TRG4, OFG4, RST4, and SEL4 supplied from the vertical scanning circuit 12.

Furthermore, the connection between the output of the pixel/first stage comparator unit $250_2$ and the middle stage comparator input line 440 is controlled by the switch circuit 328 according to the signals CMSEL2 and XCMSEL2 inverted from each other and supplied for each row by the pixel/first stage comparator unit $250_2$ from the vertical scanning circuit 12.

Each of the signals OFG1 to OFG4, TRG1 to TRG4, RST1 to RST4, SEL1 to SEL4, CMSEL1 and CMSEL2, XCMSEL1 and XCMSEL2 is generated in the logic circuit 40 of the memory+logic unit 2011, and is supplied to the pixel/first stage comparator units $250_1$ and $250_2$ via the vertical scanning circuit 12.

In the configuration of FIG. 26, for example, in each of the pixel/first stage comparator units $250_1$ and $250_2$, the readout of the photoelectric conversion element 300 is controlled for each row of the pixel array unit 11, and the readout pixel signal is input to the first stage comparator 201a. The output of each first stage comparator is controlled for each row by the pixel/first stage comparator unit $250_1$ from the vertical scanning circuit 12.

More specifically, in the pixel/first stage comparator unit $250_1$, readout by the photoelectric conversion unit $100_1$ is performed, and then readout by the photoelectric conversion unit $100_2$ is performed. Next, in the pixel/first stage comparator unit $250_2$, readout by the photoelectric conversion unit $100_1$ is performed, and then readout by the photoelectric conversion unit $100_2$ is performed.

In this case, when the photoelectric conversion units $100_1$ and $100_2$ are read out in the pixel/first stage comparator unit $250_1$, the switch circuit 328 is turned on (in the conduction state), and the pixel/first stage comparator unit $250_1$ is activated. On the other hand, in the pixel/first stage comparator unit $250_2$, the switch circuit 328 is turned off (in the non-conduction state), and the pixel/first stage comparator unit $250_2$ is deactivated.

Next, the photoelectric conversion units $100_1$ and $100_2$ are read in the pixel/first stage comparator unit $250_1$. In this case, the switch circuit 328 of the pixel/first stage comparator unit $250_2$ is turned on, and the pixel/first stage comparator unit $250_2$ is activated. On the other hand, in the pixel/first stage comparator unit $250_1$, the switch circuit 328 is turned on, and the pixel/first stage comparator unit $250_1$ is deactivated.

As described above, which output of each of the pixel/first stage comparator units $250_1$ and $250_2$ is selected, in other words, which of the pixel/first stage comparator units $250_1$ and $250_2$ is selected as the input of the middle stage comparator 202 is controlled by each switch circuit 328 included in each of the pixel/first stage comparator units $250_1$ and $250_2$.

As described above, in the fourth embodiment, one first stage comparator 201a is connected to the plurality of photoelectric conversion units $100_1$ and $100_2$. In addition, one second circuit 210 is connected to the plurality of first stage comparators 201a, and connection to the second circuit 210 is switched according to scanning of the photoelectric conversion units $100_1$ and $100_2$ connected to the first stage comparator 201a. Therefore, the load on the VSL is reduced as compared with the first to third embodiments described above.

It is noted that, in the fourth embodiment, the number of circuits connected to the middle stage comparator input line 440 is reduced, but the middle stage comparator input line 440 is not divided.

6-1. Modification of Fourth Embodiment

Next, a modification of the fourth embodiment will be described. The modification of the fourth embodiment is an example in which a photoelectric conversion/pixel circuit unit including the photoelectric conversion unit 100 and the pixel circuit described above is formed in the first layer 2010a of the substrate, and the first stage comparator 201 and the vertical scanning circuit 12 are formed in the second layer 2010b of the substrate. The second circuit 210 corresponding to the middle stage comparator 202 is formed in the memory+logic unit 2011 in the same manner as described above.

6-1-1. First Example

Figure 27:
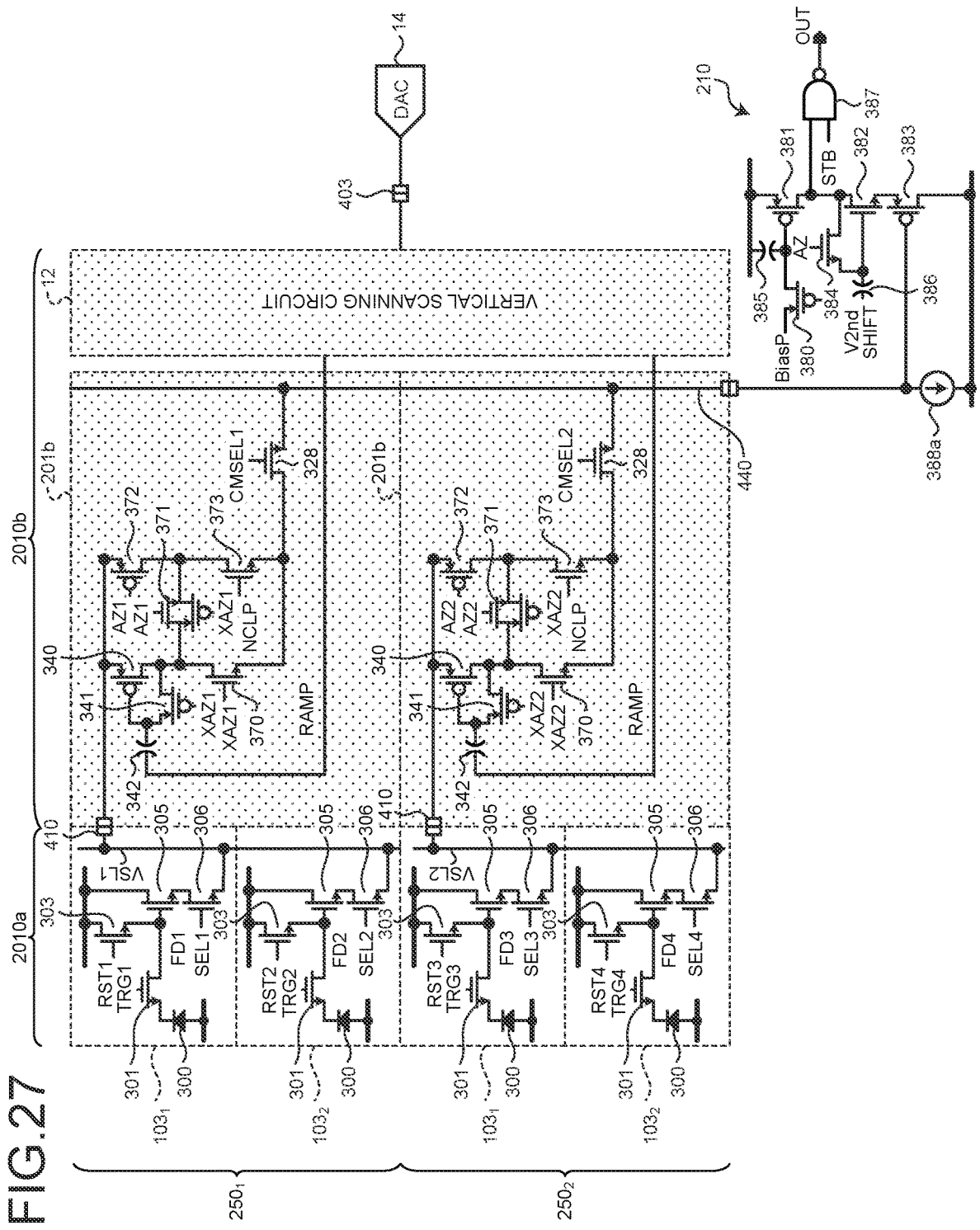
FIG. 27 is a circuit diagram illustrating a configuration of an example according to a first example of a modification of the fourth embodiment.

A first example of the modification of the fourth embodiment will be described. FIG. 27 is a circuit diagram illustrating a configuration of an example according to the first example of the modification of the fourth embodiment.

In the example of FIG. 27, two pixel/first stage comparator units $250_1$ and $250_2$ are connected to the second circuit 210 serving as the middle stage comparator 202. The pixel/first stage comparator units $250_1$ and $250_2$ include photoelectric conversion/pixel circuit units $103_1$ and $103_2$ and a first stage comparator 201b, respectively. Each of the photoelectric conversion/pixel circuit units $103_1$ and $103_2$ constitutes a so-called four-transistor photoelectric conversion element readout circuit including the photoelectric conversion unit 100 and the pixel circuit.

As illustrated in FIG. 27, in each of the pixel/first stage comparator units $250_1$ and $250_2$, the photoelectric conversion/pixel circuit units $103_1$ and $103_2$ are formed in the first layer 2010a of the substrate, and the first stage comparator 201b and the vertical scanning circuit 12 are formed in the second layer 2010b of the substrate. Furthermore, the DAC 14 and the second circuit 210 are formed in the memory+logic unit 2011.

In the pixel/first stage comparator unit $250_1$, the outputs of the photoelectric conversion/pixel circuit units $103_1$ and $103_2$ are connected to a VSL1. On the other hand, in the pixel/first stage comparator unit $250_2$, the outputs of the photoelectric conversion/pixel circuit units $103_1$ and $103_2$ are connected to a VSL2 separated from the VSL1.

In the pixel/first stage comparator units $250_1$ and $250_2$, the first stage comparator 201b constitutes, for example, a comparator circuit using the pMOS transistor 340 and the switch circuit 341, similarly to the circuit described with reference to FIG. 18 and the like.

In the first stage comparator 201b, the source of the pMOS transistor 340 is connected to the VSL1 via a connection unit 410 and is also connected to the source of a pMOS transistor 372. The drain of the pMOS transistor 340 is connected to one end of the switch circuit 341 (the drain of the pMOS transistor) and the drain of an nMOS transistor 370. The drain of the pMOS transistor 372 is connected to the drain of an nMOS transistor 373, and the sources of the nMOS transistors 373 and 370 are connected to one end of the switch circuit 328 by the nMOS transistor. The other end of the switch circuit 328 is connected to the middle stage comparator input line 440.

Furthermore, a connection point at which the pMOS, 340, and the nMOS transistor 370 are connected to each other and a connection point at which the drain of the pMOS transistor 372 and the drain of the nMOS transistor 373 are connected to each other are connected via a switch circuit 371 in which the nMOS transistor and the pMOS transistor are connected to each other in parallel.

Further, the RAMP signal is supplied from the vertical scanning circuit 12 to the connection point at which the gate of the pMOS transistor 340 and the other end of the switch circuit 341 are connected to each other via the capacitor 342.

In the pixel/first stage comparator unit $250_1$, the readout operation of the photoelectric conversion element 300 in the photoelectric conversion/pixel circuit unit $103_1$ is controlled by the signals TRG1, RST1, and SEL1 supplied for each row from the vertical scanning circuit 12, and the readout operation of the photoelectric conversion element 300 in the photoelectric conversion/pixel circuit unit 103: is controlled by the signals TRG2, RST2, and SEL2 supplied for each row from the vertical scanning circuit 12.

Furthermore, the operation of the first stage comparator 201b is controlled by signals AZ1 and XAZ1 inverted from each other and a signal NCLP supplied for each row by the pixel/first stage comparator unit $250_1$ from the vertical scanning circuit 12. Furthermore, the connection between the first stage comparator 201b and the middle stage comparator input line 440 is controlled by the signal CMSEL1 supplied for each row by the pixel/first stage comparator unit $250_1$ from the vertical scanning circuit 12.

In the same manner, in the pixel/first stage comparator unit $250_2$, the readout operation of the photoelectric conversion element 300 in the photoelectric conversion/pixel circuit unit $103_1$ is controlled by the signals TRG3, RST4, and SEL4 supplied for each row from the vertical scanning circuit 12, and the readout operation of the photoelectric conversion element 300 in the photoelectric conversion/pixel circuit unit $103_2$ is controlled by the signals TRG4, RST4, and SEL4 supplied for each row from the vertical scanning circuit 12.

Furthermore, the operation of the first stage comparator 201b is controlled by signals AZ2 and XAZ2 inverted from each other and the signal NCLP supplied for each row by the pixel/first stage comparator unit $250_1$ from the vertical scanning circuit 12. Furthermore, the connection between the first stage comparator 201b and the middle stage comparator input line 440 is controlled by the signal CMSEL2 supplied for each row by the pixel/first stage comparator unit $250_1$ from the vertical scanning circuit 12.

The middle stage comparator input line 440 is connected to the gate of a pMOS transistor 383 included in the second circuit 210 and is connected to a current source 388a.

It is noted that the respective signals OFG1 to OFG4, TRG1 to TRG4, RST1 to RST4, SEL1 to SEL4, CMSEL1 and CMSEL2, XCMSEL1 and XCMSEL2, AZ1 and AZ2, XAZ1 and XAZ2, and NCLP are generated in the logic circuit 40 of the memory+logic unit 2011, and supplied to the pixel/first stage comparator units $250_1$ and $250_2$ via the vertical scanning circuit 12.

The operation of the first stage comparator 201b will be schematically described. Since the operation of the first stage comparator 201b of each of the pixel/first stage comparator units $250_1$ and $250_2$ is similar, the first stage comparator 201b included in the pixel/first stage comparator unit $250_1$ will be described here.

The first stage comparator 201b performs an auto zero (AZ) operation before the P-phase period. In the auto zero operation, the switch circuit 341 of the pMOS transistor is turned on by the signal XAZ1, the pMOS transistor 340 is diode-connected, the pMOS transistor 372 is turned off by the signal AZ1 which is an inverted signal of the signal XAZ1, and the nMOS transistor 370 is also turned off by the signal XAZ1. On the other hand, the switch circuit 371 is turned on by the signals AZ1 and XAZ1.

For example, the pixel signal output from the photoelectric conversion/pixel circuit unit $103_1$ is input to the drain of the nMOS transistor 373 through the switch circuit 371 via the diode-connected pMOS transistor 340. The nMOS transistor 373 is turned on by the signal NCLP, and the pixel signal input to the drain of the nMOS transistor 373 is input to one end of the switch circuit 328. When the switch circuit 328 is turned on by the signal CMSEL1, the pixel signal is supplied to the middle stage comparator input line 440 via the switch circuit 328 and connected to the current source 388a. As a result, the first stage comparator 201b is reset.

After the auto zero operation is completed, the switch circuits 341 and 371 are turned off by the signals AZ1 and XAZ1. On the other hand, the pMOS transistor 372 and the nMOS transistor 370 are turned on by the signals AZ1 and XAZ1, and two current paths in the vertical direction in the drawing are configured.

In this state, on the basis of a difference between the amounts of current flowing through the two current paths according to the currents of the signal of the VSL1 by the pixel signal output from the photoelectric conversion/pixel circuit unit $103_1$ and the RAMP signal, 0/1 determination is performed in the middle stage comparator 202 by the second circuit 210.

The second circuit 210 includes pMOS transistors 380, 381, and 383, nMOS transistors 382 and 384, capacitors 385 and 386, and a NAND circuit 387.

The middle stage comparator input line 440 is connected to the gate of the pMOS transistor 383. The drain of the pMOS transistor 383 is connected to the first fixed potential, and the source thereof is connected to the source of the nMOS transistor 382. The drain of the nMOS transistor 384 is connected to the drain of the nMOS transistor 382, and the source of the nMOS transistor 384 is connected to the gate of the nMOS transistor. The signal AZ is input to the gate of the nMOS transistor 384. Furthermore, a signal V2ndSHIFT is input to a connection point at which the gate of the nMOS transistor 382 and the source of the nMOS transistor 384 are connected to each other via the capacitor 386. In this manner, the nMOS transistors 382 and 384 and the capacitor 386 constitute a comparator that performs a comparison operation on the signal supplied from the middle stage comparator input line 440.

On the other hand, a bias voltage BaisP is input to the source of the pMOS transistor 380, and the drain of the pMOS transistor 380 is connected to the gate of the pMOS transistor 381. The other end of the capacitor 385 having one end connected to the second fixed voltage is connected to a connection point at which the drain of the pMOS transistor 380 and the gate of the pMOS transistor 381 are connected to each other. The source of the pMOS transistor 381 is connected to the second fixed voltage, and the drain thereof is connected to the drain of the nMOS transistor 382.

An output signal is extracted from a connection point at which the drain of the pMOS transistor 381 and the drain of the nMOS transistor 382 are connected to each other, and is input to one input terminal of the NAND circuit 387. The signal STB is input to the other input terminal of the NAND circuit 387. The signal STB functions as a mask signal for masking a signal unnecessary for the comparator operation. The signal STB is generated, for example, in the logic circuit 40 of the memory+logic unit 2011. The output of the NAND circuit 387 is an output signal from the second circuit 210 (the middle stage comparator 202).

Also, in the configuration according to the first example of the modification of the fourth embodiment, similarly to the above-described fourth embodiment, when the photoelectric conversion/pixel circuit units $103_1$ and $103_2$ perform the read operation in the pixel/first stage comparator unit $250_1$, the switch circuit 328 is turned on to activate the first stage comparator 201b. On the other hand, in the pixel/first stage comparator unit $250_2$, when the photoelectric conversion/pixel circuit units $103_1$ and $103_2$ perform the read operation, the switch circuit 328 is turned off to deactivate the first stage comparator 201b.

This operation is similar to a case in which the photoelectric conversion/pixel circuit units $103_1$ and $103_2$ perform the read operation in the pixel/first stage comparator unit $250_2$.

According to the configuration of the first example of the modification of the fourth embodiment, the outputs of the photoelectric conversion/pixel circuit units $103_1$ and $103_2$ are connected to the VSL. At the same time, the operations of the photoelectric conversion/pixel circuit units $103_1$ and $103_2$ are switched for each of the pixel/first stage comparator units $250_1$ and $250_2$. Therefore, the VSL can be divided for each of the pixel/first stage comparator units $250_1$ and $250_2$. Therefore, the load on the VSL is reduced as compared with the first to third embodiments described above.

6-1-2. Second Example

Next, a second example of the modification of the fourth embodiment will be described. In the first example of the above-described above-described modification of the fourth embodiment, the current source 388a is placed on the second circuit 210 side. On the other hand, in the second example of the modification of the fourth embodiment, the current source is placed on the first stage comparator 201 side.

Figure 28:
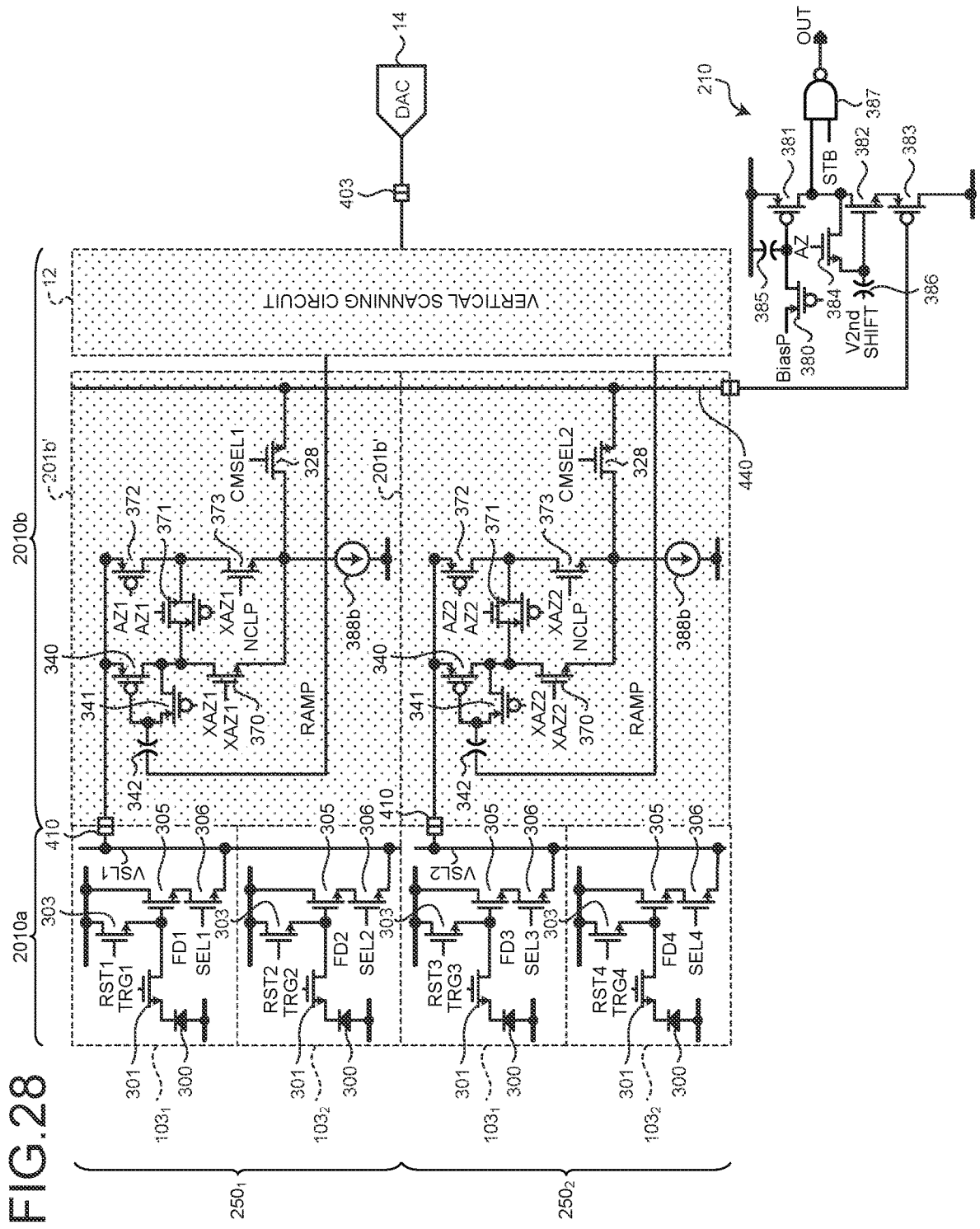
FIG. 28 is a circuit diagram illustrating a configuration of an example according to a second example of the modification of the fourth embodiment.

FIG. 28 is a circuit diagram illustrating a configuration of an example according to the second example of the modification of the fourth embodiment. As illustrated in FIG. 28, a current source 388b is provided in a first stage comparator 201b' of each of the pixel/first stage comparator units $250_1$ and $250_2$. On the other hand, there is no current source on the side of the second circuit 210. Even with such a configuration, it is possible to realize the same operation as the first example of the modification of the fourth embodiment described above.

As illustrated in FIG. 28, in each of the pixel/first stage comparator units $250_1$ and $250_2$, the photoelectric conversion/pixel circuit units $103_1$ and $103_2$ are formed in the first layer 2010a of the substrate, and the first stage comparator 201b' and the vertical scanning circuit 12 are formed in the second layer 2010b of the substrate. Furthermore, the DAC 14 and the second circuit 210 are formed in the memory+logic unit 2011.

In the configuration according to the first example of the modification of the fourth embodiment described above, there is always one current source 388a for the pixel/first stage comparator units $250_1$ and $250_2$. Therefore, current fluctuation hardly occurs when the pixel/first stage comparator units $250_1$ and $250_2$ are switched between active and inactive. On the other hand, in the configuration according to the first example of the modification of the fourth embodiment, an operation point may fluctuate due to IR drop or the like by the wiring resistance of the middle stage comparator input line 440.

On the other hand, in the configuration according to the second example of the modification of the fourth embodiment, each of the pixel/first stage comparator units $250_1$ and $250_2$ includes the current source 388b. Therefore, the IR drop due to the wiring resistance for each current source 388b can be made smaller than the configuration of the first example of the modification of the fourth embodiment described above. On the other hand, in the configuration according to the second example of the modification of the fourth embodiment, the active/inactive states of the pixel/first stage comparator units $250_1$ and $250_2$ are switched, and the current source 388b is switched. Therefore, a change in IR drop may occur due to a mismatch of the current source 388b or the like.

As described above, the configuration according to the first example of the modification of the fourth embodiment and the configuration according to the second example of the modification of the fourth embodiment have opposite merits and demerits. Therefore, these configurations are preferably selected according to specifications of a system on which the imaging device 1004 is mounted.

6-1-3. Third Example

Next, a third example of the modification of the fourth embodiment will be described. The third example of the modification of the fourth embodiment is an example in which a cascode circuit using the pMOS transistor is added to the configuration according to the first example of the modification of the fourth embodiment described with reference to FIG. 27.

Figure 29:
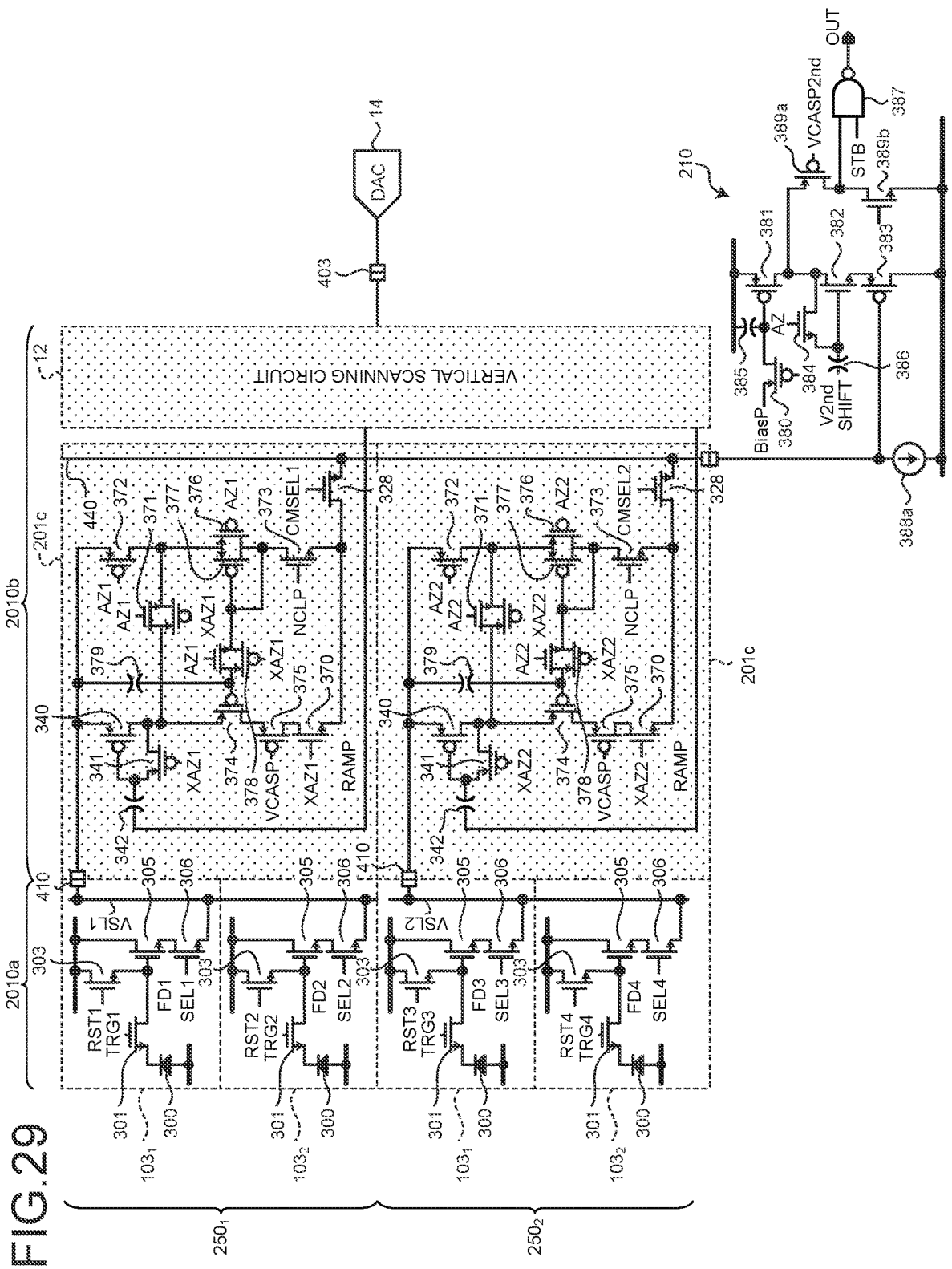
FIG. 29 is a circuit diagram illustrating a configuration of an example according to a third example of the modification of the fourth embodiment.

FIG. 29 is a circuit diagram illustrating a configuration of an example according to the third example of the modification of the fourth embodiment. In FIG. 29, since the configurations of the pixel/first stage comparator units $250_1$ and $250_2$ are common, the pixel/first stage comparator unit $250_1$ will be described here as an example.

In FIG. 29, in a first stage comparator 201c included in the pixel/first stage comparator unit $250_1$, pMOS transistors 374 to 377 and a switch circuit 378 are added to the first stage comparator 201b in FIG. 27. The switch circuit 378 has a configuration in which the nMOS transistor and the pMOS transistor are connected in parallel, and the signals AZ1 and XAZ1 inverted from each other are input to respective gates.

The source of the pMOS transistor 374 is connected to the drain of the pMOS transistor 340, and the drain thereof is connected to the source of the pMOS transistor 375. The gate of the pMOS transistor 374 is connected to one end of the switch circuit 378. In this manner, the pMOS transistors 374 and 375 are cascode-connected. The drain of the pMOS transistor 375 is connected to the drain of the nMOS transistor 370. The signal VCASP is input to the gate of the pMOS transistor 375.

A connection point at which the gate of the pMOS transistor 374 and one end of the switch circuit 378 are connected to each other is connected to the VSL1 via a capacitor 379.

The other end of the switch circuit 378 is connected to the gate of the pMOS transistor 377. The source of the pMOS transistor 377 is connected to the source of the pMOS transistor 376, and a connection point at which the sources are connected to each other is connected to the drain of the pMOS transistor 372 and one end of the switch circuit 371. The drain of the pMOS transistor 377 is connected to the drain of the pMOS transistor 376, and a connection point thereof is connected to the drain of the nMOS transistor 373 and is also connected to a connection point at which the other end of the switch circuit 378 and the gate of the pMOS transistor 377 are connected to each other. The signal AZ1 is input to the gate of the pMOS transistor 376.

The cascode connection of the pMOS transistors 374 and 375 is provided to provide a bias to the output that causes the drain voltage of the input pMOS transistor 340 to interlock with the VSL voltage to some extent. By providing the bias so as to cause the drain voltage of the pMOS transistor 340 to interlock with the VSL voltage, it is possible to improve the linearity of the input pMOS transistor 340.

It is noted that the respective signals OFG 1 to OFG 4, TRG1 to TRG4, RST1 to RST4, SEL1 to SEL4, CMSEL1 and CMSEL2, XCMSEL1 and XCMSEL2, AZ1 and AZ2, XAZ1 and XAZ2, NCLP, and VCASP are generated in the logic circuit 40 of the memory+logic unit 2011, and are supplied to the pixel/first stage comparator units $250_1$ and $250_2$ via the vertical scanning circuit 12.

The second circuit 210 is an example in which a folded cascode circuit including a pMOS transistor 389a and an nMOS transistor 389b is added to the second circuit 210 illustrated in FIG. 27. A signal VCASP2nd is input to the gate of the pMOS transistor 389a. A signal extracted from a connection point at which the drain of the pMOS transistor 381, the drain of the nMOS transistor 382, and the drain of the nMOS transistor 384 are connected to each other is input to the source of the pMOS transistor 389a. A signal extracted from a connection point at which the drain of the pMOS transistor 389a and the drain of the nMOS transistor 389b are connected to each other is input to one input terminal of the NAND circuit 387.

It is noted that the configuration of the second circuit 210 can be replaced with the second circuit 210 illustrated in FIG. 27.

As illustrated in FIG. 29, in each of the pixel/first stage comparator units $250_1$ and $250_2$, the photoelectric conversion/pixel circuit units $103_1$ and $103_2$ are formed in the first layer 2010a of the substrate, and the first stage comparator 201c and the vertical scanning circuit 12 are formed in the second layer 2010b of the substrate. Furthermore, the DAC 14 and the second circuit 210 are formed in the memory+logic unit 2011.

6-1-4. Fourth Example

Next, a fourth example of the modification of the fourth embodiment will be described. The fourth example of the modification of the fourth embodiment is an example in which the first stage comparator 201 in each of the pixel/first stage comparator units 250₁ and 250₂ is implemented by a comparator configuration using a differential pair, which is generally used in a single-slope comparator.

Figure 30:
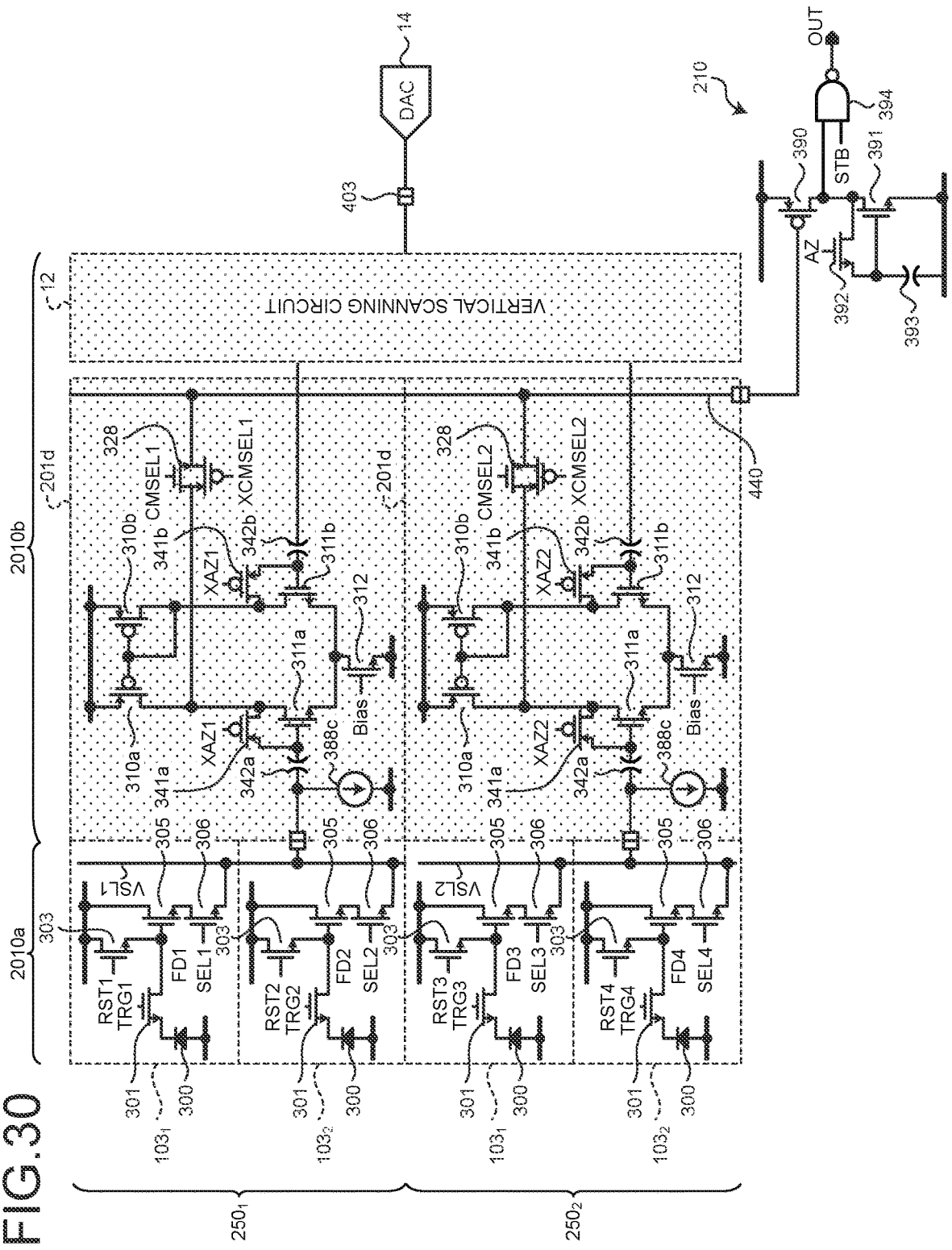
FIG. 30 is a circuit diagram illustrating a configuration of an example according to a fourth example of the modification of the fourth embodiment.

FIG. 30 is a circuit diagram illustrating a configuration of an example according to the fourth example of the modification of the fourth embodiment. In FIG. 29, since the configurations of the pixel/first stage comparator units 250₁ and 250₂ are common, the pixel/first stage comparator unit 250₁ will be described here as an example.

In FIG. 30, a first stage comparator 201d included in the pixel/first stage comparator unit 250₁ is configured as a differential comparator including an active load by the pMOS transistors 310a and 310b and a differential pair by the nMOS transistors 311a and 311b. In the first stage comparator 201d, the RAMP signal is supplied to the gate of the nMOS transistor 311b via a capacitor 342b. Furthermore, the gate of the nMOS transistor 311a is connected to the VSL1 via a capacitor 342a and is also connected to a current source 388c, and pixel signals output from the photoelectric conversion/pixel circuit units 103₁ and 103₂ are input thereto.

Furthermore, in the first stage comparator 201d, the output extracted from the drain of the pMOS transistor 310a is connected to the middle stage comparator input line 440 via the switch circuit 328 including the nMOS transistor and the pMOS transistor connected in parallel.

Furthermore, in the first stage comparator 201d, the drain and the source of a pMOS transistor 341a are connected to the drain and the gate of the nMOS transistor 311a, respectively. Similarly, the drain and the source of a pMOS transistor 341b are connected to the drain and the gate of the nMOS transistor 311b, respectively. The pMOS transistors 341a and 341b are provided to perform the auto zero operation according to the signal XAZ1.

It is noted that the respective signals OFG 1 to OFG 4, TRG1 to TRG4, RST1 to RST4, SEL1 to SEL4, CMSEL1 and CMSEL2, XCMSEL1 and XCMSEL2, AZ1 and AZ2, and XAZ1 and XAZ2 are generated in the logic circuit 40 of the memory+logic unit 2011, and are supplied to the pixel/first stage comparator units 250₁ and 250₂ via the vertical scanning circuit 12.

The second circuit 210 includes a pMOS transistor 390, nMOS transistors 391 and 392, a capacitor 393, and a NAND circuit 394. The pMOS transistor 390 has a source connected to the second fixed potential, a gate connected to the middle stage comparator input line 440 via a connection unit, and a drain connected to the drains of the nMOS transistors 391 and 392. The gate of the nMOS transistor 391 is connected to the source of the nMOS transistor 392, and a connection point thereof is connected to the first fixed potential via the capacitor 393. Furthermore, the source of the nMOS transistor 391 is connected to the first fixed potential.

An output signal is extracted from a connection point at which the drain of the pMOS transistor 390 and the drains of the nMOS transistors 391 and 392 are connected to each other, and is input to one input terminal of the NAND circuit 394. The signal STB, which is a mask signal, is input to the other input terminal of the NAND circuit 394. The output of the NAND circuit 394 is set as an output signal of the second circuit 210 (the middle stage comparator 202).

The second circuit 210 illustrated in FIG. 30 is a general source-grounded circuit and has a function of sampling and holding (S/H) the gate voltage of the current source at the timing of the signal AZ.

As illustrated in FIG. 30, in each of the pixel/first stage comparator units 250₁ and 250₂, the photoelectric conversion/pixel circuit units 103₁ and 103₂ are formed in the first layer 2010a of the substrate, and the first stage comparator 201d and the vertical scanning circuit 12 are formed in the second layer 2010b of the substrate. Furthermore, the DAC 14 and the second circuit 210 are formed in the memory+logic unit 2011.

7. Fifth Embodiment

Next, a fifth embodiment of the present disclosure will be described. The fifth embodiment illustrates a specific structure in a case where the imaging device 1004 described using the first to fourth embodiments is configured as one solid-state imaging element 2000a.

7-1. First Example

Figure 31A:
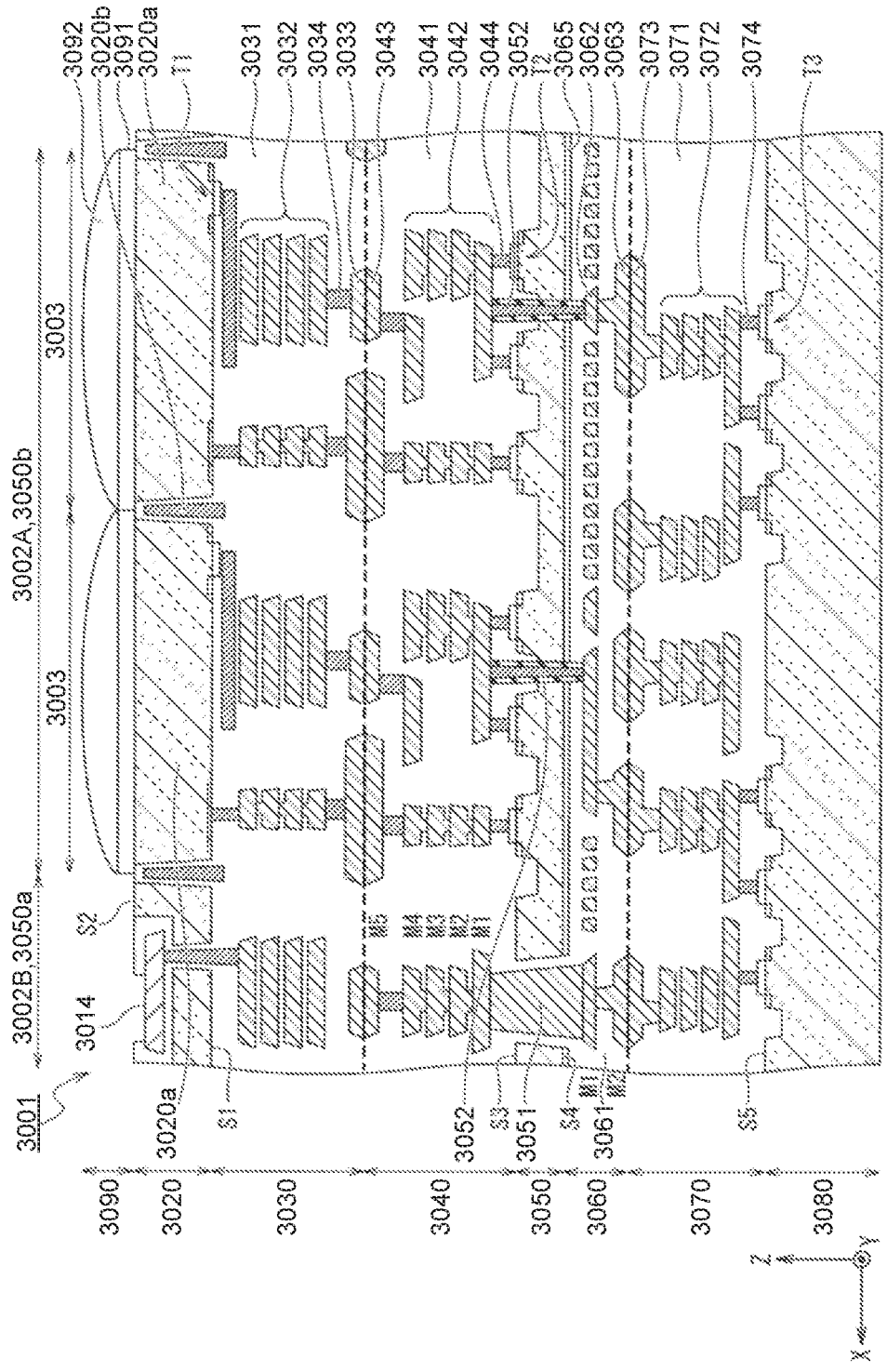
FIG. 31A is a schematic diagram illustrating a cross-sectional structure of an example of an imaging device 3001 according to a first example of a fifth embodiment.
Figure 31B:
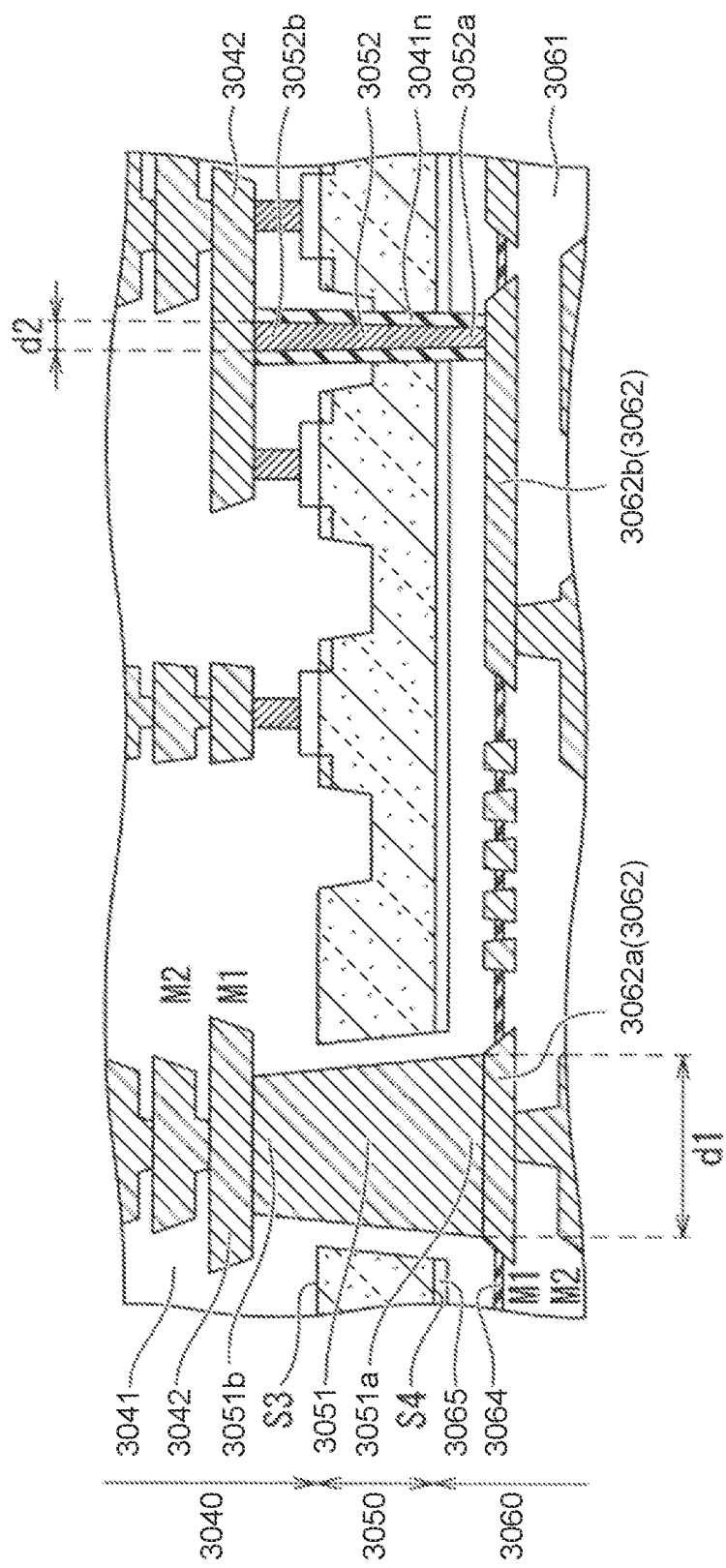
FIG. 31B is a schematic diagram illustrating the cross-sectional structure of the example of the imaging device 3001 according to the first example of the fifth embodiment.

First, a first example of the fifth embodiment will be described. FIGS. 31A and 31B are schematic diagrams illustrating a cross-sectional structure of an example of an imaging device 3001 according to the first example of the fifth embodiment. The imaging device 3001 may be associated with the imaging device 1004 described using the first to fourth embodiments.

(Stacked Structure of Solid-State Imaging Element)

As illustrated in FIG. 31A, the imaging device 3001 has a stacked structure in which a condensing layer 3090, a first semiconductor layer 3020, a first wiring layer 3030, a second wiring layer 3040, a second semiconductor layer 3050, a third wiring layer 3060, a fourth wiring layer 3070, and a third semiconductor layer 3080 are stacked in this order.

The condensing layer 3090 has a stacked structure in which, for example, a color filter 3091 and an on-chip lens 3092 are stacked in this order from the second surface S2 side of the first semiconductor layer 3020, although not limited thereto. The first semiconductor layer 3020 has a photoelectric conversion region to be described later, and one surface thereof is a first surface S1 and the other surface thereof is a second surface S2 which is a light incident surface. The first wiring layer 3030 is overlapped with the first surface S1 of the first semiconductor layer 3020. The second wiring layer 3040 is overlapped with a surface of the first wiring layer 3030 opposite to the surface on the first semiconductor layer 3020 side. The second semiconductor layer 3050 includes a plurality of transistors, one surface thereof is a third surface S3, the other surface thereof is a fourth surface S4, and the third surface S3 is overlapped with a surface of the second wiring layer 3040 opposite to the surface on the first wiring layer 3030 side. The third wiring layer 3060 is overlapped with the fourth surface S4 of the second semiconductor layer 3050. The fourth wiring layer 3070 is overlapped with a surface of the third wiring layer 3060 opposite to the surface on the second semiconductor layer 3050 side. A fifth surface S5 of the third semiconductor layer 3080 is overlapped with a surface of the fourth wiring layer 3070 opposite to the surface on the third wiring layer 3060 side.

Here, the first surface S1 of the first semiconductor layer 3020 may be referred to as an element formation surface or a main surface, and the second surface S2 of the first semiconductor layer 3020 may be referred to as a light incident surface or a back surface. In addition, the third surface S3 of the second semiconductor layer 3050 may be referred to as an element formation surface or a main surface, and the fourth surface S4 of the second semiconductor layer 3050 may be referred to as a back surface. Further, the fifth surface S5 of the third semiconductor layer 3080 may be referred to as an element formation surface or a main surface, and a surface opposite to the fifth surface S5 may be referred to as a back surface.

In addition, the first semiconductor layer 3020 and the second semiconductor layer 3050 are bonded to each other via the first wiring layer 3030 and the second wiring layer 3040 by a face-to-face (F2F) method, that is, so that the element formation surfaces face each other. Furthermore, the second semiconductor layer 3050 and the third semiconductor layer 3080 are bonded to each other with the third wiring layer 3060 and the fourth wiring layer 3070 interposed therebetween by a back to face (B2F) method, that is, so that the back surface and the element formation surface face each other.

(First Semiconductor Layer)

The first semiconductor layer 3020 includes a semiconductor substrate. The first semiconductor layer 3020 is formed of a single crystalline silicon substrate of a first conductivity type, for example, a p-type. In addition, for example, a bonding pad 3014 is provided in a region of the first semiconductor layer 3020 overlapping a peripheral region 2B in plan view. Then, a photoelectric conversion region 3020a is provided for each pixel 3003 in a region overlapping the pixel region in the first semiconductor layer 3020. For example, the island-shaped photoelectric conversion region 3020a partitioned by an isolation region 3020b is provided for each pixel 3003. It is noted that the number of pixels 3003 is not limited to FIG. 31A.

Although not illustrated, the photoelectric conversion region 3020a includes a well region of a first conductivity type, for example, a p-type, and a semiconductor region (photoelectric conversion unit) of a second conductivity type, for example, an n-type, embedded in the well region. The photoelectric conversion element PD illustrated in FIG. 3 is configured in the photoelectric conversion region 3020a including the well region of the first semiconductor layer 3020 and the photoelectric conversion unit. Furthermore, although not limited thereto, the photoelectric conversion region 3020a may be provided with a charge storage region (not illustrated), which is a semiconductor region of the second conductivity type, for example, n-type, and a transistor T1.

For example, the isolation region 3020b has, but is not limited to, a trench structure in which an isolation groove is formed in the first semiconductor layer 3020 and an insulating film is embedded in the isolation groove. In the example illustrated in FIG. 31A, the insulating film and metal are embedded in the isolation groove.

(First Wiring Layer)

The first wiring layer 3030 includes an insulating film 3031, a wiring 3032, a first connection pad 3033, and a via (contact) 3034. The wiring 3032 and the first connection pad 3033 are stacked with the insulating film 3031 interposed therebetween, as illustrated in the drawing. The first connection pad 3033 faces a surface of the first wiring layer 3030 on a side opposite to the first semiconductor layer 3020 side. The via 3034 connects the first semiconductor layer 3020 to the wiring 3032, the wirings 3032 to each other, and the wiring 3032 to the first connection pad 3033. Further, the wiring 3032 and the first connection pad 3033 are not limited thereto, but may be made of copper, for example, and may be formed by a damascene method.

(Second Wiring Layer)

The second wiring layer 3040 includes an insulating film 3041, a wiring 3042, a second connection pad 3043, and a via (contact) 3044. The wiring 3042 and the second connection pad 3043 are stacked with the insulating film 3041 interposed therebetween, as illustrated in the drawing. The second connection pad 3043 faces a surface of the second wiring layer 3040 opposite to the second semiconductor layer 3050 side and is bonded to the first connection pad 3033. The via 3044 connects the second semiconductor layer 3050 to the wiring 3042, the wirings 3042 to each other, and the wiring 3042 to the second connection pad 3043. Further, the wiring 3042 and the second connection pad 3043 are not limited thereto, but may be made of copper, for example, and may be formed by a damascene method.

(Second Semiconductor Layer)

The second semiconductor layer 3050 includes a semiconductor substrate. The second semiconductor layer 3050 includes, but is not limited to, a single crystal silicon substrate. The second semiconductor layer 3050 has a first conductivity type, for example, a p-type. The second semiconductor layer 3050 is provided with a plurality of transistors T2. More specifically, the transistors T2 are provided in a region overlapping the pixel region in the second semiconductor layer 3050. It is noted that, in the second semiconductor layer 3050, in order to distinguish between a region overlapping the pixel region in plan view and a region overlapping the peripheral region around the pixel region in plan view, a region overlapping a peripheral region 3002B is referred to as a first region 3050a, and a region overlapping a pixel region 3002A is referred to as a second region 3050b.

(First Conductor and Second Conductor)

The second semiconductor layer 3050 is provided with a first conductor 3051 and a second conductor 3052. More specifically, the first region 3050a is provided with the first conductor 3051 that has a first width, is made of a first material, and penetrates the second semiconductor layer 3050 in the thickness direction. The second region 3050b is provided with the second conductor 3052 that has a second width smaller than the first width, is made of a second material different from the first material, and penetrates the second semiconductor layer 3050 in the thickness direction. The first conductor 3051 and the second conductor 3052 are conductors (electrodes) penetrating the semiconductor layer. In the present embodiment, since the semiconductor layer is made of silicon, each of the first conductor 3051 and the second conductor 3052 is a through-silicon via (TSV).

Although the first conductor 3051 is not limited thereto, for example, the first conductor 3051 is used as a power supply line. Therefore, the first conductor 3051 preferably has electrically low resistance. Therefore, it is preferable to use a conductive material having a low electrical resistivity as a first material constituting the first conductor 3051. Here, copper, which is an example of such a conductive material, is used as the first material. In addition, the resistance of the first conductor 3051 can be reduced by increasing a first width. Since the arrangement density of elements and wirings is low in the first region 3050a in which the first conductor 3051 is provided, the first width can be increased.

Since the second conductor 3052 is provided in the second region 3050b provided with the plurality of transistors T2, the second conductor 3052 may need to be provided in a narrow region between the transistors T2. Therefore, it is necessary to reduce the second width. When the second width is reduced, the aspect ratio of the second conductor 3052 increases. The aspect ratio of the second conductor 3052 is not limited thereto, but may be, for example, 5 or more. With such an aspect ratio, embedding with the same material (here, for example, copper) as the first material may be difficult. Therefore, it is preferable to use a conductive material having good embeddability into a hole having a high aspect ratio as the second material constituting the second conductor 3052. Examples of such a conductive material include a high melting point metal. Examples of the high melting point metal include tungsten (W), cobalt (Co), ruthenium (Ru), and a metal material containing at least one of tungsten (W), cobalt (Co), and ruthenium (Ru). Here, tungsten is used as the second material.

As illustrated in FIG. 31B, the first conductor 3051 has an end 3051a and an end 3051b in a penetrating direction. The penetrating direction is a direction in which the first conductor 3051 penetrates the second semiconductor layer 3050, and is also a thickness direction of the second semiconductor layer 3050. The end 3051a of the first conductor 3051 is located in the third wiring layer 3060, and the end 3051b is located in the second wiring layer 3040. Since the first conductor 3051 has a tapered shape in the penetrating direction, the diameter of the end 3051a is larger than the diameter of the end 3051b. The above-described first width corresponds to, for example, a larger dimension of the ends in the penetrating direction of the first conductor 3051. More specifically, the first width corresponds to the larger one of the dimension (diameter in this case) of the end 3051a and the dimension (diameter in this case) of the end 3051b, that is, the dimension (diameter in this case) of the end 3051a. It is noted that the diameter is a distance between side surfaces, and the planar shape of the first conductor 3051 does not matter. Here, the diameter of the end 3051a is represented as a diameter d1.

Similarly, the second conductor 3052 has an end 3052a and an end 3052b in the penetrating direction. The penetrating direction is a direction in which the second conductor 3052 penetrates the second semiconductor layer 3050, and is also a thickness direction of the second semiconductor layer 3050. The end 3052a of the second conductor 3052 is located in the third wiring layer 3060, and the end 3052b is located in the second wiring layer 3040. Since the second conductor 3052 has a tapered shape in the penetrating direction, the diameter of the end 3052b is larger than the diameter of the end 3052a. The above-described second width corresponds to, for example, the larger dimension of the ends in the penetrating direction of the second conductor 3052. More specifically, the above-described second width corresponds to the larger one of the dimension (the diameter in the case) of the end 3052a and the dimension (the diameter in this case) of the end 3052b, that is, the dimension (the diameter in this case) of the end 3052b. It is noted that the diameter is a distance between side surfaces, and the planar shape of the second conductor 3052 does not matter. Here, the diameter of the end 3052b is represented as a diameter d2. The diameter d2 of the end 3052b is smaller than the diameter d1 of the end 3051a (d2<d1).

One of the end 3051a having the first width of the first conductor 3051 and the end 3052b having the second width of the second conductor 3052 is located in the second wiring layer 3040, and the other is located in the third wiring layer 3060. In the example illustrated in FIG. 31A, the end 3052b is located in the second wiring layer 3040, and the end 3051a is located in the third wiring layer 3060.

The ends on one side of the first conductor 3051 and the second conductor 3052 are connected to different wirings belonging to one metal layer provided in a wiring layer on the same side as the ends on one side. More specifically, the end 3051a of the first conductor 3051 on the third wiring layer 3060 side (one side) and the end 3052a of the second conductor 3052 on the third wiring layer 3060 side (one side) are connected to a wiring formed by dividing one metal film and provided in the third wiring layer 3060 to be described later, or a wiring formed by embedding a metal film in a groove and removing a surplus portion of the metal film. More specifically, one metal film is a metal film M1m of the third wiring layer 3060 described in a manufacturing method to be described later. Then, the metal film M1m is divided to form a plurality of wirings 3062 belonging to a metal layer M1. Here, a wiring to which the end 3051a is connected is referred to as a wiring 3062a to be distinguished from other wirings, and a wiring to which the end 3051b is connected is referred to as a wiring 3062b to be distinguished from other wirings. In addition, one metal layer is a metal layer closest to the second semiconductor layer 3050 in the wiring layer on the same side as the end on one side.

The end 3051b of the first conductor 3051 on the second wiring layer 3040 side (the other side) and the end 3052b of the second conductor 3052 on the second wiring layer 3040 side (the other side) are connected to the wiring 3042 belonging to the metal layer M1 of the second wiring layer 3040.

(Third Wiring Layer)

As illustrated in FIGS. 31A and 31B, the third wiring layer 3060 includes an insulating film 3061, a wiring 3062, a third connection pad 3063, a barrier insulating film 3064, and a silicon cover film 3065. The wiring 3062 and the third connection pad 3063 are stacked with the insulating film 3061 interposed therebetween, as illustrated in the drawing. The third connection pad 3063 faces a surface of the third wiring layer 3060 on a side opposite to the second semiconductor layer 3050 side. The wiring 3062 and the third connection pad 3063 are not limited thereto, but may be made of copper, for example, and may be formed by a damascene method.

As illustrated in FIG. 31B, the third wiring layer 3060 includes the barrier insulating film 3064 provided at a position overlapping the wiring 3062 belonging to the metal layer M1 in the thickness direction. The barrier insulating film 3064 has a function of preventing diffusion of metal from the side opposite to the second semiconductor layer 3050 side of the barrier insulating film 3064 toward the second semiconductor layer 3050 side of the barrier insulating film 3064. More specifically, although the barrier insulating film 3064 is not limited thereto, for example, the metal (copper in this case) of the wiring formed on the side of the barrier insulating film 3064 opposite to the side of the second semiconductor layer 3050 is prevented from diffusing to the side of the second semiconductor layer 3050 of the barrier insulating film 3064. The barrier insulating film 3064 is a film having an insulating property, and is not limited thereto, and may be, for example, a film containing silicon (Si) and nitrogen (N), a film containing silicon and carbon (C), a SiCN film containing silicon, carbon, and nitrogen, or the like. Here, it is assumed that the barrier insulating film 3064 is a SiCN film.

The silicon cover film 3065 is provided to prevent light emission reflection of the element and is made of a high melting point oxide.

(Fourth Wiring Layer)

As illustrated in FIG. 31A, the fourth wiring layer 3070 includes an insulating film 3071, a wiring 3072, a fourth connection pad 3073, and a via (a contact) 3074. The wiring 3072 and the fourth connection pad 3073 are stacked with the insulating film 3071 interposed therebetween, as illustrated in the drawing. The fourth connection pad 3073 faces a surface of the fourth wiring layer 3070 on a side opposite to the third semiconductor layer 3080 side, and is bonded to the third connection pad 3063. The via 3074 connects the third semiconductor layer 3080 to the wiring 3072, the wirings 3072 to each other, and the wiring 3072 to the fourth connection pad 3073. Further, the wiring 3072 and the fourth connection pad 3073 are not limited thereto, but may be made of copper, for example, and may be formed by a damascene method.

(Third Semiconductor Layer)

The third semiconductor layer 3080 includes a semiconductor substrate. The third semiconductor layer 3080 is formed of a single crystalline silicon substrate of a first conductivity type, for example, a p-type. The third semiconductor layer 3080 is provided with a plurality of transistors T3. More specifically, the transistor T3 is provided in a region overlapping the pixel region 2A and the peripheral region 2B in plan view in the third semiconductor layer 3080.

In the above-described structure, the first semiconductor layer 3020 and the first wiring layer 3030 may be associated with the first layer 2010a of the above-described substrate. The second semiconductor layer 3050 and the second wiring layer 3040 may correspond to the second layer 2010b of the substrate described above. In addition, the third semiconductor layer 3080 and the fourth wiring layer 3070 may be associated with the memory+logic unit 2011.

7-2. Second Example

Next, a second example of the fifth embodiment will be described. The second example of the fifth embodiment is an example in which a method of bonding semiconductor layers is different from the structure of the first example of the fifth embodiment described above. The structures other than the second imaging device 3001 of the fifth embodiment are basically similar to those of the first example of the fifth embodiment. It is noted that the components already described are denoted by the same reference numerals, and the description thereof will be omitted.

Figure 32:
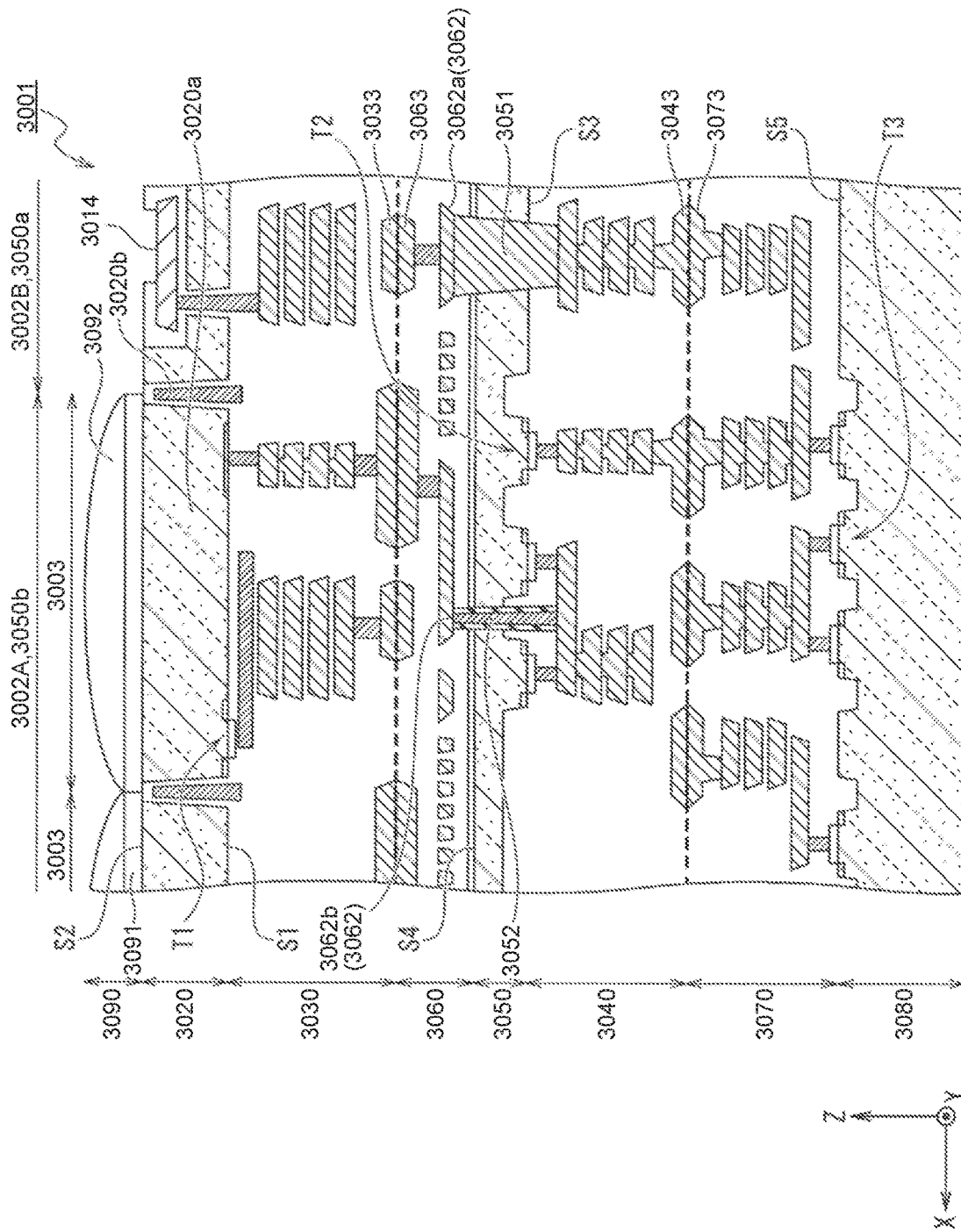
FIG. 32 is a schematic diagram illustrating a structure of the example of the imaging device 3001 according to the first example of the fifth embodiment.

FIG. 32 is a schematic diagram illustrating a structure of an example of the imaging device 3001 according to the first example of the fifth embodiment. The imaging device 3001 may be associated with the imaging device 1004 described using the first to fourth embodiments. In FIG. 32, the first semiconductor layer 3020 and the second semiconductor layer 3050 are bonded to each other with the first wiring layer 3030 and the third wiring layer 3060 interposed therebetween by a back to face (F2B) method, that is, so that the element formation surface and the back surface face each other. Further, the second semiconductor layer 3050 and the third semiconductor layer 3080 are boned to each other with the second wiring layer 3040 and the fourth wiring layer 3070 interposed therebetween by a back to face (F2F) method, that is, so that the element formation surfaces face each other.

7-3. Third Example

Figure 33:
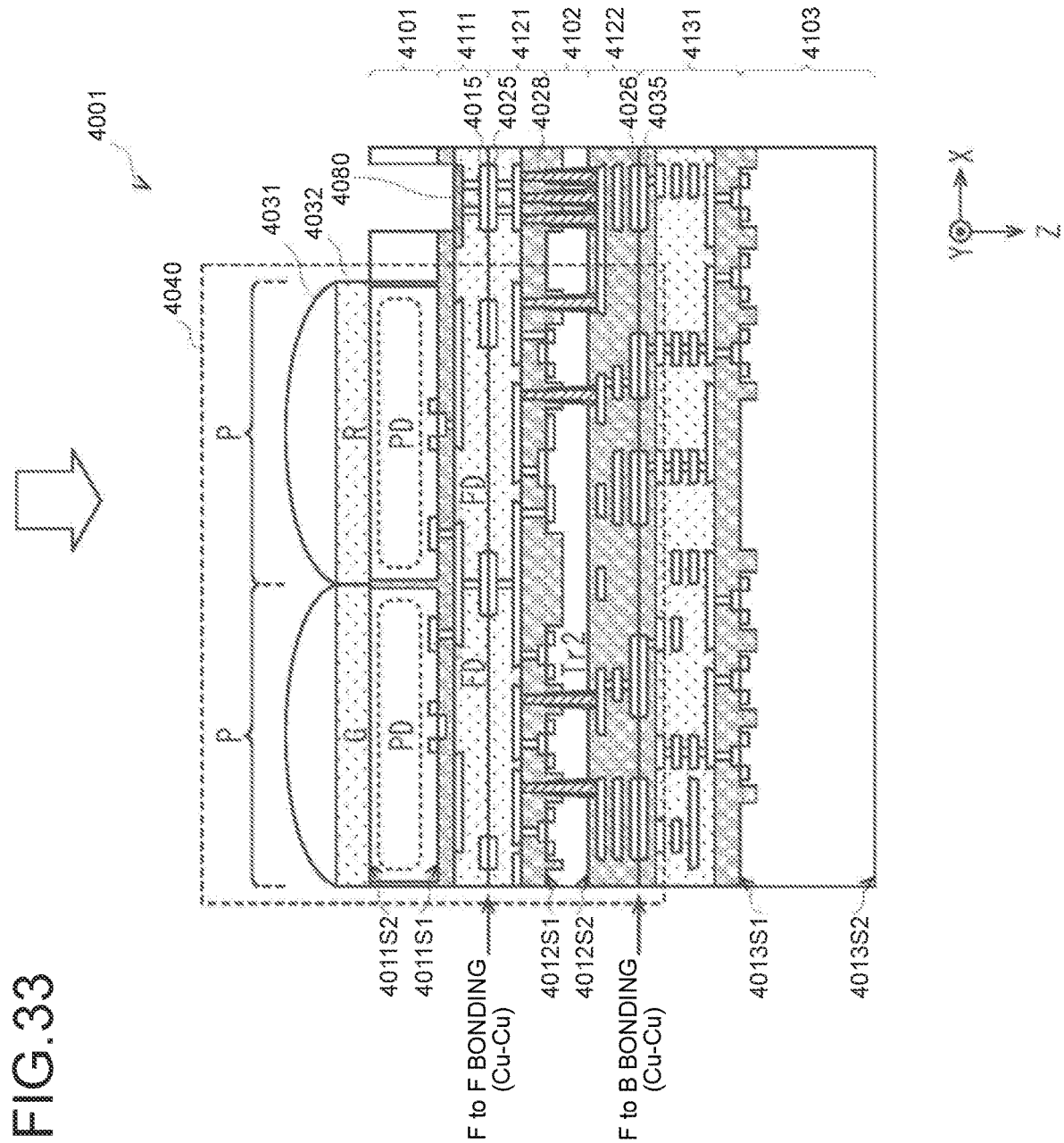
FIG. 33 is a schematic diagram illustrating a cross-sectional structure of an example of an imaging device 4001 according to a third example of the fifth embodiment.

Next, a third example of the fifth embodiment will be described. FIG. 33 is a schematic diagram illustrating a cross-sectional structure of an example of an imaging device 4001 according to a third example of the fifth embodiment. The imaging device 4001 may be associated with the imaging device 1004 described using the first to fourth embodiments.

The imaging device 4001 has a configuration in which a first substrate 4101, a second substrate 4102, and a third substrate 4103 are stacked in the Z-axis direction. Each of the first substrate 4101, the second substrate 4102, and the third substrate 4103 is formed of a semiconductor substrate (for example, a silicon substrate). It is noted that, as illustrated in FIG. 33, an incident direction of light from a subject is defined as the Z-axis direction, a horizontal direction on the paper orthogonal to the Z-axis direction is defined as the X-axis direction, and the direction orthogonal to the Z-axis and the X-axis is defined as the Y-axis direction. In the following drawings, directions may be expressed with reference to directions of arrows in FIG. 33.

As illustrated in FIG. 33, the first substrate 4101, the second substrate 4102, and the third substrate 4103 have first surfaces 4011S1, 4012S1, and 4013S1 on which transistors are provided, and second surfaces 4011S2, 4012S2, and 4013S2, respectively. Each of the first surfaces 4011S1, 4012S1, and 4013S1 is an element formation surface on which an element such as a transistor is formed. A gate electrode, a gate oxide film, and the like are provided on each of the first surfaces 4011S1, 4012S1, and 4013S1.

As illustrated in FIG. 33, a wiring layer 4111 is provided on the first surface 4011S1 of the first substrate 4101. A wiring layer 4121 is provided on the first surface 4012S1 of the second substrate 4102, and a wiring layer 4122 is provided on the second surface 4012S2 of the second substrate 4102. In addition, a wiring layer 4131 is provided on the first surface 4013S1 of the third substrate 4103. Each of the wiring layers 4111, 4121, 4122, and 4131 includes, for example, a conductor film and an insulating film, and includes a plurality of wirings, vias, and the like. Each of the wiring layers 4111, 4121, 4122, and 4131 includes, for example, two or more layers of wiring. Each of the wiring layers 4122 and 4131 may include three or more layers of wiring.

The wiring layers 4111, 4121, 4122, and 4131 have, for example, a configuration in which a plurality of wirings are stacked with an interlayer insulating layer (an interlayer insulating film) interposed therebetween. The wiring layer is formed using, for example, aluminum (Al), copper (Cu), tungsten (W), polysilicon (Poly-Si), or the like. The interlayer insulating layer is formed of, for example, a single layer film made of one of silicon oxide (SiO), silicon nitride (SiN), silicon oxynitride (SiON), and the like, or a stacked film made of two or more of these.

It is noted that the first substrate 4101 and the wiring layer 4111 can also be collectively referred to as the first substrate 4101 (or a first circuit layer). The second substrate 4102 and the wiring layers 4121 and 122 can also be collectively referred to as the second substrate 4102 (or a second circuit layer). Further, the third substrate 4103 and the wiring layer 4131 can be collectively referred to as the third substrate 4103 (or a third circuit layer).

The first substrate 4101 and the second substrate 4102 are stacked such that the first surface 4011S1 on which an element such as a transistor is formed and the first surface 4012S1 face each other by bonding between electrodes. That is, the first substrate 4101 and the second substrate 4102 are boned to each other so that the surfaces thereof face each other. This bonding method is referred to as face-to-face bonding.

The second substrate 4102 and the third substrate 4103 are stacked such that the second surface 4012S2 and the first surface 4013S1 on which an element such as a transistor is formed face each other by bonding between electrodes. That is, the second substrate 4102 and the third substrate 4103 are bonded to each other so that the back surface of the second substrate 4102 and the front surface of the third substrate 4103 face each other. This bonding method is referred to as face-to-back bonding.

As an example, the first surface 4011S1 of the first substrate 4101 and the first surface 4012S1 of the second substrate 4102 are bonded to each other by bonding between metal electrodes made of copper (Cu), that is, Cu—Cu bonding. The second surface 4012S2 of the second substrate 4102 and the first surface 4013S1 of the third substrate 4103 are also bonded to each other by, for example, Cu—Cu bonding. It is noted that the electrode used for bonding may be made of a metal material other than copper (Cu), such as nickel (Ni), cobalt (Co), and tin (Sn), or may be made of another material.

In the example illustrated in FIG. 33, the first substrate 4101 and the second substrate 4102 are connected to each other by bonding a plurality of electrodes 4015 constituted by a wiring M2 of the second layer in the wiring layer 4111 to a plurality of electrodes 4025 constituted by a wiring M2 of the second layer in the wiring layer 4121. In addition, the second substrate 4102 and the third substrate 4103 are connected to each other by bonding a plurality of electrodes 4026 constituted by a wiring M4 of the fourth layer in the wiring layer 4122 and a plurality of electrodes 4035 constituted by a wiring of the uppermost layer in the wiring layer 4131. The electrodes 4015, 4025, 4026, and 4035 are bonding electrodes.

The imaging device 4001 further includes a lens unit 4031 that condenses light and a color filter 4032. The color filter 4032 and the lens unit 4031 are sequentially stacked on the first substrate 4101. For example, the color filter 4032 and the lens unit 4031 are provided for each pixel P.

The lens unit 4031 guides light incident from above in FIG. 33 to the photodiode PD side. The lens unit 4031 is an optical member also referred to as an on-chip lens. The color filter 4032 selectively transmits light in a specific wavelength region among incident light. The light transmitted through the lens unit 4031 and the color filter 4032 is incident on the photodiode PD. The photodiode PD photoelectrically converts incident light to generate a charge.

In the example illustrated in FIG. 33, a pad 4080 is provided in the wiring layer 4111. In the first substrate 4101, an opening on the pad 4080 is formed, and the pad 4080 is exposed to the outside. The pad 4080 is, for example, an electrode formed using aluminum (Al). It is noted that the pad 4080 may be made of another metal material. A plurality of pads 4080 are arranged in the imaging device 4001. The pad 4080 can supply, for example, a power supply voltage VDD (or a ground voltage VSS) input from the outside to a read circuit 45 of the second substrate 4102, circuits of the third substrate 4103, and the like via a plurality of through electrodes 4028, as illustrated in FIG. 33.

In the example illustrated in FIG. 33, the color filter 4032 configured to allow green (G) light to be transmitted therethrough is provided on a photodiode PD of a left pixel P of the left and right pixels P in a pixel sharing unit 4040. The photodiode PD of the left pixel P receives light in a green wavelength region and performs photoelectric conversion. The color filter 4032 configured to allow red (R) light to be transmitted therethrough is provided on a photodiode PD of a right pixel P of the left and right pixels P in the pixel sharing unit 4040. The photodiode PD of the right pixel P receives light in a red wavelength region and performs photoelectric conversion. It is noted that a photodiode PD disposed below the color filter 4032 configured to allow blue (B) light to be transmitted therethrough receives light in a blue wavelength region and performs photoelectric conversion. Therefore, each pixel P of the imaging device 4001 can generate an R component pixel signal, a G component pixel signal, and a B component pixel signal. The imaging device 4001 can obtain an RGB pixel signal.

It is noted that the color filter 4032 is not limited to a primary color (RGB) color filter, and may be a complementary color filter such as cyan (Cy), magenta (Mg), or yellow (Ye). Furthermore, a color filter corresponding to white (W), that is, a filter configured to allow light in the entire wavelength range of the incident light to be transmitted therethrough may be arranged.

In the above-described structure, the first substrate 4101 may be associated with the first layer 2010a of the above-described substrate. The second substrate 4102 may be associated with the second layer 2010b of the substrate described above. Further, the third substrate 4103 may be associated with the memory+logic unit 2011.

8. Sixth Embodiment

Figure 34:
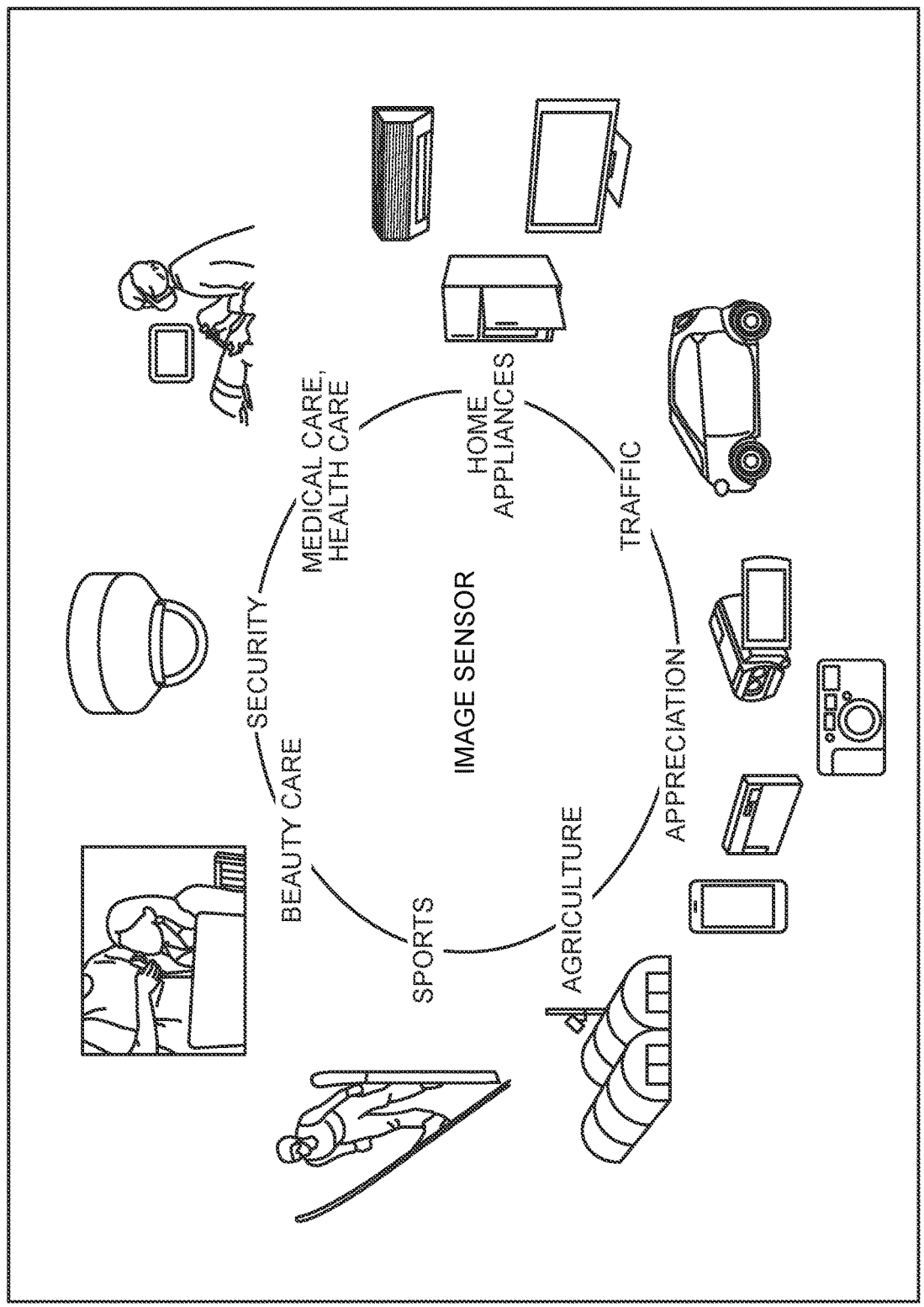
FIG. 34 is a diagram illustrating a usage example of using the imaging device according to the present disclosure.

Next, as a sixth embodiment, a description will be given as to an application example of the imaging device 1004 according to each of the above-described embodiments and modifications thereof according to the present disclosure. FIG. 34 is a diagram illustrating a usage example of using the imaging device 1004 according to each of the above-described embodiments and modifications thereof.

The above-described imaging device 1004 can be used, for example, in various cases of sensing light such as visible light, infrared light, ultraviolet light, and X-rays as described below.

- A device that captures an image to be used for appreciation, such as a digital camera or a portable device with a camera function.
- A device used for traffic, such as an in-vehicle sensor that captures images of the front, rear, surroundings, inside, and the like of an automobile for safe driving such as automatic stop, recognition of a driver's condition, and the like, a monitoring camera that monitors a traveling vehicle and a road, and a distance measuring sensor that measures a distance between vehicles and the like.
- A device used for home appliances such as a TV, a refrigerator, and an air conditioner in order to capture an image of a gesture of a user and operate the device according to the gesture.
- A device used for medical care or health care, such as an endoscope or a device that performs angiography by receiving infrared light.
- A device used for security, such as a monitoring camera for crime prevention or a camera for person authentication.
- A device used for beauty care, such as a skin measuring instrument for photographing skin or a microscope for photographing a scalp.
- A device used for sports, such as an action camera or a wearable camera for sports or the like.
- A device used for agriculture, such as a camera for monitoring conditions of fields and crops.

Figure 35:
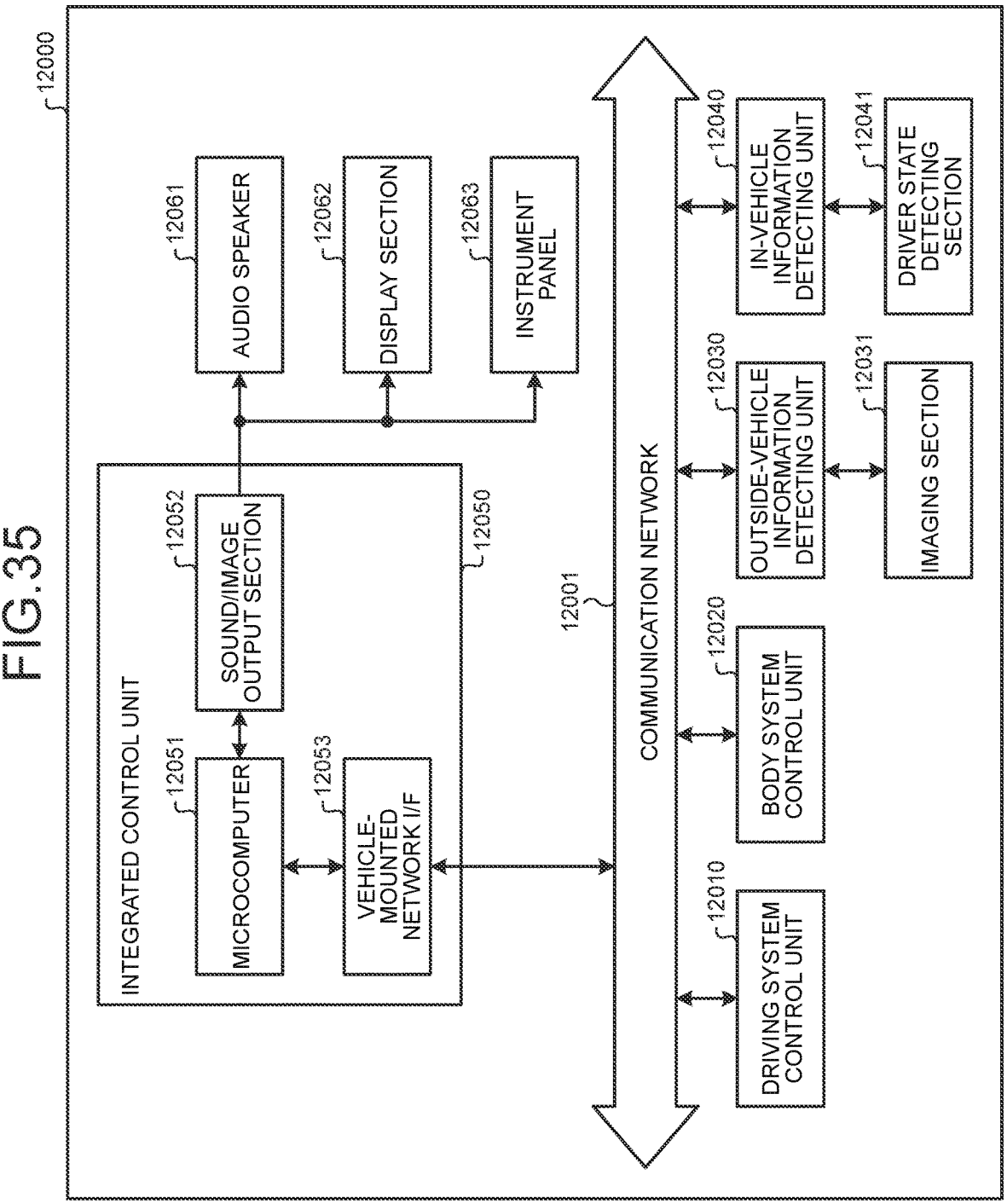
FIG. 35 is a block diagram depicting an example of schematic configuration of a vehicle control system as an example of a mobile body control system to which the technology according to an embodiment of the present disclosure can be applied.

8-1. More Specific Example of Case in which Imaging Device of Present Disclosure is Mounted on Vehicle As an application example of the imaging device 1004 according to the present disclosure, a description will be given as to a more specific example in a case where the imaging device 1004 is mounted on a vehicle and used therein. FIG. 35 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 35, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 35, an audio speaker 12061, a display section 12062, and an instrument panel 12063 are illustrated as the output device. The display section 12062 may, for example, include at least one of an on-board display and a head-up display.

Figure 36:
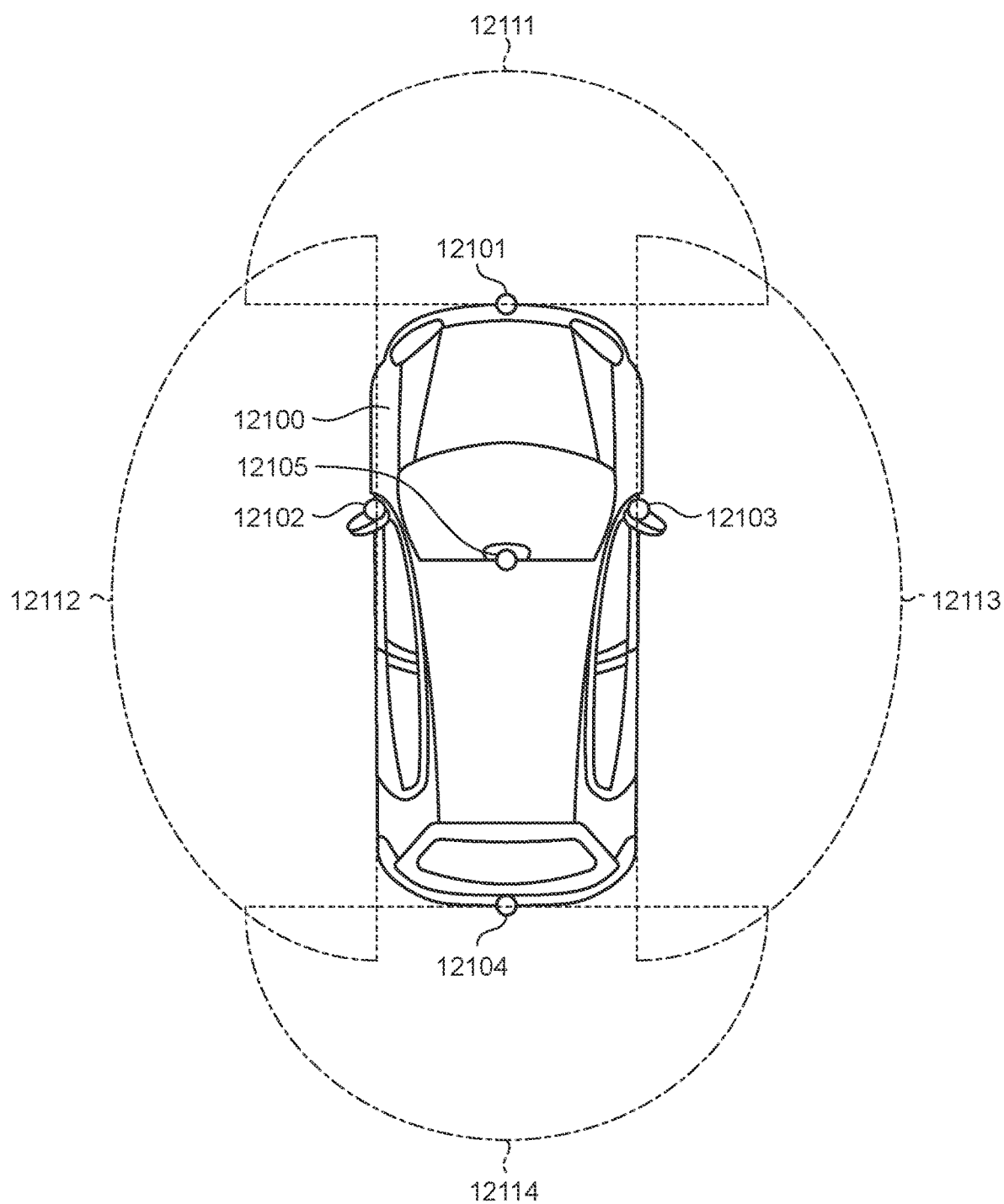
FIG. 36 is a diagram illustrating an example of an installation position of an imaging section.

FIG. 36 is a diagram depicting an example of the installation position of the imaging section 12031. In FIG. 36, a vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100.

The imaging section 12104 provided to the rear bumper or the back door obtains mainly an image of the rear of the vehicle 12100. The front images acquired by the imaging sections 12101 and 12105 are mainly used to detect a preceding vehicle, a pedestrian, an obstacle, a traffic light, a traffic sign, a lane, or the like.

Incidentally, FIG. 36 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to, for example, the imaging section 12031 among the configurations described above. Specifically, by applying, as the imaging section 12031, the imaging device 1004 according to the first embodiment of the present disclosure and the modifications thereof, the second embodiment of the present disclosure and the modifications thereof, and the third and sixth embodiments of the present disclosure, it is possible to obtain an image with lower noise and to improve drive performance. By applying, as the imaging section 12031, the imaging device 1004 according to the first embodiment of the present disclosure and the modifications thereof, the second embodiment of the present disclosure and the modifications thereof, and the third and sixth embodiments of the present disclosure, it is possible to reduce power consumption in the imaging section 12031. For example, in a case where the imaging section 12031 is driven by a battery, it is possible to operate for a longer time.

It is noted that the effects described in the present specification are merely examples and are not limited, and other effects may be obtained.

It is noted that the present technology can also have the following configurations.

(1) An imaging device comprising:
photoelectric conversion elements configured to generate a charge according to received light;
a pixel circuit configured to read the charge from the photoelectric conversion element and to convert the charge into an analog type pixel signal; and
a conversion circuit configured to convert, based on a reference signal, the pixel signal into digital type pixel data, wherein:
the conversion circuit includes a first circuit and a second circuit, wherein the first circuit is connected to the pixel circuit, and the second circuit is connected to an output of the first circuit;
the photoelectric conversion elements are arranged in a matrix array and are provided on a first layer of a first substrate; and
the pixel circuit and the first circuit are provided on a second layer of the first substrate, wherein the pixel circuit is provided for each of the photoelectric conversion elements on a one-to-one basis.

(2) The imaging device according to the above (1), wherein
the first circuit is connected to the second layer via a connection unit provided, on a one-to-one basis, with respect to the photoelectric conversion element in the matrix array corresponding to an array of the photoelectric conversion elements, wherein the connection unit electrically connects the corresponding photoelectric conversion element to the first layer and the second layer.

(3) The imaging device according to the above (1) or (2), wherein
the second circuit is provided on a second substrate stacked on a side of the second layer of the first substrate.

(4) The imaging device according to any one of the above (1) to (3), wherein
the second circuit is provided for each of a plurality of the first circuits arranged along a column in the matrix array.

(5) The imaging device according to the above (4), wherein:
a control line adopted to read the charge from the photoelectric conversion element is provided for each row in the matrix array; and
each pixel circuit corresponding to the photoelectric conversion element arranged in the matrix array is connected to each of the first circuits on a one-to-one basis, and a signal line adopted to transmit the outputs of the plurality of the first circuits arranged along the column is connected to the second circuit.

(6) The imaging device according to any one of the above (1) to (5), further comprising
a read control circuit configured to control reading of the charge from the photoelectric conversion element by the pixel circuit and an output of the pixel signal,
wherein the read control circuit is configured to control, for each row in the matrix array, the reading of the charge and the output of the pixel signal according to an order of the row.

(7) The imaging device according to any one of the above (1) to (6), further including:
a reference signal generation circuit provided on a second substrate stacked on a side of the second layer of the first substrate and configured to generate the reference signal; and
a plurality of wirings provided in the second layer and configured to supply the reference signal to the first circuit in units of rows in the matrix array,
in which the reference signal generation circuit is connected to the plurality of wirings via a connection unit configured to electrically connect the first substrate to the second substrate.

(8) The imaging device according to any one of the above (1) to (7), in which
the first circuit is a differential pair having one input terminal configured to allow the pixel signal to be input thereto and the other input terminal configured to allow the reference signal to be input thereto.

(9) The imaging device according to the above (8), in which:
the pixel circuit includes a transistor having a source connected to the one input terminal and a drain connected to a power supply voltage; and
a charge-voltage conversion unit configured to convert the charge generated by the photoelectric conversion element into a voltage is configured at a connection point between the one input terminal and the source.

(10) The imaging device according to the above (8) or (9), in which
the first circuit includes a switch circuit configured to control a connection between a gate of a transistor and a drain thereof, in which the gate is connected to the other input terminal of the differential pair, and the drain is connected to a power supply voltage.

(11) The imaging device according to the above (10), in which
the first circuit further includes a switch circuit configured to control a connection between a current source of a transistor and a source thereof, in which the transistor has a gate connected to the other input terminal of the differential pair, a drain connected to the power supply voltage, and the source connected to the current source.

(12) The imaging device according to any one of the above (1) to (7), in which
the first circuit includes a transistor and a switch circuit configured to control a connection between a gate of the transistor and a drain thereof.

(13) The imaging device according to the above (12), in which
the transistor allows the reference signal to be input to the gate thereof, allows the pixel signal to be input to a source thereof, and allows an output to be extracted from the drain thereof.

(14) The imaging device according to the above (12), in which:
the pixel circuit includes a charge-voltage conversion unit configured to convert the charge generated by the photoelectric conversion element into a voltage; and
the reference signal is applied to the charge-voltage conversion unit, a fixed voltage is applied to the gate, the pixel signal is input to a source, and an output is extracted from the drain.

(15) The imaging device according to any one of the above (1) to (14), in which:
the first circuit compares the pixel signal with the reference signal; and
the second circuit compares the output of the first circuit with a threshold value.

(16) The imaging device according to the above (12), in which
the first circuit includes:
a first capacitance further connected between the gate and the drain of the transistor; and
a second capacitance connected between the gate of the transistor and a fixed potential.

(17) The imaging device according to any one of the above (1) to (16), further including
a latch circuit configured to latch the output of the first circuit,
in which the latch circuit is provided on a second substrate stacked on a side of the second layer of the first substrate on a one-to-one basis with respect to the first circuit.

(18) The imaging device according to the above (1), in which:
a plurality of the pixel circuits arranged along a column of the array are connected to the one first circuit; and
a plurality of the first circuits arranged along the column are connected to the one second circuit provided on a second substrate stacked on a side of the second layer of the first substrate.

(19) The imaging device according to the above (18), in which
the first circuit is connected to the second circuit via a switch circuit.

(20) The imaging device according to the above (18) or (19), in which
the second circuit is provided on a second substrate stacked on a side of the second layer of the first substrate.

(21) The imaging device according to any one of the above (18) to (20), further including
a read control circuit configured to control reading of the charge from the photoelectric conversion element by the pixel circuit and an output of the pixel signal,
in which the read control circuit is configured to control, for each row in the matrix array, the reading of the charge and the output of the pixel signal according to an order of the rows.

(22) The imaging device according to any one of the above (18) to (21), further comprising:
a reference signal generation circuit provided on a second substrate stacked on a side of the second layer of the first substrate and configured to generate the reference signal; and
a plurality of wirings provided in the second layer and configured to supply the reference signal to the first circuit in units of rows in the matrix array,
wherein the reference signal generation circuit is connected to the plurality of wirings via a connection unit configured to electrically connect the second layer to the second substrate.

(23) The imaging device according to any one of the above (18) t (22), wherein
the first circuit is a differential pair having one input terminal configured to allow the pixel signal to be input thereto and the other input terminal configured to allow the reference signal to be input thereto.

(24) The imaging device according to the above (23), wherein:
the pixel circuit includes a transistor having a source connected to the one input terminal and a drain connected to a power supply voltage; and
a charge-voltage conversion unit configured to convert the charge generated by the photoelectric conversion element into a voltage is configured at a connection point between the one input terminal and the source.

(25) The imaging device according to the above (23) or (24), wherein
the first circuit includes a switch circuit configured to control a connection between a gate of a transistor and a drain thereof, wherein the gate is connected to the other input terminal of the differential pair, and the drain is connected to a power supply voltage.

(26) The imaging device according to the above (25), wherein
the first circuit further includes a switch circuit configured to control a connection between a current source of a transistor and a source thereof, wherein the transistor has a gate connected to the other input terminal of the differential pair, a drain connected to the power supply voltage, and the source connected to the current source.

(27) The imaging device according to any one of the above (18) to (22), wherein
the first circuit includes a transistor and a switch circuit configured to control a connection between a gate of the transistor and a drain thereof.

(28) The imaging device according to the above (27), wherein
the transistor allows the reference signal to be input to the gate thereof, allows the pixel signal to be input to a source thereof, and allows an output to be extracted from the drain thereof.

(29) The imaging device according to the above (27), wherein:
the pixel circuit includes a charge-voltage conversion unit configured to convert the charge generated by the photoelectric conversion element into a voltage; and
the reference signal is applied to the charge-voltage conversion unit, a fixed voltage is applied to the gate, the pixel signal is input to a source, and an output is extracted from the drain.

(30) The imaging device according to any one of the above (18) to (29), wherein:
the first circuit compares the pixel signal with the reference signal; and
the second circuit compares the output of the first circuit with a threshold value.

(31) The imaging device according to any one of the above (18) to (30), further comprising
a latch circuit configured to latch the output of the first circuit,
wherein the latch circuit is provided on a second substrate stacked on a side of the second layer of the first substrate on a one-to-one basis with respect to the first circuit.

(32) An imaging device comprising:
photoelectric conversion elements configured to generate a charge according to received light;
a pixel circuit configured to read the charge from the photoelectric conversion element and to convert the charge into an analog type pixel signal; and
a conversion circuit configured to convert, based on a reference signal, the pixel signal into digital type pixel data, wherein:
the conversion circuit includes a first circuit and a second circuit, wherein the first circuit is connected to the pixel circuit, and the second circuit is connected to an output of the first circuit;
the photoelectric conversion elements and the pixel circuits provided on a one-to-one basis with respect to the photoelectric conversion elements are arranged in a matrix array and provided on a first layer of a first substrate; the first circuit is provided on a second layer of the first substrate;
a plurality of the pixel circuits arranged along a column of the array are connected to the one first circuit; and
a plurality of the first circuits arranged along the column are connected to the one second circuit provided on a second substrate stacked on a side of the second layer of the first substrate.

(33) The imaging device according to the above (32), in which
the first circuit is connected to the second circuit via a switch circuit.

(34) The imaging device according to the above (32) or (33), in which
the second circuit is provided on a second substrate stacked on a side of the second layer of the first substrate.

(35) The imaging device according to any one of the above (32) to (34), further including
a read control circuit configured to control reading of the charge from the photoelectric conversion element by the pixel circuit and an output of the pixel signal,
in which the read control circuit is configured to control, for each row in the matrix array, the reading of the charge and the output of the pixel signal according to an order of the rows.

(36) The imaging device according to any one of the above (32) to (35), further including:
a reference signal generation circuit provided on a second substrate stacked on a side of the second layer of the first substrate and configured to generate the reference signal; and
a plurality of wirings provided in the second layer and configured to supply the reference signal to the first circuit in units of rows in the matrix array,
in which the reference signal generation circuit is connected to the plurality of wirings via a connection unit configured to electrically connect the second layer to the second substrate.

(37) The imaging device according to any one of the above (32) to (36), in which
the first circuit is a differential pair having one input terminal configured to allow the pixel signal to be input thereto and the other input terminal configured to allow the reference signal to be input thereto.

(38) The imaging device according to the above (37), in which:
the pixel circuit includes a transistor having a source connected to the one input terminal and a drain connected to a power supply voltage; and
a charge-voltage conversion unit configured to convert the charge generated by the photoelectric conversion element into a voltage is configured at a connection point between the one input terminal and the source.

(39) The imaging device according to the above (37) or (38), in which
the first circuit includes a switch circuit configured to control a connection between a gate of a transistor and a drain thereof, in which the gate is connected to the other input terminal of the differential pair, and the drain is connected to a power supply voltage.

(40) The imaging device according to the above (39), in which
the first circuit further includes a switch circuit configured to control a connection between a current source of a transistor and a source thereof, in which the transistor has a gate connected to the other input terminal of the differential pair, a drain connected to the power supply voltage, and the source connected to the current source.

(41) The imaging device according to any one of the above (32) to (36), in which
the first circuit includes a transistor and a switch circuit configured to control a connection between a gate of the transistor and a drain thereof.

(42) The imaging device according to the above (41), in which
the transistor allows the reference signal to be input to the gate thereof, allows the pixel signal to be input to a source thereof, and allows an output to be extracted from the drain thereof.

(43) The imaging device according to the above (41), in which:
the pixel circuit includes a charge-voltage conversion unit configured to convert the charge generated by the photoelectric conversion element into a voltage; and
the reference signal is applied to the charge-voltage conversion unit, a fixed voltage is applied to the gate, the pixel signal is input to a source, and an output is extracted from the drain.

(44) The imaging device according to any one of the above (32) to (43), in which:
the first circuit compares the pixel signal with the reference signal; and
the second circuit compares the output of the first circuit with a threshold value.

(45) The imaging device according to any one of the above (32) to (44), further including
a latch circuit configured to latch the output of the first circuit,
in which the latch circuit is provided on a second substrate stacked on a side of the second layer of the first substrate on a one-to-one basis with respect to the first circuit.

REFERENCE SIGNS LIST

10, $10_1$, $10_2$, $10_N$ PIXEL
11 PIXEL ARRAY UNIT
12, 12L, 12H VERTICAL SCANNING CIRCUIT
13 TIMING CONTROL UNIT
14 DAC
15 COLUMN SIGNAL PROCESSING UNIT
16 HORIZONTAL SCANNING CIRCUIT
20 COMPARATOR
30 COUNTER
40, $40Up_1$, $40Up_2$, $40Dwn_1$, $40Dwn_2$ LOGIC CIRCUIT
50 PERIPHERAL CIRCUIT
60 INTERFACE CIRCUIT
70, 70Up, 70Dwn, $71_1$, $71_2$, $71_N$, 72 ADC
73 FIRST CIRCUIT
74 LATCH CIRCUIT
100 PHOTOELECTRIC CONVERSION UNIT
101 CIRCUIT UNIT
102 CIRCUIT
150a, 150b, $150_1$, $150_2$, $150_N$ BOUNDARY REGION
201, 201a, 201b, 201b', 201c, 201d FIRST STAGE COMPARATOR
202 MIDDLE STAGE COMPARATOR
203 SUBSEQUENT STAGE COMPARATOR
210 SECOND CIRCUIT
$250_1$, $250_2$, $250_M$ PIXEL/FIRST STAGE COMPARATOR UNIT
300 PHOTOELECTRIC CONVERSION ELEMENT
301, 302, 303, 303a, 303b, 305, 306, 306a, 306b, 307, 311a, 311b, 311c, 313a, 313b, 312, 321, 324, 326, 362, 364, 370, 373, 382, 384, 389b, 391, 392 nMOS TRANSISTOR
310a, 310b, 320, 322, 323, 325, 340, 341a, 341b, 345, 353, 363, 372, 376, 377, 380, 381, 383, 390 pMOS TRANSISTOR
327, 328, 371, 378 SWITCH CIRCUIT
330 RAMP WIRING
342, 342a, 342b, 343, 344, 346, 352, 360, 385, 386, 393 CAPACITOR
355, 355', 388a, 388b CURRENT SOURCE
400, 401, 402 CONNECTION UNIT
1004, 3001, 4001 IMAGING DEVICE 2000a, 2000b SOLID-STATE IMAGING ELEMENT
2010 PIXEL UNIT
2010a FIRST LAYER
2010b SECOND LAYER
2011 MEMORY+LOGIC UNIT
2011' LOGIC UNIT
2012 MEMORY UNIT

The invention claimed is:

1. An imaging device comprising:
photoelectric conversion elements provided in a matrix array on a first layer of a first substrate and respectively configured to generate a charge according to received light;
pixel circuits respectively corresponding to the photoelectric conversion elements on a one-to-one basis, the pixel circuits being respectively configured to read charge from the photoelectric conversion elements and to convert the charge into an analog pixel signal; and
a conversion circuit configured to convert, based on a reference signal, the analog pixel signal into digital pixel data, wherein
the conversion circuit includes a first circuit and a second circuit,
the first circuit is connected to a respective pixel circuit,
the second circuit is connected to an output of the first circuit,
the pixel circuits and the first circuit are provided on a second layer of the first substrate, and
the first circuit includes a transistor and a switch circuit configured to control a connection between a gate of the transistor and a drain of the transistor.

2. The imaging device according to claim 1, wherein the first circuit is connected to the second layer via connection units respectively provided, on a one-to-one basis, with respect to the photoelectric conversion elements in the matrix array, and the connection units respectively electrically connects corresponding photoelectric conversion elements to the first layer and the second layer.

3. The imaging device according to claim 1, wherein the second circuit is provided on a second substrate stacked on a side of the second layer of the first substrate.

4. The imaging device according to claim 1, wherein the first circuit is one of a plurality of first circuits, and the second circuit is provided for each of the plurality of first circuits arranged along a column in the matrix array.

5. The imaging device according to claim 4, wherein:
a control line configured to read the charge from the photoelectric conversion elements is provided for each row in the matrix array; and
the pixel circuits are respectively connected to the plurality of first circuits on a one-to-one basis, and a signal line configured to transmit outputs of the plurality of first circuits is arranged along the column and is connected to the second circuit.

6. The imaging device according to claim 1, further comprising:
a read control circuit configured to control reading of the charge from the photoelectric conversion elements by the pixel circuits and an output of the analog pixel signal,
wherein the read control circuit is configured to control, for each row in the matrix array, the reading of the charge and the output of the analog pixel signal according to an order of rows in the matrix array.

7. The imaging device according to claim 1, further comprising:
a reference signal generation circuit provided on a second substrate stacked on a side of the second layer of the first substrate and configured to generate the reference signal; and
a plurality of wirings provided in the second layer and configured to supply the reference signal to the first circuit in units of rows in the matrix array,
wherein the reference signal generation circuit is connected to the plurality of wirings via a connection unit configured to electrically connect the second layer to the second substrate.

8. The imaging device according to claim 1, wherein the transistor receives the reference signal at the gate, receives the analog pixel signal at a source, and provides an output from the drain.

9. The imaging device according to claim 1, wherein:
the pixel circuits respectively include a charge-voltage conversion unit configured to convert the charge generated by a corresponding photoelectric conversion element into a voltage; and
the reference signal is applied to the charge-voltage conversion unit, a fixed voltage is applied to the gate, the analog pixel signal is input to a source, and an output is extracted from the drain.

10. The imaging device according to claim 1, wherein the first circuit includes:
a first capacitance further connected between the gate and the drain of the transistor; and
a second capacitance connected between the gate of the transistor and a fixed potential.

11. The imaging device according to claim 1, further comprising
a latch circuit configured to latch the output of the first circuit,
wherein the latch circuit is provided on a second substrate stacked on a side of the second layer of the first substrate on a one-to-one basis with respect to the first circuit.

12. An imaging device comprising:
photoelectric conversion elements provided in a matrix array on a first layer of a first substrate and respectively configured to generate a charge according to received light;
pixel circuits respectively corresponding to the photoelectric conversion elements on a one-to-one basis, the pixel circuits being respectively configured to read charge from the photoelectric conversion elements and to convert the charge into an analog pixel signal; and
a conversion circuit configured to convert, based on a reference signal, the analog pixel signal into digital pixel data, wherein
the conversion circuit includes a first circuit and a second circuit,
the first circuit is connected to a respective pixel circuit,
the second circuit is connected to an output of the first circuit,
the pixel circuits and the first circuit are provided on a second layer of the first substrate,
the first circuit is a differential pair having a first input terminal configured to receive the analog pixel signal and a second input terminal configured to receive the reference signal, and
the first circuit includes a switch circuit configured to control a connection between a gate of a transistor and a drain of the transistor, wherein the gate is connected to the second input terminal of the differential pair, and the drain is connected to a power supply voltage.

13. The imaging device according to claim 12, further comprising:
a charge-voltage conversion unit configured to convert the charge generated by a corresponding photoelectric conversion element into a voltage is configured at a connection point between the first input terminal and a source of the transistor.

14. The imaging device according to claim 12, wherein the first circuit further includes a switch circuit configured to control a connection between a current source of a second transistor and a source of the second transistor, wherein the second transistor has a gate connected to the second input terminal of the differential pair, a drain connected to the power supply voltage, and the source connected to the current source.

15. An imaging device comprising:
photoelectric conversion elements provided in a matrix array on a first layer of a first substrate and respectively configured to generate a charge according to received light;
pixel circuits respectively corresponding to the photoelectric conversion elements on a one-to-one basis, the pixel circuits being respectively configured to read charge from the photoelectric conversion elements and to convert the charge into an analog pixel signal; and
a conversion circuit configured to convert, based on a reference signal, the analog pixel signal into digital pixel data, wherein
the conversion circuit includes a first circuit and a second circuit,
the first circuit is connected to a respective pixel circuit,
the second circuit is connected to an output of the first circuit,
the pixel circuits and the first circuit are provided on a second layer of the first substrate,
the first circuit compares the analog pixel signal with the reference signal, and
the second circuit compares the output of the first circuit with a threshold value.

16. An imaging device comprising:
photoelectric conversion elements provided in a matrix array on a first layer of a first substrate and respectively configured to generate a charge according to received light;
pixel circuits respectively corresponding to the photoelectric conversion elements on a one-to-one basis, the pixel circuits being respectively configured to read charge from the photoelectric conversion elements and to convert the charge into an analog pixel signal; and
a conversion circuit configured to convert, based on a reference signal, the analog pixel signal into digital pixel data, wherein
the conversion circuit includes a first circuit and a second circuit,
the first circuit is connected to a respective pixel circuit,
the second circuit is connected to an output of the first circuit,
the pixel circuits and the first circuit are provided on a second layer of the first substrate,
a plurality of the pixel circuits arranged along a column of the matrix array are connected to the first circuit,
the first circuit is one of a plurality of first circuits that are arranged along the column,
the second circuit is provided on a second substrate stacked on a side of the second layer of the first substrate, and
the first circuit is connected to the second circuit via a switch circuit.

* * * * *